(12) United States Patent
Nagao et al.

(10) Patent No.: US 12,352,011 B2
(45) Date of Patent: Jul. 8, 2025

(54) WORKING MACHINE

(71) Applicant: KUBOTA CORPORATION, Osaka (JP)

(72) Inventors: Kohei Nagao, Osaka (JP); Yuji Fukuda, Osaka (JP); Hiroaki Nakagawa, Osaka (JP); Ryota Hamamoto, Osaka (JP); Tomoyuki Noguchi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 869 days.

(21) Appl. No.: 17/395,863

(22) Filed: Aug. 6, 2021

(65) Prior Publication Data

US 2022/0049461 A1 Feb. 17, 2022

(30) Foreign Application Priority Data

Aug. 15, 2020 (JP) .................. 2020-137187
Aug. 15, 2020 (JP) .................. 2020-137188
(Continued)

(51) Int. Cl.
*E02F 9/22* (2006.01)
*B62D 11/00* (2006.01)
(Continued)

(52) U.S. Cl.
CPC ............ *E02F 9/225* (2013.01); *B62D 11/005* (2013.01); *B62D 11/04* (2013.01); *E02F 9/2004* (2013.01);
(Continued)

(58) Field of Classification Search
CPC ....... E02F 9/225; E02F 9/2004; E02F 9/2235; E02F 9/2253; E02F 9/2275; E02F 9/2285;
(Continued)

(56) References Cited

U.S. PATENT DOCUMENTS 6,435,289 B1  8/2002 Hori et al.
2006/0265915 A1* 11/2006 Toji ...................... E02F 9/2296
  37/348
(Continued)

FOREIGN PATENT DOCUMENTS

JP  2001125657 A  5/2001
JP  2004350724 A  12/2004
(Continued)

OTHER PUBLICATIONS

Office Action dated Jan. 30, 2024 in Japanese family member patent appl. No. 2021-093045, with an English translation thereof.
(Continued)

*Primary Examiner* — Nga X Nguyen
(74) *Attorney, Agent, or Firm* — Greenblum & Bernstein, P.L.C.

(57) ABSTRACT

A working machine includes a first pressure detector configured to detect a first pilot pressure that is a pressure of operation fluid passed through a first traveling fluid line, a second pressure detector configured to detect a second pilot pressure that is a pressure of operation fluid passed through a second traveling fluid line, a third pressure detector configured to detect a third pilot pressure that is a pressure of operation fluid passed through a third traveling fluid line, a fourth pressure detector configured to detect a fourth pilot pressure that is a pressure of operation fluid passed through a fourth traveling fluid line, and a controller configured or programed to judge in which of the left-front, right-front, left-rear and right-rear operation areas an operational position of the traveling operation member exists.

3 Claims, 23 Drawing Sheets

(30) Foreign Application Priority Data

Apr. 2, 2021 (JP) .................................. 2021-63686
Jun. 2, 2021 (JP) .................................. 2021-93045

(51) Int. Cl.
*B62D 11/04* (2006.01)
*E02F 9/20* (2006.01)
*F15B 15/02* (2006.01)
*E02F 3/34* (2006.01)

(52) U.S. Cl.
CPC .......... *E02F 9/2235* (2013.01); *E02F 9/2253* (2013.01); *E02F 9/2275* (2013.01); *E02F 9/2285* (2013.01); *E02F 9/2292* (2013.01); *F15B 15/02* (2013.01); *E02F 3/3414* (2013.01); *E02F 9/2296* (2013.01)

(58) Field of Classification Search
CPC ..... E02F 9/2292; E02F 3/3414; E02F 9/2296; E02F 9/2289; B62D 11/005; B62D 11/04; F15B 15/02; B60Y 2400/85; F16H 61/456

See application file for complete search history.

(56) References Cited

U.S. PATENT DOCUMENTS

| | | | |
|---|---|---|---|
| 2017/0089366 A1* | 3/2017 | Fukuda | E02F 9/2292 |
| 2017/0350095 A1* | 12/2017 | Fukuda | E02F 9/2253 |
| 2020/0018043 A1* | 1/2020 | Udagawa | F16H 61/12 |
| 2020/0071911 A1* | 3/2020 | Sato | F16H 61/44 |
| 2022/0010522 A1* | 1/2022 | Shiratani | E02F 9/2242 |

FOREIGN PATENT DOCUMENTS

| | | |
|---|---|---|
| JP | 2004350740 A | 12/2004 |
| JP | 2017-179923 A | 10/2017 |
| JP | 2017219107 A | 12/2017 |
| JP | 2020038002 A | 3/2020 |

OTHER PUBLICATIONS

Office Action dated Jan. 30, 2024 in Japanese family member patent appl. No. 2021-063686 with an English translation thereof.

\* cited by examiner

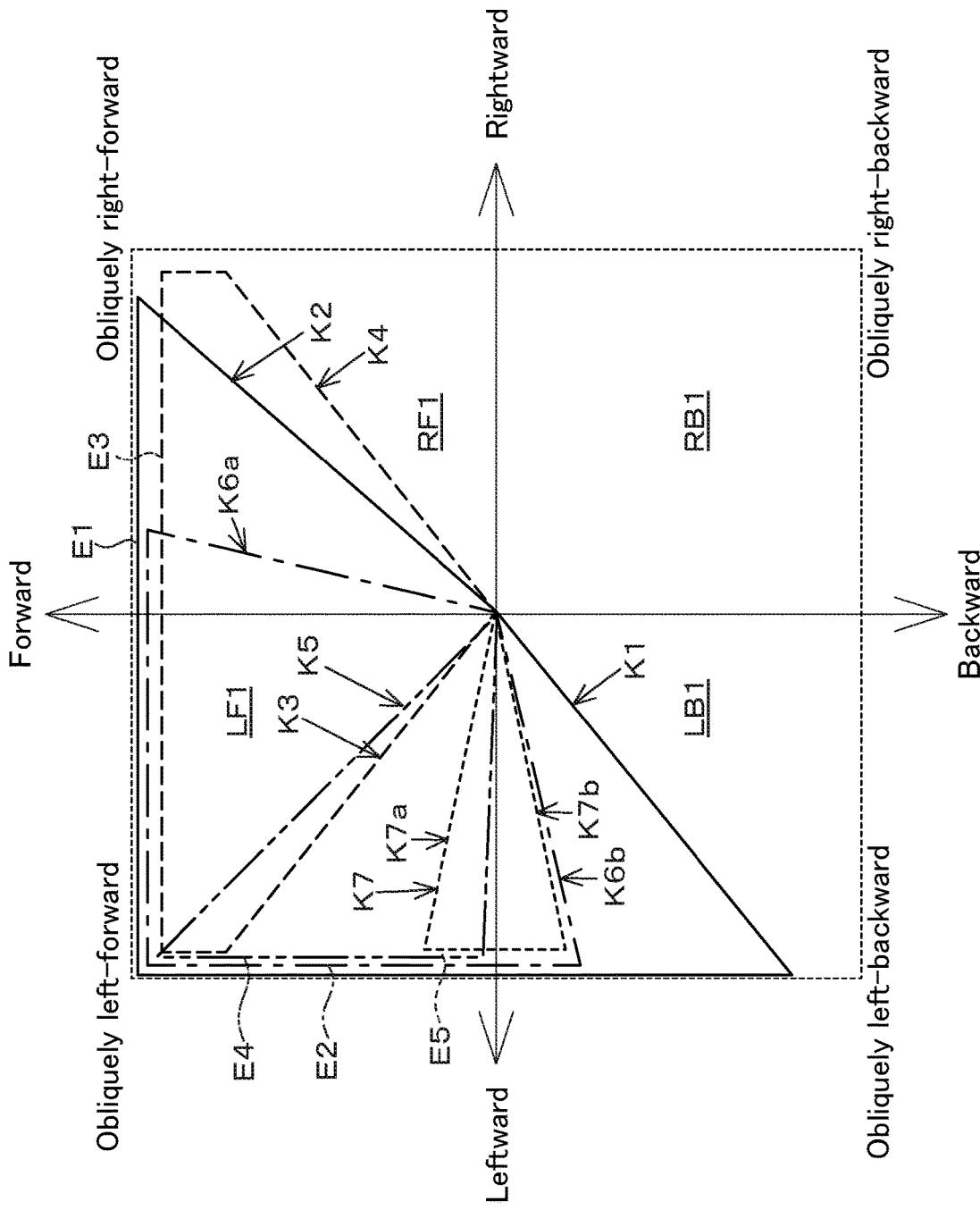

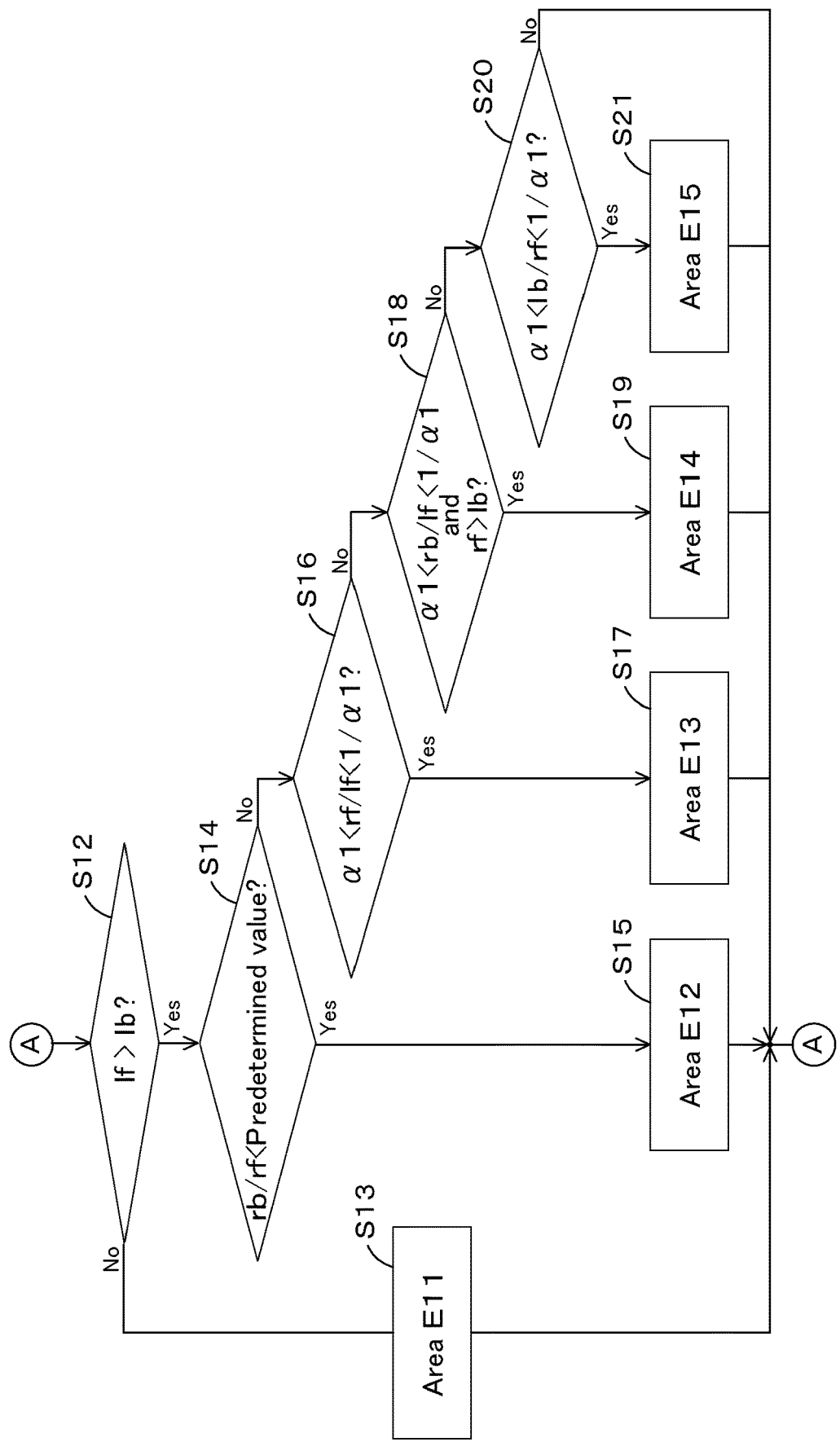

WORKING MACHINE

CROSS REFERENCE TO RELATED APPLICATIONS

This application claims the benefit of priority to Japanese Patent Application No. 2020-137187 filed on Aug. 15, 2020, to Japanese Patent Application No. 2020-137188 filed on Aug. 15, 2020, to Japanese Patent Application No. 2021-063686 filed on Apr. 2, 2021, and to Japanese Patent Application No. 2021-093045 filed on Jun. 2, 2021. The entire contents of this application are hereby incorporated herein by reference.

BACKGROUND OF THE INVENTION

1. Field of the Invention

The present invention relates to a working machine such as a skid steer loader, a compact track loader, or a backhoe.

2. Description of the Related Art

A technique for reducing and increasing a speed of a working machine is disclosed in Japanese Unexamined Patent Publication No. 2017-179923. The working machine disclosed in the publication No. 2017-179923 has a prime mover including an engine, a hydraulic pump that is operated by a power of the prime mover and delivers operation fluid, a traveling hydraulic device configured to change its speed between a first speed and a second speed higher than the first speed according to a pressure of the operation fluid, an operation valve configured to change the pressure of the operation fluid to be applied to the traveling hydraulic device, and a measuring device configured to detect the pressure of the operation fluid. When a detected pressure, which is the pressure of the operation fluid detected by the measuring device, drops from a set pressure corresponding to the second speed to be less than a predetermined pressure, the operation valve reduces the pressure of the operation fluid applied to the traveling hydraulic device to reduce the traveling hydraulic device to the first speed.

SUMMARY OF THE INVENTION

The working machine disclosed in the publication No. 2017-179923 is configured to automatically decelerate from the second speed to the first speed when the pressure of the operation fluid supplied to the traveling device in the traveling is a predetermined level or higher. Recently, there has been a demand to judge a traveling direction of the working machine (that is, a traveling device), that is, an operational direction of a traveling operation member.

To solve the above-mentioned technical problems, the present invention intends to provide a working machine capable of easily judging an operational direction of a traveling operation member that is capable of operating the traveling of a machine body.

Technical means of the present invention for solving this technical problem is characterized by the following points.

In a first aspect of the present invention, a working machine includes a machine body, a left traveling device provided on a left portion of the machine body, a right traveling device provided on a right portion of the machine body, a left traveling motor configured to output power to the left traveling device, a right traveling motor configured to output power to the right traveling device, a left traveling pump to supply operation fluid to the left traveling motor, the left traveling pump including a first pressure receiving portion and a second pressure receiving portion so that the operation fluid is used to apply a pressure to at least one of the first and second pressure receiving portions, a right traveling pump to supply operation fluid to the right traveling motor, the right traveling pump including a third pressure receiving portion and a fourth pressure receiving portion so that the operation fluid is used to apply a pressure to at least one of the third and fourth pressure receiving portions, a traveling operation device including a traveling operation member operably movable from a neutral position to any one of a left-front operation area, a right-front operation area, a left-rear operation area and a right-rear operation area, the traveling operation device being configured to apply the pressure of operation fluid to at least one of the first, second, third and fourth pressure receiving portions corresponding to an operational position of the traveling operation member in any one of the left-front, right-front, left-rear and right-rear operation areas, a first traveling fluid line connected to the first pressure receiving portion, the operation fluid having a pressure applied to the first pressure receiving portion being passed through the first traveling fluid line according to operation of the traveling operation member, a second traveling fluid line connected to the second pressure receiving portion, the operation fluid having a pressure applied to the second pressure receiving portion being passed through the second traveling fluid line according to operation of the traveling operation member, a third traveling fluid line connected to the third pressure receiving portion, the operation fluid having a pressure applied to the third pressure receiving portion being passed through the third traveling fluid line according to operation of the traveling operation member, a fourth traveling fluid line connected to the fourth pressure receiving portion, the operation fluid having a pressure applied to the fourth pressure receiving portion being passed through the fourth traveling fluid line according to operation of the traveling operation member, a first pressure detector configured to detect a first pilot pressure that is the pressure of operation fluid passed through the first traveling fluid line, a second pressure detector configured to detect a second pilot pressure that is the pressure of operation fluid passed through the second traveling fluid line, a third pressure detector configured to detect a third pilot pressure that is the pressure of operation fluid passed through the third traveling fluid line, a fourth pressure detector configured to detect a fourth pilot pressure that is the pressure of operation fluid passed through the fourth traveling fluid line, and a controller configured or programed to judge in which of the left-front, right-front, left-rear and right-rear operation areas an operational position of the traveling operation member exists.

The controller is configured or programmed to consider the operational position of the traveling operation member as existing in any one of the left-front operation area, a left side area in the left-rear operation area bordered by an oblique line extending leftwardly rearward from the neutral position, and a left side area in the right-front operation area bordered by an oblique line extending rightwardly forward from the neutral position when the third pilot pressure is higher than the fourth pilot pressure.

The controller is configured or programmed to consider the operational position of the traveling operation member as existing at least in the left-front operation area when a first ratio that is a ratio of the fourth pilot pressure to the third pilot pressure is less than a predetermined value.

The controller is configured or programmed to consider the operational position of the traveling operation member as existing in either a right side area in the left-front operation area bordered by an oblique line extending leftwardly forward from the neutral position or a left side area in the right-front operation area bordered by the oblique line extending rightwardly forward from the neutral position when a second ratio that is a ratio of the first pilot pressure to the third pilot pressure is within a predetermined range.

The controller is configured or programmed to consider the operational position of the traveling operation member as existing in a left side area in the left-front operation area bordered by the oblique line extending leftwardly forward from the neutral position when a third ratio that is a ratio of the second pilot pressure to the third pilot pressure is within a predetermined range and the first pilot pressure is higher than the fourth pilot pressure.

The controller is configured or programmed to consider the operational position of the traveling operation member as existing in either a part of the left side area in the left-front operation area or a part of the left side area in the left-rear operation area when a fourth ratio that is a ratio of the fourth pilot pressure to the first pilot pressure is within a predetermined range.

The controller is configured or programmed to consider the operational position of the traveling operation member as existing in any one of the right-front operation area, a right side area in the right-rear operation area bordered by an oblique line extending rightwardly rearward from the neutral position, and a right side area in the left-front operation area bordered by an oblique line extending lefttwardly forward from the neutral position when the first pilot pressure is higher than the second pilot pressure.

The controller is configured or programmed to consider the operational position of the traveling operation member as existing at least in the right-front operation area when a fifth ratio that is a ratio of the second pilot pressure to the first pilot pressure is less than a predetermined value.

The controller is configured or programmed to consider the operational position of the traveling operation member as existing in either the right side area in the left-front operation area bordered by the oblique line extending leftwardly forward from the neutral position or a left side area in the right-front operation area bordered by an oblique line extending rightwardly forward from the neutral position when a sixth ratio that is a ratio of the third pilot pressure to the first pilot pressure is within a predetermined range.

The controller is configured or programmed to consider the operational position of the traveling operation member as existing in a right side area in the right-front operation area bordered by the oblique line extending rightwardly forward from the neutral position when a seventh ratio that is a ratio of the fourth pilot pressure to the first pilot pressure is within a predetermined range and the third pilot pressure is higher than the second pilot pressure.

The controller is configured or programmed to consider the operational position of the traveling operation member as existing in either a part of the right side area in the right-front operation area or a part of the right side area in the right-rear operation area when an eighth ratio that is a ratio of the second pilot pressure to the third pilot pressure is within a predetermined range.

The controller is configured or programmed to consider the operational position of the traveling operation member as existing in either a right side area in the left-rear operation area bordered by an oblique line extending leftwardly rearward from the neutral position or a left side area in the right-rear operation area bordered by an oblique line extending rightwardly rearward from the neutral position when the third pilot pressure is less than the fourth pilot pressure and the first pilot pressure is less than the second pilot pressure.

The controller is configured or programmed to consider the operational position of the traveling operation member as existing in an area including a right side area in the left-rear operation area bordered by an oblique line extending leftwardly rearward from the neutral position and a left side area in the right-rear operation area bordered by an oblique line extending rightwardly rearward from the neutral position when a fourth ratio that is a ratio of the fourth pilot pressure to the first pilot pressure is out of a predetermined range and an eighth ratio that is a ratio of the second pilot pressure to the third pilot pressure is out of a predetermined range.

The controller is configured or programmed to consider the operational position of the traveling operation member as existing in either a part of the left side area in the left-front operation area or a part of the left side area in the left-rear operation area when an fourth ratio that is a ratio of the fourth pilot pressure to the first pilot pressure is within a predetermined range.

The controller is configured or programmed to consider the operational position of the traveling operation member as existing in either a part of the right side area in the right-front operation area or a part of the right side area in the right-rear operation area when an eighth ratio that is a ratio of the second pilot pressure to the third pilot pressure is within a predetermined range.

In a second aspect of the present invention, a working machine includes a machine body, a left traveling device provided on a left portion of the machine body, a right traveling device provided on a right portion of the machine body, a left traveling motor configured to output power to the left traveling device, a right traveling motor configured to output power to the right traveling device, a left traveling pump to supply operation fluid to the left traveling motor, the left traveling pump including a first pressure receiving portion and a second pressure receiving portion so that the operation fluid is used to apply a pressure to at least one of the first and second pressure receiving portions, a right traveling pump to supply operation fluid to the right traveling motor, the right traveling pump including a third pressure receiving portion and a fourth pressure receiving portion so that the operation fluid is used to apply a pressure to at least one of the third and fourth pressure receiving portions, a traveling operation device including a traveling operation member operably movable from a neutral position to any one of a left-front operation area, a right-front operation area, a left-rear operation area and a right-rear operation area, the traveling operation device being configured to apply the pressure of operation fluid to at least one of the first, second, third and fourth pressure receiving portions corresponding to an operational position of the traveling operation member in any one of the left-front, right-front, left-rear and right-rear operation areas, a first traveling fluid line connected to the first pressure receiving portion, the operation fluid having a pressure applied to the first pressure receiving portion being passed through the first traveling fluid line according to operation of the traveling operation member, a second traveling fluid line connected to the second pressure receiving portion, the operation fluid having a pressure applied to the second pressure receiving portion being passed through the second traveling fluid line according to operation of the traveling operation member, a third traveling fluid line connected to the third pressure receiving portion, the operation fluid having a pressure applied to the third pressure receiving portion being passed through the third traveling fluid line according to operation of the traveling operation member, a fourth traveling fluid line connected to the fourth pressure receiving portion, the operation fluid having a pressure applied to the fourth pressure receiving portion being passed through the fourth traveling fluid line according to operation of the traveling operation member, a first pressure detector configured to detect a first pilot pressure that is the pressure of operation fluid passed through the first traveling fluid line, a second pressure detector configured to detect a second pilot pressure that is the pressure of operation fluid passed through the second traveling fluid line, a third pressure detector configured to detect a third pilot pressure that is the pressure of operation fluid passed through the third traveling fluid line, a fourth pressure detector configured to detect a fourth pilot pressure that is the pressure of operation fluid passed through the fourth traveling fluid line, and a controller to judge an operational position of the traveling operation member. The controller is configured or programmed to judge, based on the first, second, third and fourth pilot pressures, whether the operational position of the traveling operation member exists in either a part of a right side area in the right-front operation area or a part of a right side area in the right-rear operation area or not.

The controller is configured or programmed to consider the operational position of the traveling operation member as existing in either a part of the left side area in the right-front operation area or a part of the left side area in the left-rear operation area when a fourth ratio that is a ratio of the fourth pilot pressure to the first pilot pressure is within a predetermined range.

The controller is configured or programmed to consider the operational position of the traveling operation member as existing in either a part of the right side area in the right-front operation area or a part of the right side area in the right-rear operation area when an eighth ratio that is a ratio of the second pilot pressure to the third pilot pressure is within a predetermined range.

In a third aspect of the present invention, a working machine includes a machine body, a left traveling device provided on a left portion of the machine body, a right traveling device provided on a right portion of the machine body, a left traveling motor configured to output power to the left traveling device, a right traveling motor configured to output power to the right traveling device, a left traveling pump to supply operation fluid to the left traveling motor, the left traveling pump including a first pressure receiving portion and a second pressure receiving portion so that the operation fluid is used to apply a pressure to at least one of the first and second pressure receiving portions, a right traveling pump to supply operation fluid to the right traveling motor, the right traveling pump including a third pressure receiving portion and a fourth pressure receiving portion so that the operation fluid is used to apply a pressure to at least one of the third and fourth pressure receiving portions, a traveling operation device including a traveling operation member operably movable in operational directions including at least a forward-traveling direction, a rearward-traveling direction, a left-turning direction and a right-turning direction, the traveling operation device being configured to apply the pressure of operation fluid to at least one of the first, second, third and fourth pressure receiving portions according to operation of the traveling operation member, a first traveling fluid line connected to the first pressure receiving portion, the operation fluid having a pressure applied to the first pressure receiving portion being passed through the first traveling fluid line according to operation of the traveling operation member, a second traveling fluid line connected to the second pressure receiving portion, the operation fluid having a pressure applied to the second pressure receiving portion being passed through the second traveling fluid line according to operation of the traveling operation member, a third traveling fluid line connected to the third pressure receiving portion, the operation fluid having a pressure applied to the third pressure receiving portion being passed through the third traveling fluid line according to operation of the traveling operation member, a fourth traveling fluid line connected to the fourth pressure receiving portion, the operation fluid having a pressure applied to the fourth pressure receiving portion being passed through the fourth traveling fluid line according to operation of the traveling operation member, a first pressure detector configured to detect a first pilot pressure that is the pressure of operation fluid passed through the first traveling fluid line, a second pressure detector configured to detect a second pilot pressure that is the pressure of operation fluid passed through the second traveling fluid line, a third pressure detector configured to detect a third pilot pressure that is the pressure of operation fluid passed through the third traveling fluid line, a fourth pressure detector configured to detect a fourth pilot pressure that is the pressure of operation fluid passed through the fourth traveling fluid line, and a controller configured or programmed to judge an operational direction of the traveling operation member based on either first comparison information including comparison between the first pilot pressure and the second pilot pressure acting on the left traveling pump or second comparison information including comparison between the third pilot pressure and the fourth pilot pressure acting on the left traveling pump.

The controller is configured or programmed to consider the traveling operation member as being operated in any operational direction other than the rearward-traveling direction when the first comparison information indicates that the first pilot pressure is higher than the second pilot pressure and a ratio of the second pilot pressure to the first pilot pressure is less than the first threshold.

The controller is configured or programmed to consider the traveling operation member as being operated in any operational direction other than the rearward-traveling direction when the second comparison information indicates that the third pilot pressure is higher than the fourth pilot pressure and a ratio of the fourth pilot pressure to the third pilot pressure is less than the second threshold.

The controller is configured or programmed to consider the traveling operation member as being operated in the rearward-traveling direction when the first comparison information indicates that the first pilot pressure is equal to or less than the second pilot pressure or a ratio of the second pilot pressure to the first pilot pressure is equal to or more than the first threshold, and when the second comparison information indicates that the third pilot pressure is equal to or less than the fourth pilot pressure or less or a ratio of the fourth pilot pressure to the third pilot pressure is equal to or more than the second threshold.

In addition, the controller is configured or programmed to consider the traveling operation member as being operated in any operational direction other than the forward-traveling direction when the first comparison information indicates that the second pilot pressure is higher than the first pilot pressure and a ratio of the third pilot pressure to the second pilot pressure is less than the first threshold.

In addition, the controller is configured or programmed to consider the traveling operation member as being operated in any operational direction other than the forward-traveling direction when the second comparison information indicates that the fourth pilot pressure is higher than the third pilot pressure and a ratio of the third pilot pressure to the fourth pilot pressure is less than the second threshold.

The controller is configured or programmed to consider the traveling operation member as being operated in the forward-traveling direction when the first comparison information indicates that the second pilot pressure is equal to or less than the first pilot pressure or a ratio of the first pilot pressure to the second pilot pressure is equal to or more than the first threshold, and when the second comparison information indicates that the fourth pilot pressure is equal to or less than the third pilot pressure or a ratio of the third pilot pressure to the fourth pilot pressure is equal to or more than the second threshold.

The controller is configured or programmed to consider the traveling operation member as being operated in any operational direction other than the left-turning direction when the first comparison information indicates that the first pilot pressure is higher than the second pilot pressure and the ratio of the second pilot pressure to the first pilot pressure is less than the first threshold.

The controller is configured or programmed to consider the traveling operation member as being operated in any operational directions other than the left-turning direction when the second comparison information indicates that the fourth pilot pressure is higher than the third pilot pressure and a ratio of the third pilot pressure to the fourth pilot pressure is less than the second threshold.

The controller is configured or programmed to consider the traveling operation member as being operated in the left-turning direction when the first comparison information indicates that the first pilot pressure is equal to or less than the second pilot pressure or a ratio of the second pilot pressure to the first pilot pressure is equal to or more than the first threshold, and when the second comparison information indicates that the fourth pilot pressure is equal to or less than the third pilot pressure or a ratio of the third pilot pressure to the fourth pilot pressure is equal to or more than the second threshold.

The controller is configured or programmed to consider the traveling operation member as being operated in any operational direction other than the right-turning direction when the first comparison information indicates that the second pilot pressure is higher than the first pilot pressure and a ratio of the first pilot pressure to the second pilot pressure is less than the first threshold.

The controller is configured or programmed to consider the traveling operation member as being operated in any operational direction other than the right-turning direction when the second comparison information indicates that the third pilot pressure is higher than the fourth pilot pressure and the ratio of the fourth pilot pressure to the third pilot pressure is less than the second threshold.

The controller is configured or programmed to consider the traveling operation member as being operated in the right-turning direction when the first comparison information indicates that the second pilot pressure is equal to or less than the first pilot pressure or a ratio of the first pilot pressure to the second pilot pressure is equal to or more than the first threshold, and when the second comparison information indicates that the third pilot pressure is equal to or less than the fourth pilot pressure or a ratio of the fourth pilot pressure to the third pilot pressure is equal to or more than the second threshold.

In a fourth aspect of the present invention, a working machine includes a machine body, a left traveling device provided on a left portion of the machine body, a right traveling device provided on a right portion of the machine body, a left traveling motor configured to output power to the left traveling device, a right traveling motor configured to output power to the right traveling device, a left traveling pump to supply operation fluid to the left traveling motor, the left traveling pump including a first pressure receiving portion and a second pressure receiving portion so that the operation fluid is used to apply a pressure to at least one of the first and second pressure receiving portions, a right traveling pump to supply operation fluid to the right traveling motor, the right traveling pump including a third pressure receiving portion and a fourth pressure receiving portion so that the operation fluid is used to apply a pressure to at least one of the third and fourth pressure receiving portions, a traveling operation device including a traveling operation member, the traveling operation device being configured to apply the pressure of the part of operation fluid to at least one of the first, second, third and fourth pressure receiving portions according to operation of the traveling operation member, a first traveling fluid line connected to the first pressure receiving portion, the operation fluid having a pressure applied to the first pressure receiving portion being passed through the first traveling fluid line according to operation of the traveling operation member, a second traveling fluid line connected to the second pressure receiving portion, the operation fluid having a pressure applied to the second pressure receiving portion being passed through the second traveling fluid line according to operation of the traveling operation member, a third traveling fluid line connected to the third pressure receiving portion, the operation fluid having a pressure applied to the third pressure receiving portion being passed through the third traveling fluid line according to operation of the traveling operation member, a fourth traveling fluid line connected to the fourth pressure receiving portion, the operation fluid having a pressure applied to the fourth pressure receiving portion being passed through the fourth traveling fluid line according to operation of the traveling operation member, a first pressure detector configured to detect a first pilot pressure that is the pressure of operation fluid passed through the first traveling fluid line, a second pressure detector configured to detect a second pilot pressure that is the pressure of operation fluid passed through the second traveling fluid line, a third pressure detector configured to detect a third pilot pressure that is the pressure of operation fluid passed through the third traveling fluid line, a fourth pressure detector configured to detect a fourth pilot pressure that is the pressure of operation fluid passed through the fourth traveling fluid line, and a controller configured or programmed to judge an operational direction of the traveling operation member based on either third comparison information including comparison between the first pilot pressure acting on the left traveling pump and the fourth pilot pressure acting on the right traveling pump or fourth comparison information including comparison between the second pilot pressure acting on the left traveling pump and the third pilot pressure acting on the right traveling pump.

The first traveling fluid line has a first throttle portion provided downstream from the first pressure detector and configured to restrict a flow rate of the operation fluid. The second traveling fluid line has a second throttle portion provided downstream from the second pressure detector and configured to restrict a flow rate of the operation fluid. The third traveling fluid line has a third throttle portion provided downstream from the third pressure detector and configured to restrict a flow rate of the operation fluid. The fourth traveling fluid line has a fourth throttle portion provided downstream from the fourth pressure detector and configured to restrict a flow rate of the operation fluid.

According to the present invention, it is possible to easily judge an operational direction of the traveling operation member operable to control traveling of the machine body. In addition, according to the present invention, it is possible to easily and accurately judge the operational direction of the traveling operation member operable to control the traveling of the machine body.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 3A is a view showing an operation area for a leftward operation of a traveling operation member according to the first embodiment.

FIG. 4B is a view showing a flowchart, following FIG. 4A, of the operation for judging the operation region (operation area) according to the first embodiment.

DETAILED DESCRIPTION OF THE PREFERRED EMBODIMENTS

Figure 1:
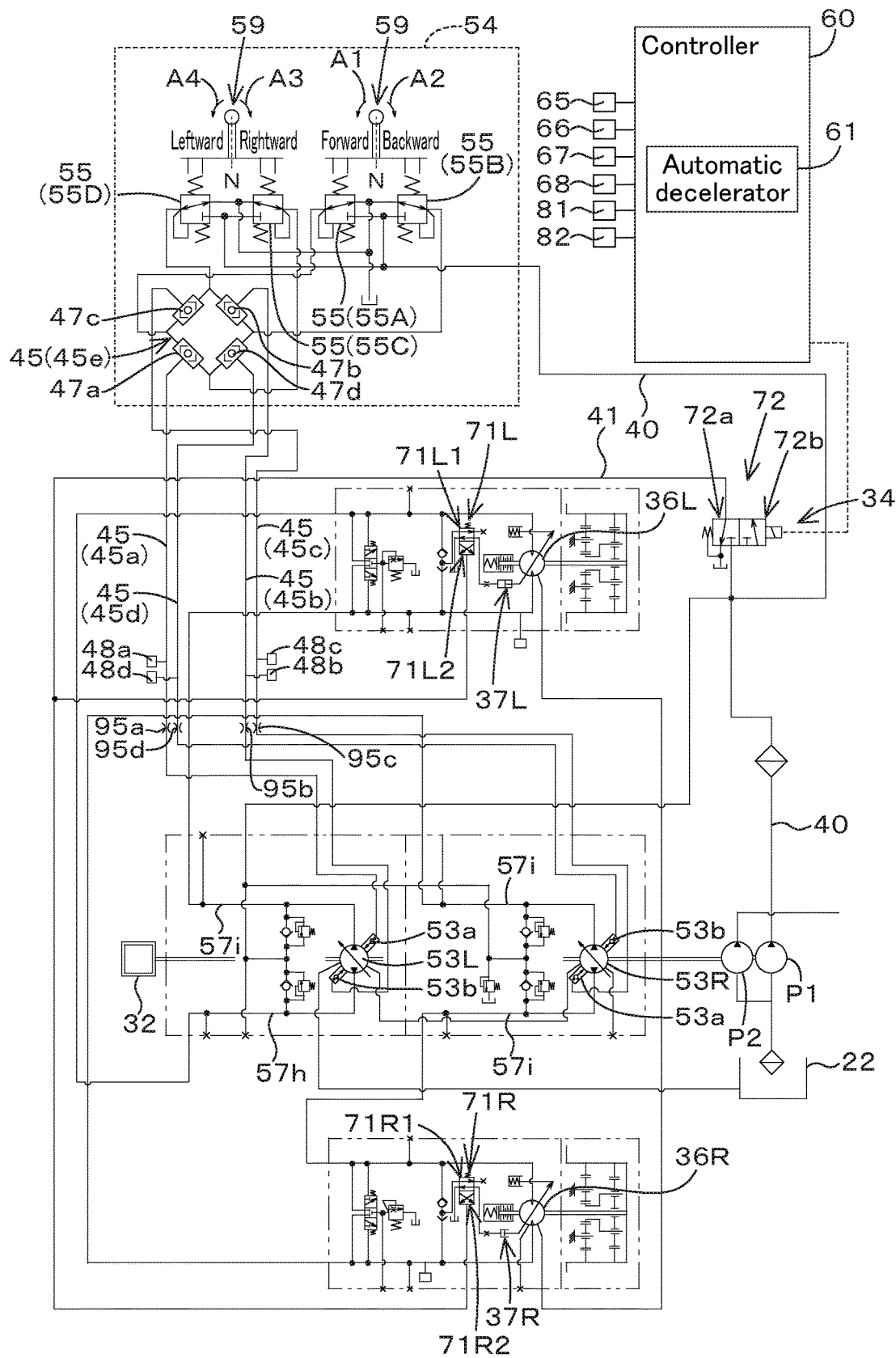
FIG. 1 is a view showing a hydraulic system (a hydraulic circuit) for working machine according to a first embodiment of the present invention.

The preferred embodiments will now be described with reference to the accompanying drawings, wherein like reference numerals designate corresponding or identical elements throughout the various drawings. The drawings are to be viewed in an orientation in which the reference numerals are viewed correctly.

A preferred embodiment of a hydraulic system for a working machine and the working machine having the hydraulic system will be described below with reference to drawings.

First Embodiment

Figure 21:
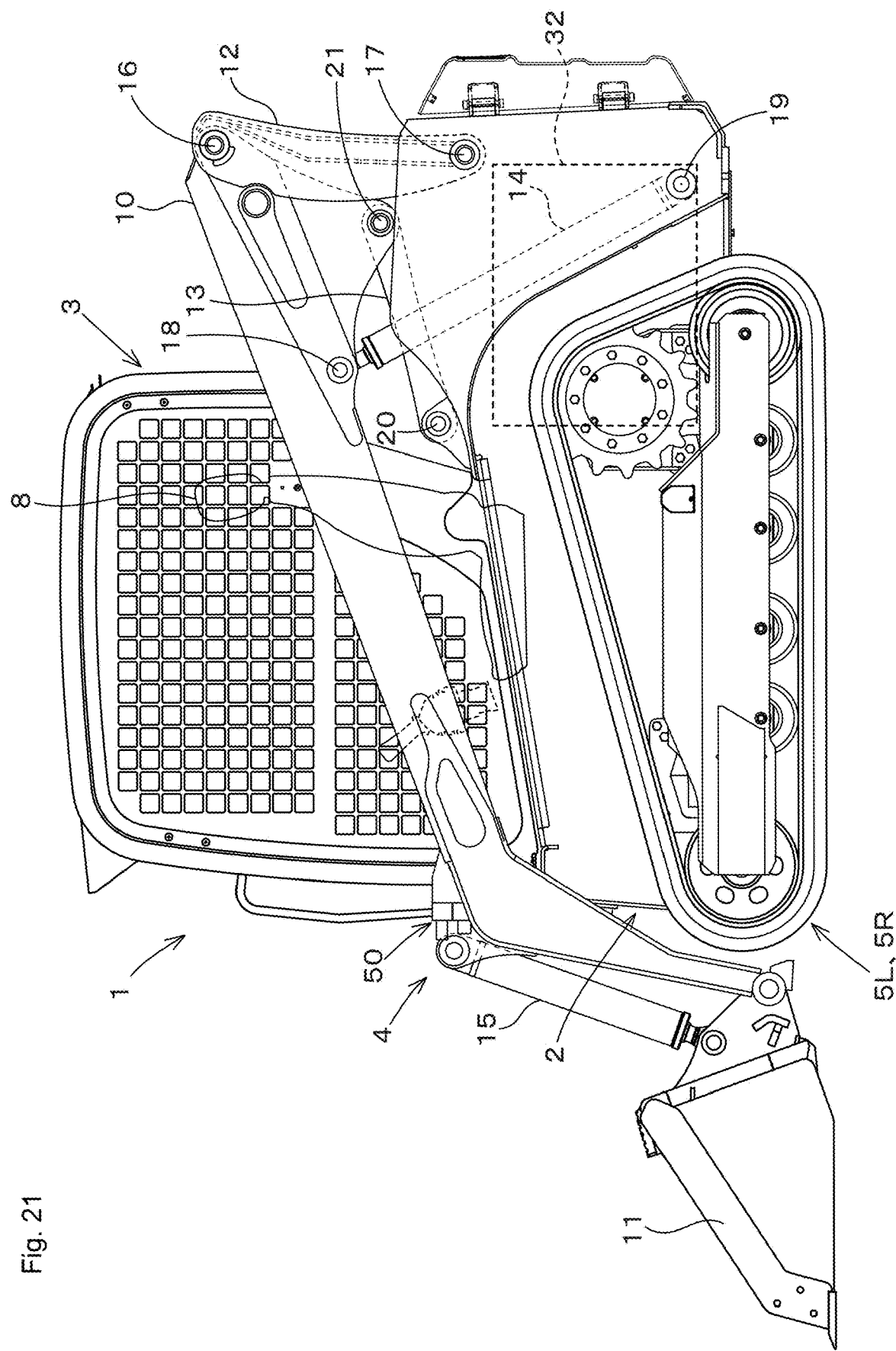
FIG. 21 is a side view showing a track loader that is an example of the working machine according to the first to fourth embodiments.

FIG. 21 shows a side view of a working machine according to embodiments of the present invention. FIG. 21 shows a compact track loader as an example of the working machine. However, the working machine according to the embodiments of the present invention is not limited to the compact track loader, but may be other types of loader working machines, such as a skid steer loader, for example. In addition, the working machine may be a working machine other than the loader working machine.

As shown in FIG. 21, the working machine 1 has a machine body 2, a cabin 3, a working device 4, and a pair of traveling devices 5L and 5R. In the embodiment of the present invention, a forward direction from a driver siting on a driver seat 8 of the working machine 1 (a left side in FIG. 21) is referred to as the front, a rearward direction from the driver (a right side in FIG. 21) is referred to as the rear, a leftward direction from the driver (a front surface side of FIG. 21) is referred to as the left, and a rightward direction from the driver (a back surface side of FIG. 21) is referred to as the right. A horizontal direction orthogonal to a fore-and-aft direction is referred to as a machine width direction. A direction from the center of the machine body 2 to the right or left is referred to as a machine outward direction. In other words, the machine outward direction is one machine width direction away from the machine body 2. A direction opposite to the machine outward direction is referred to as a machine inward direction. In other words, the machine inward direction is the other machine width direction approaching the machine body 2.

The cabin 3 is mounted on the machine body 2. The cabin 3 incorporates the driver seat 8. The working device 4 is attached to the machine body 2. A pair of traveling devices 5L and 5R are provided on outer sides of the machine body 2. A prime mover 32 is mounted on a rear inside portion of the machine body 2.

The working device 4 includes booms 10, a working tool 11, lift links 12, control links 13, boom cylinders 14, and bucket cylinders 15.

The booms 10 are arranged on right and left sides of the cabin 3 swingably up and down. The working tool 11 is a bucket, for example. The bucket 11 is arranged at tip portions (that is, front end portions) of the booms 10 movably up and down. The lift links 12 and the control links 13 support base portions (that is, rear portions) of the booms 10 so that the booms10 can be swung up and down. The boom cylinders 14 are extended and contracted to lift and lower the booms 10. The bucket cylinders 15 are extended and contracted to swing the bucket 11 up and down.

Front portions of the right and left booms 10 are connected to each other by a deformed connecting pipe. Base portions (that is, rear potions) of the booms 10 are connected to each other by a circular connecting pipe.

The lift links 12, control links 13, and boom cylinders 14 are arranged on right and left sides of the machine body 2 to correspond to the right and left booms 10.

The lift links 12 are extended vertically from rear portions of the base potions of the booms 10. Upper portions (that is, one ends) of the lift links 12 are pivotally supported on the rear portion of the base portions of the booms 10 via respective pivot shafts 16 (referred to as first pivot shafts) rotatably around their lateral axes. Lower portions (that is, the other ends) of the lift links 12 are pivotally supported on a rearward portion of the machine body 2 via respective pivot shafts 17 (referred to as second pivot shafts) rotatably around their lateral axes. The second pivot shafts 17 are provided below the first pivot shafts 16.

Upper portions of the boom cylinders 14 are pivotally supported via respective pivot shafts 18 (referred to as third pivot shafts) rotatably around their lateral axes. The third pivot shafts 18 are provided at the base portions of the booms 10, especially, at front portions of the base portions. Lower portions of the boom cylinders 14 are pivotally supported respective pivot shafts 19 (referred to as fourth pivot shafts) rotatably around their lateral axes. The fourth pivot shafts 19 are provided closer to a lower portion of the rear portion of the machine body 2 and below the third pivot shafts 18.

The control links 13 are provided in front of the lift links 12. One ends of the control links 13 are pivotally supported via respective pivot shafts 20 (referred to as fifth pivot shafts) rotatably around their lateral axes. The fifth pivot shafts 20 are provided on the machine body 2 forward of the lift links 12. The other ends of the control links 13 are pivotally supported via respective pivot shafts 21 (referred to as sixth pivot shafts) rotatably around their lateral axes. The sixth pivot shafts 21 are provided on the booms 10 forwardly upward from the second pivot shafts 17.

By extending and contracting the boom cylinders 14, the booms 10 are swung up and down around the first pivot shafts 16 with the base portions of the booms 10 supported by the lift links 12 and the control links 13, thereby lifting and lowering the tip end portions of the booms 10. The control links 13 are swung up and down around the fifth pivot shafts 20 by the vertical swinging of the booms 10. The lift links 12 are swung back and forth around the second pivot shafts 17 by the vertical swinging of the control links 13.

An alternative working tool instead of the bucket 11 can be attached to the front portions of the booms 10. For example, the alternative working tool is an attachment (that is, an auxiliary attachment) such as a hydraulic crusher, a hydraulic breaker, an angle broom, an earth auger, a pallet fork, a sweeper, a mower, a snow blower, or the like.

A connecting member 50 is provided at the front portion of the left boom 10. The connecting member 50 is a device configured to connect a hydraulic equipment attached to the auxiliary attachment to a first piping member such as a pipe provided on the left boom 10. Specifically, the first piping member can be connected to one end of the connecting member 50, and a second piping member connected to the hydraulic equipment of the auxiliary attachment can be connected to the other end. In this manner, an operation fluid flowing in the first piping member passes through the second piping member and is supplied to the hydraulic equipment.

The bucket cylinders 15 are arranged respectively closer to the front portions of the booms 10. The bucket cylinders 15 are extended and contracted to swing the bucket 11.

Of the pair of traveling devices 5L and 5R, the traveling device 5L is provided on a left side of the machine body 2, and the traveling device 5R is provided on a right side of the machine body 2. In the embodiment, crawler typed (including semi-crawler typed) traveling devices are adopted as the pair of traveling devices 5L and 5R. Wheel-type traveling device having front wheels and rear wheels may also be adopted. For convenience of explanation, the traveling device 5L may be referred to as the left traveling device 5L, and the traveling device 5R may be referred to as the right traveling device 5R.

The prime mover 32 is an internal combustion engine such as a diesel engine, a gasoline engine, an electric motor, or the like. In the embodiment, the prime mover 32 is the diesel engine, but is not limited thereto.

Next, the hydraulic system for the working machine will be described.

As shown in FIG. 1, the hydraulic system for the working machine has a first hydraulic pump P1 and a second hydraulic pump P2. The first hydraulic pump P1 is a pump configured to be driven by power of the prime mover 32 and includes a constant displacement gear pump. The first hydraulic pump P1 is capable of delivering operation fluid stored in a tank 22. Specifically, the first hydraulic pump P1 delivers operation fluid that is mainly used for control. For convenience of explanation, the tank 22 that stores operation fluid may be referred to as an operation fluid tank. Of the operation fluid delivered from the first hydraulic pump P1, the operation fluid used for control is referred to as pilot fluid, and a pressure of the pilot fluid is referred to as a pilot pressure.

The second hydraulic pump P2 is a pump to be driven by power of the prime mover 32, and includes a constant displacement gear pump. The second hydraulic pump P2 is capable of delivering operation fluid stored in the tank 22 and, for example, supplies the operation fluid to fluid lines of a working system. For example, the second hydraulic pump P2 supplies operation fluid to control valves (that is, flow-rate control valves) that control the boom cylinders 14 for operating the booms 10, the bucket cylinders 15 for operating the bucket, and an auxiliary hydraulic actuator for operating the auxiliary hydraulic actuator.

The hydraulic system for the working machine has a pair of traveling motors 36L and 36R and a pair of traveling pumps 53L and 53R. The pair of traveling motors 36L and 36R output power transmitted to the pair of traveling devices 5L and 5R. Of the pair of traveling motors 36L and 36R, the traveling motor 36L transmits rotational power to the traveling device (referred to as a left traveling device) 5L, and the traveling motor 36R transmits rotational power to the traveling device (referred to as a right traveling device) 5R.

The pair of traveling pumps 53L and 53R are pumps to be driven by power of the prime mover 32 and are variable displacement axial pumps with respective swash plates, for example. The pair of traveling pumps 53L and 53R are driven to supply operation fluid respectively to the pair of traveling motors 36L and 36R. Of the pair of traveling pumps 53L and 53R, the traveling pump 53L supplies the operation fluid to the traveling pump 53L, and the traveling pump 53R supplies the operation fluid to the traveling pump 53R.

For convenience of explanation, the traveling pump 53L may be referred to as a left traveling pump 53L, the traveling pump 53R may be referred to as a right traveling pump 53R, the traveling motor 36L may be referred to as a left traveling motor 36L, and the traveling motor 36R may be referred to as a right traveling motor 36R.

Each of the left traveling pump 53L and the right traveling pump 53R has a pressure-receiving portion 53a and a pressure-receiving portion 53b to which a pressure (that is, a pilot pressure) of the operation fluid (that is, pilot fluid) from the first hydraulic pump P1 is applied, and angles of the swash plates are changed by the pilot pressures applied to the pressure-receiving portions 53a and 53b. By changing an angle of each of the swash plates, an output (that is, a delivery amount of operation fluid) and an operation fluid delivery direction of each of the left and right traveling pumps 53L and 53R can be changed.

The left traveling pump 53L has a first port 82a to deliver operation fluid therefrom during normal rotation of the left traveling motor 53L, and a second port 82b to deliver operation fluid therefrom during reverse rotation of the left traveling motor 53L. The right traveling pump 53R has a third port 82c to deliver operation fluid therefrom during normal rotation of the right traveling motor 53R, and a fourth port 82d to deliver operation fluid therefrom during reverse rotation of the right traveling motor 53R.

The left traveling motor 36L can be rotated by operation fluid delivered from the left traveling pump 53L, and at a rotation speed (that is, number of rotations) variable according to a flow rate of the operation fluid. A swash plate switching cylinder 37L is connected to the left traveling motor 36L, so that a rotation speed (that is, number of rotations) of the left traveling motor 36L can also be changed by extending or contracting the swash plate switching cylinder 37L in either one of opposite directions. When the swash plate switching cylinder 37L is contracted, a rotation speed of the left traveling motor 36L is set to a low speed (referred to as a first speed), and when the swash plate switching cylinder 37L is extended, a rotation speed of the left traveling motor 36L is set to a high speed (referred to as a second speed). In other words, the rotation speed of the left traveling motor 36L is shiftable between the first speed that is the low speed stage and the second speed that is the high speed stage.

The right traveling motor 36R can be rotated by operation fluid delivered from the right traveling pump 53R, and at a rotation speed (that is, number of rotations) variable according to a flow rate of the operation fluid. A swash plate switching cylinder 37R is connected to the right traveling motor 36R, so that a rotation speed (that is, number of rotations) of the right traveling motor 36R can also be changed by extending or contracting the swash plate switching cylinder 37R in either one of opposite directions. When the swash plate switching cylinder 37R is contracted, a rotation speed of the right traveling motor 36R is set to a low speed (referred to as a first speed), and when the swash plate switching cylinder 37R is extended, a rotation speed of the right traveling motor 36R is set to a high speed (referred to as a second speed). In other words, the rotation speed of the right traveling motor 36L is shiftable between the first speed that is the low speed stage and the second speed that is the high speed stage.

As shown in FIG. 1, the hydraulic system for the working machine has a traveling switching valve 34. The traveling switching valve 34 is shiftable between a first state where rotation speeds (that is, numbers of rotations) of the traveling motors (that is, the lefts traveling motor 36L and the right traveling motor 36R) are each set at the first speed and a second state where rotation speeds of the traveling motors are each set at the second speed. The travel switching valve 34 includes first switching valves 71L and 71R and a second switching valve 72.

The first switching valve 71L is connected via a fluid line to the swash plate switching cylinder 37L of the left traveling motor 36L, and is configured as a two-position switching valve shiftable between a first position 71L1 and a second position 71L2. The first switching valve 71L, when set at the first position 71L1, contracts the swash plate switching cylinder 37L, and when set at the second position 71L2, extends the swash plate switching cylinder 37L.

The first switching valve 71R is connected via a fluid line to the swash plate switching cylinder 37R of the right traveling motor 36R, and is configured as a two-position switching valve shiftable between a first position 71R1 and a second position 71R2. The first switching valve 71R, when set at the first position 71L1, contracts the swash plate switching cylinder 37R, and when set at the second position 71R2, extends the swash plate switching cylinder 37R.

The second switching valve 72 is a solenoid valve that switches the first switching valve 71L and the first switching valve 71R, and is configured as a two-position switching valve shiftable based on magnetization between a first position 72a and a second position 72b. The second switching valve 72, the first switching valve 71L and the first switching valve 71R are connected by a fluid line 41. The second switching valve 72, when set at the first position 72a, switches the first switching valve 71L and the first switching valve 71R to the first positions 71L1 and 71R1, and when set at the second position 72b, switches the first switching valve 71L and the first switching valve 71R to the second positions 71L2 and 71R2.

The traveling switching valve 34 is set in the first state to shift each of rotation speeds of the traveling motors (that is, the traveling motor 36L and the traveling motor 36R) to the first speed when the second switching valve 72 is set at the first position 72a, the first switching valve 71L is set at the first position 71L1, and the first switching valve 71R is set at the first position 71R1. The traveling switching valve 34 is set in the second state to shift each of rotation speeds of the traveling motors (that is, the traveling motor 36L and the traveling motor 36R) to the second speed when the second switching valve 72 is set at the second position 72b, the first switching valve 71L is set at the second position 71L2, and the first switching valve 71R is set at the second position 71R2.

Accordingly, due to the traveling switching valve 34, the traveling motors (that is, the traveling motor 36L and the traveling motor 36R) are set at a speed stage shiftable between the first speed that is the low speed stage and the second speed that is the high speed stage.

An operation device (that is, a traveling operating device) 54 is configured to apply operation fluid to the pressure-receiving portions 53a and 53b of the traveling pumps (that is, the left traveling pump 53L and the right traveling pump 53R) when a traveling operation member 59 is operated, and is capable of changing the angles of swash plates (referred to as swash plate angles) of the traveling pumps 53L and 53R. The operation device 54 includes the traveling operation member 59 and a plurality of operation valves 55.

The traveling operation member 59 is an operation lever that is supported on the operation valves 55 and swings in a lateral direction (that is, the machine width direction) or the fore-and-aft direction. The traveling operation member 59 is operable to the right and to the left from a neutral position N, and to the front and to the rear from the neutral position N. In other words, the traveling operation member 59 is swingable in at least four directions from the neutral position N. For convenience of explanation, the forward and backward directions, that is, the fore-and-aft directions, may be referred to as first directions. The rightward and leftward directions, that is, the lateral directions (that is, the machine width directions), are may be referred to as second directions.

The plurality of operation valves 55 are operated by the common, i.e., single, traveling operation member 59. The plurality of operation valves 55 are actuated according to swinging of the traveling operation member 59. A delivery fluid line 40 is connected to the plurality of operation valves 55, so that operation fluid (that is, pilot fluid) from the first hydraulic pump P1 can be supplied to the operation valves 55 through the output fluid line 40. The plurality of operation valves 55 include an operation valve 55A, operation valve 55B, operation valve 55C, and operation valve 55D.

When the traveling operation member 59 is swung forward (that is, in one of the fore-and-aft directions (or in one of the first directions)), i.e., when a forward operation is performed, the operation valve 55A outputs operation fluid having a pressure variable according to an operation amount (operation) of the forward operation. When the traveling operation member 59 is swung backward (that is, in the other of the fore-and-aft directions (or in the other of the first directions)), i.e., when a backward operation is performed, the operation valve 55B outputs operation fluid having a pressure variable according to an operation amount (operation) of the backward operation. When the traveling operation member 59 is swung rightward (that is, in one of the lateral directions (or in one of the second directions)), i.e., when a rightward operation is performed, the operation valve 55C outputs operation fluid having a pressure variable according to an operation amount (operation) of the rightward operation. When the traveling operation member 59 is swung leftward (that is, in the other of the lateral directions (or in the other of the second directions)), i.e., when a leftward operation is performed, the operation valve 55D outputs operation fluid having a pressure variable according to an operation amount (operation) of the leftward operation.

The plurality of operation valves 55 are connected to the traveling pumps (the traveling pump 53L and the traveling pump 53R) by the traveling fluid line 45. In other words, the traveling pumps (the traveling pump 53L and the traveling pump 53R) are hydraulic equipment that are configured to be operated by operation fluid output from the operation valves 55 (that is, the operation valve 55A, operation valve 55B, operation valve 55C, and operation valve 55D).

The traveling fluid line 45 includes a first traveling fluid line 45a, a second traveling fluid line 45b, a third traveling fluid line 45c, a fourth traveling fluid line 45d, and a fifth traveling fluid line 45e. The first traveling fluid line 45a is a fluid line connected to the pressure-receiving portion (referred to as a first pressure-receiving portion) 53a of the left traveling pump 53L, and is a fluid line through which operation fluid to be applied to the pressure-receiving portion (the first pressure-receiving portion) 53a flows when the traveling operation member 59 is operated. The second traveling fluid line 45b is a fluid line connected to the pressure-receiving portion (referred to as a second pressure-receiving portion) 53b of the left traveling pump 53L, and is a fluid line through which operation fluid to be applied to the pressure-receiving portion (the second pressure-receiving portion) 53b flows when the traveling operation member 59 is operated. The third traveling fluid line 45c is a fluid line connected to the pressure-receiving portion (referred to as a third pressure-receiving portion) 53a of the right traveling pump 53R, and is a fluid line through which operation fluid to be applied to the pressure-receiving portion (the third pressure-receiving portion) 53a flows when the traveling operation member 59 is operated. The fourth traveling fluid line 45d is a fluid line connected to the pressure-receiving portion (referred to as a fourth pressure-receiving portion) 53b of the right traveling pump 53R, and is a fluid line through which operation fluid to be applied to the pressure-receiving portion (the fourth pressure-receiving portion) 53b flows when the traveling operation member 59 is operated. The fifth traveling fluid line 45e is a fluid line that connects the operation valves 55 to the first traveling fluid line 45a, the second traveling fluid line 45b, the third traveling fluid line 45c, and the fourth traveling fluid line 45d.

Figure 2:
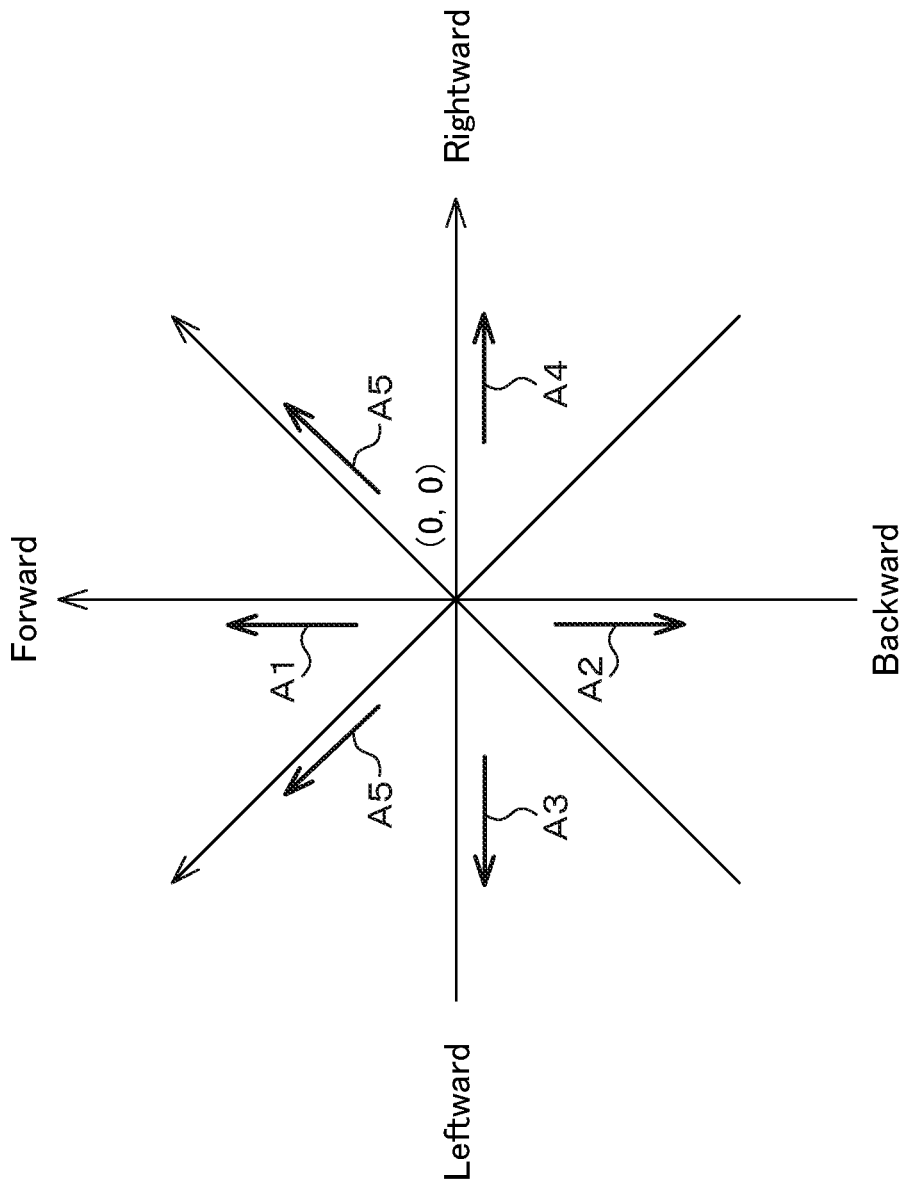
FIG. 2 is a view showing an operational direction of a traveling operation member according to the first embodiment.

When the traveling operation member 59 is swung forward (in a direction indicated by an arrowed line A1 in FIGS. 1 and 2), the operation valve 55A is operated to output a pilot pressure therefrom. This pilot pressure is applied to the pressure-receiving portion 53a of the left traveling pump 53L via the first traveling fluid line 45a and to the pressure-receiving portion 53a of the right traveling pump 53R via the third traveling fluid line 45c. In this manner, the swash plate angles of the left traveling pump 53L and the right traveling pump 53R are changed to rotate the left traveling motor 36L and the right traveling motor 36R forwardly (referred to as forward rotation), whereby the working machine 1 travels straight forward.

When the traveling operation member 59 is swung backward (in a direction indicated by an arrowed line A2 in FIGS. 1 and 2), the operation valve 55B is operated to output a pilot pressure therefrom. This pilot pressure is applied to the pressure-receiving portion 53b of the left traveling pump 53L via the second traveling fluid line 45b and to the pressure-receiving portion 53b of the right traveling pump 53R via the fourth traveling fluid line 45d. In this manner, the swash plate angles of the left traveling pump 53L and the right traveling pump 53R are changed to rotate the left traveling motor 36L and the right traveling motor 36R reversely (referred to as backward rotation), whereby the working machine 1 travels straight backward.

When the traveling control member 59 is swung to the right (in a direction indicated by an arrowed line A3 in FIGS. 1 and 2), the control valve 55C is operated to output a pilot pressure therefrom. This pilot pressure is applied to the pressure-receiving portion 53a of the left traveling pump 53L via the first traveling fluid line 45a, and to the pressure-receiving portion 53b of the right traveling pump 53R via the fourth traveling fluid line 45d. In this manner, the swash plate angles of the left traveling pump 53L and the right traveling pump 53R are changed to rotate the left traveling motor 36L forwardly, and to rotate the right traveling motor 36R reversely, whereby the working machine 1 spins to turn (spin-turns) rightward.

When the traveling control member 59 is swung to the left (in a direction indicated by an arrowed line A4 in FIGS. 1 and 2), the control valve 55D is operated to output a pilot pressure therefrom. This pilot pressure is applied to the pressure-receiving portion 53a of the right traveling pump 53R via the third traveling fluid line 45c, and to the pressure-receiving portion 53b of the left traveling pump 53L via the second traveling fluid line 45b. In this manner, the swash plate angles of the left traveling pump 53L and the right traveling pump 53R are changed to rotate the left traveling motor 36L reversely, and to rotate the right traveling motor 36R forwardly, whereby the working machine 1 spins to turn (spin-turns) leftward.

When the traveling operation member 59 is swung in an oblique direction (in a direction indicated by an arrowed line A5 in FIG. 2), rotation directions and rotation speeds of the left traveling motor 36L and the right traveling motor 36R are determined by a differential pressure between the pilot pressures applied to the pressure receiving portion 53a and the pressure receiving portion 53b, so that the working machine 1 pivots to turn rightward or leftward while traveling forward or backward.

That is, when the traveling operation member 59 is swung in a forwardly leftward oblique direction, the working machine 1 turns to the left while traveling forward at a speed corresponding to the swing angle of the traveling operation member 59. When the traveling operation member 59 is swung in a forwardly rightward oblique direction, the working machine 1 turns to the right while traveling forward at a speed corresponding to the swing angle of the traveling operation member 59. When the traveling operation member 59 is swung in a backwardly leftward oblique direction, the working machine 1 turns to the left while traveling backward at a speed corresponding to the swing angle of the traveling operation member 59. When the traveling operation member 59 is swung in a backwardly rightward oblique direction, the working machine 1 turns to the right while traveling backward at a speed corresponding to the swing angle of the traveling operation member 59.

As shown in FIG. 1, the working machine 1 has a controller 60. The controller 60 performs various controls of the working machine 1 and includes a semiconductor such as a CPU or an MPU, an electrical and electronic circuit, or/and the like. An accelerator 65, a mode switch 66, a speed changer switch 67, and a plurality of rotation detectors 68 are connected to the controller 60.

The mode switch 66 is a switch configured to enable or disable automatic deceleration. For example, the mode switch 66 is a switch capable of being switched ON and OFF, so that the mode switch 66, when switched ON, enables the automatic deceleration operation, and when switched OFF, the mode switch 66 disables the automatic deceleration operation.

The speed changer switch 67 is provided in the vicinity of the driver seat 8 and can be operated by a driver (an operator). The speed changer switch 67 is manually operable to selectively set the rotation speed stage of the traveling motors 36L and 36R (that is, the left traveling motor 36L and right traveling motor 36R) to either the first speed or the second speed. For example, the speed changer switch 67 is a seesaw switch shiftable between a first speed position and a second speed position, thereby selectively instructing either an accelerating operation to increase rotation speeds of the traveling motors 36L and 36R by shifting their speed stage from the first speed to the second speed or a decelerating operation to reduce rotation speeds of the traveling motors 36L and 36R by shifting their speed stage from the second speed to the first speed.

The rotation detectors 68 are constituted of sensors or the like configured to detect the rotation speed and are capable of detecting the prime mover rotation speed that is the rotation speed of the prime mover 32.

The controller 60 includes an automatic decelerator 61. The automatic decelerator 61 includes an electrical and electronic circuit or the like installed in the controller 60, a computer program stored in the controller 60, and/or the like.

The automatic decelerator 61 executes an automatic deceleration control when a traveling mode is executed and the automatic deceleration is enabled, and does not execute the automatic deceleration control when the traveling mode is executed and the automatic deceleration is disabled.

In the automatic deceleration control, in a state where the traveling motors (that is, the traveling motor 36L and the traveling motor 36R) are rotated at the second speed, the rotation speeds of the traveling motors (that is, the traveling motor 36L and the traveling motor 36R) are automatically reduced by shifting the speed stage from the second speed to the first speed when a predetermined condition (referred to as an automatic deceleration condition) is satisfied. In the automatic deceleration control, when the automatic deceleration condition is satisfied at least in a state where the traveling motors (that is, the left traveling motor 36L and the right traveling motor 36R) are rotated at the second speed, the controller 60 demagnetizes a solenoid of the second switching valve 72 to switch the second switching valve 72 from the second position 72b to the first position 72a so as to shift the speed stage from the second speed to the first speed, thereby reducing the rotation speeds of the traveling motor (that is, the left traveling motor 36L and the right traveling motor 36R). That is, in the automatic deceleration control, the controller 60 decelerates both the left traveling motor 36L and the right traveling motor 36R by shifting from the second speed to the first speed when the automatic deceleration is performed.

When a return condition is satisfied after the automatic deceleration is performed, the automatic decelerator 61 magnetizes a solenoid of the second switching valve 72 to switch the second switching valve 72 from the first position 72a to the second position 72b so as to shift the speed stage from the first speed to the second speed, thereby accelerating the traveling motors (that is, the left traveling motor 36L and the right traveling motor 36R), that is, restoring the preceding speed stage of the traveling motors. That is, the controller 60 accelerates both the left traveling motor 36L and the right traveling motor 36R by shifting the speed stage from the first speed to the second speed when returning from the first speed to the second speed.

When the automatic deceleration is disabled, the controller 60 performs a manual switching control to switch the speed stage of the traveling motors (that is, the left traveling motor 36L and the right traveling motor 36R) to either the first speed or the second speed according to an operation of the speed changer switch 67. In the manual switching control, when the speed changer switch 67 is switched to the first speed position, the solenoid of the second switching valve 72 is demagnetized to set the speed stage of the traveling motors (that is, the left traveling motor 36L and the right traveling motor 36R) to the first speed. In the manual switching control, when the speed changer switch 67 is switched to the second speed position, the speed stage of the traveling motors (that is, the left traveling motor 36L and the right traveling motor 36R) is set to the second speed by demagnetizing the solenoid of the second switching valve 72.

In addition, the controller 60 is connected to an imaging device 81 that captures surroundings of the working machine 1, and an informing device 82 that informs of a traveling direction of the working machine 1.

Now, a hydraulic system for the working machine is capable of judging an operation area (operation region) of the traveling operation member 59 based on pressures (pilot pressures) of the operation fluid acting on the traveling fluid lines 45 (first traveling fluid line 45a, second traveling fluid line 45b, third traveling fluid line 45c, and fourth traveling fluid line 45d).

First, detection of the pilot pressures will be described.

As shown in FIG. 1, a first pressure detector 48a is connected to the first traveling fluid line 45a, the first pressure detector 48a being capable of detecting a first pilot pressure lf that is a pressure of the operation fluid in the first traveling fluid line 45a. A second pressure detector 48b is connected to the second traveling fluid line 45b, the second pressure detector 48b being capable of detecting a second pilot pressure lb that is a pressure of the operation fluid in the second traveling fluid line 45b. A third pressure detector 48c is connected to the third traveling fluid line 45c, the third pressure detector 48c being capable of detecting a third pilot pressure rf that is a pressure of the operation fluid in the third traveling fluid line 45c. A fourth pressure detector 48d is connected to the fourth traveling fluid line 45d, the fourth pressure detector 48d being capable of detecting a fourth pilot pressure rb that is a pressure of the operation fluid in the fourth traveling fluid line 45d. The first pressure detector 48a, the second pressure detector 48b, the third pressure detector 48c, and the fourth pressure detector 48d are connected to the controller 60.

In the traveling fluid line 45, throttle portions 95a, 95b, 95c, and 95d are provided downstream from the first pressure detector 48a, the second pressure detector 48b, the third pressure detector 48c, and the fourth pressure detector 48d. Specifically, the throttle portion 95a is provided downstream from the first pressure detector 48a (on a traveling pump side) in the first traveling fluid line 45a, and the throttle portion 95b is provided downstream from the second pressure detector 48b (on a traveling pump side) in the second traveling fluid line 45b. And, the throttle portion 95c is provided downstream from the third pressure detector 48c (on a traveling pump side) in the third traveling fluid line 45c, and the throttle portion 95d is provided downstream from the fourth pressure detector 48d (on a traveling pump side) in the fourth traveling fluid line 45d. In other words, the first pressure detector 48a, the second pressure detector 48b, the third pressure detector 48c, and the fourth pressure detector 48d are provided upstream (on the operation valve 55 side) of the throttle portions 95a, 95b, 95c, and 95d. Accordingly, the pilot pressures output from the operating device 54 can be accurately detected by the first pressure detector 48a, the second pressure detector 48b, the third pressure detector 48c, and the fourth pressure detector 48d.

Figure 3B:
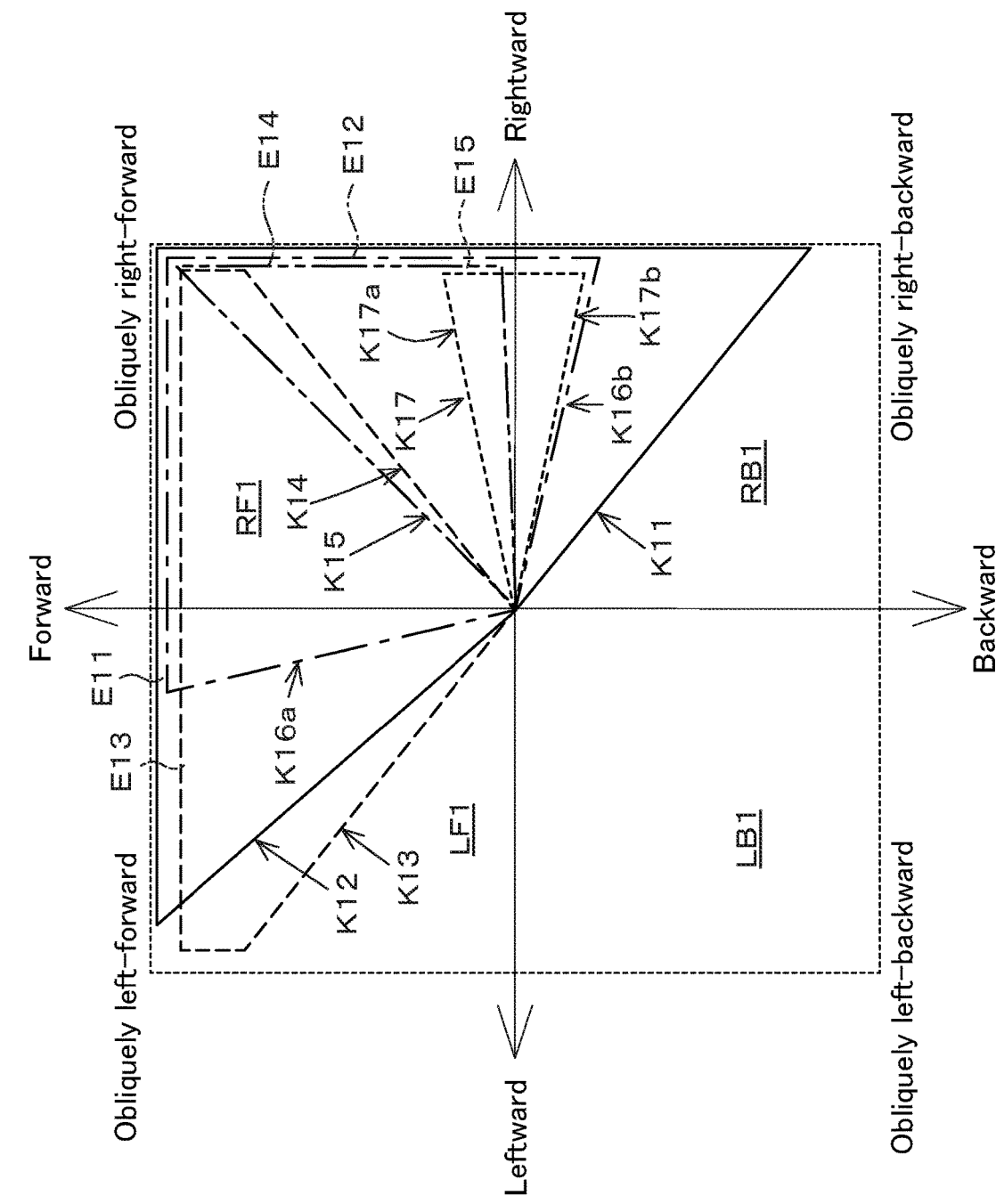
FIG. 3B is a view showing an operation area for a rightward operation of the traveling operation member according to the first embodiment.

FIGS. 3A and 3B are views showing the operation areas of the traveling operation member 59. As shown in FIGS. 3A and 3B, the operation areas of the traveling operation member 59 can be divided according to the operation of the traveling operation member 59. When a reference axis defined when the traveling operation member 59 is swung forward or backward is a Y-axis, and a reference axis defined when the traveling operation member 59 is swung leftward or rightward is an X-axis, the operation areas of the traveling operation member 59 can be divided into the following four quadrants: a left-front operation area LF1, a right-front operation area RF1, the left-rear operation area LB1, and the right-rear operation area RB1. In the present embodiment, as shown in FIGS. 3A and 3B, based on the pilot pressures [the first pilot pressure lf, second pilot pressure lb, third pilot pressure rf, and fourth pilot pressure rb] that vary according to the operation of the traveling operation member 59, it can be judged whether an operational position of the traveling operation member 59 is within the areas E1 to E5 or areas E11 to E15.

Figure 4A:
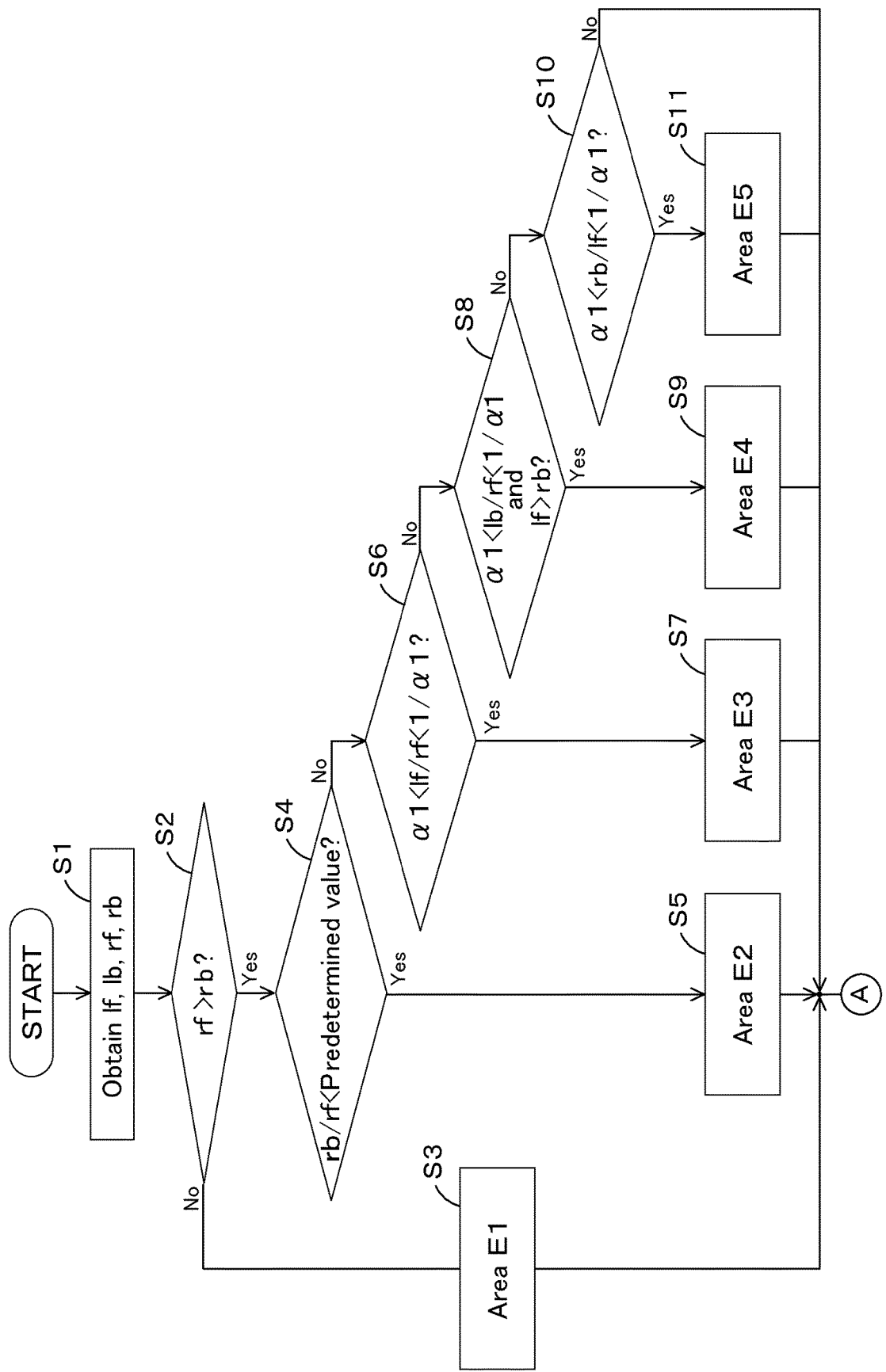
FIG. 4A is a view showing a flowchart of an operation for judging an operation region (operation area) according to the first embodiment.

FIGS. 4A and 4B show an operation flow for judging the operation areas of the operation member 69 based on the pilot pressures [the first pilot pressure lf, second pilot pressure lb, third pilot pressure rf, and fourth pilot pressure rb].

Next, based on FIGS. 3A and 4A, an operation system for the leftward direction will be described in detail.

As shown in FIG. 4A, the controller 60 obtains the first pilot pressure lf, the second pilot pressure lb, the third pilot pressure rf, and the fourth pilot pressure rb (step S1). The controller 60 judges whether the third pilot pressure rf is higher than the fourth pilot pressure rb (step S2). When the third pilot pressure rf is not higher than the fourth pilot pressure rb (step S2, No), the controller 60 determines that an operational position of the traveling operation member 59 is within the area E1 (step S3), as shown in FIG. 3A.

The area E1 includes the left-front operation area LF1, a left side area bounded by a line K1 within the left-rear operation area LB1, and a left side area bounded by a line K2 within the right-front operation area RF1. In more detail, the left side area of the left-rear operation area LB1 is an area that is positioned to the left when the left-rear operation area LB1 is divided into two by the oblique line K1. The line K1 is a line that extends from a center position indicating a neutral position toward the left-rear direction (the third quadrant) and tilts at substantially 45 degrees (deg). The left side area of the right-front operation area RF1 is an area that is positioned to the left when the right-front operation area RF1 is divided into two by the oblique line K2. The line K2 is a line that extends from the center position toward the right-front direction (the first quadrant) and tilts at a substantially 45 degrees (deg).

When the third pilot pressure rf is higher than the fourth pilot pressure rb (step S2, Yes), the controller 60 judges whether a first ratio rb/rf of the fourth pilot pressure rb to the third pilot pressure rf is less than a predetermined value (step S4). When the first ratio rb/rf of the fourth pilot pressure rb to the third pilot pressure rf is less than the predetermined value (step S4, Yes), the controller 60 determines that at least the operational position of the traveling operation member 59 is within the area E2, as shown in FIG. 3A (step S5).

The area E2 is an area that includes the entire left-front operation area LF1, a part of the left portion of the right-front operation area RF1 with a line K6a as a boundary, and a part of the left-rear operation area LB1 with line K6b as a boundary.

When the first ratio rb/rf is not less than the predetermined value (step S4, No), the controller 60 judges whether a second ratio lf/rf of the first pilot pressure if to the third pilot pressure rf is within a predetermined range (step S6). That is, the controller 60 judges whether or not a inequality "α1<lf/rf<(1/α1)" is satisfied, and when satisfied, determines that the second ratio lf/rf is within the predetermined range.

When the second ratio lf/rf is within the predetermined range (step S6, Yes), the controller 60 determines that the operational position of the traveling operation member 59 is within the area E3, as shown in FIG. 3A (step S7).

The area E3 includes a right area bounded by the oblique line K3 in the left-front operation area LF1 and a left area bounded by the oblique line K4 in the right-front operation area RF1. In more detail, the right area of the left-front operation area LF1 is an area positioned to the right when the left-front operation area LF1 is divided into two by line K3. The line K2 is a line that extends from the center position toward the left front direction (the second quadrant) and tilts at substantially 45 degrees (deg). The left area of the right-front operation area RF1 is an area positioned to the left when the right-front operation area RF1 is divided into two by the oblique line K4. The line K4 is a line that extends from the center position toward the left front direction (the first quadrant) and tilts at substantially 45 degrees (deg).

When the second ratio lf/rf is not within the predetermined range (step S6, No), the controller 60 judges whether a third ratio lb/rf of the second pilot pressure lb to the third pilot pressure rf is within the predetermined range and the first pilot pressure lf is higher than the fourth pilot pressure rb (step S8). That is, the controller 60 judges whether or not an inequality "α1<rf/lb<(1/α1)" is satisfied, and when satisfied, determines that the third ratio lb/rf is within the predetermined range.

When the third ratio lb/rf is within the predetermined range and the first pilot pressure lf is higher than the fourth pilot pressure rb (step S8, Yes), the controller 60 determines that the operational position of the operation member 59 is within the area E4 (step S9), as shown in FIG. 3A.

The area E4 is a left side area bounded by a line K5 in the left-front operation area LF1. In more detail, the left side area of the left-front operation area LF1 is an area positioned to the left when the left-front operation area LF1 is divided into two by the oblique line K5. The line K5 is a line that extends from the center position toward the right front direction (the first quadrant) and tilts at substantially 45 degrees (deg).

When the third ratio lb/rf is within the predetermined range and the first pilot pressure lf is not higher than the fourth pilot pressure rb (step S8, No), the controller 60 judges whether the fourth ratio rb/lf of the fourth pilot pressure to the first pilot pressure is within the predetermined range (step S10). That is, the controller 60 judges whether or not an inequality "α1<rb/lf<(1/α1)" is satisfied, and when satisfied, determines that the fourth ratio rb/lf is within the predetermined range.

When the fourth ratio rb/lf is within the predetermined range (step S10, Yes), the controller 60 determines that the operational position of the operation member 59 is within the area E5, as shown in FIG. 3A (step S11). The area E5 includes a part of the left side area in the left-front operation area LF1 and a part of the left side area in the left-rear operation area LB1.

That is, the area E5 is an area consisting of a part of the area bounded by line K7a in the left-front operation area LF1 and a part of the area bounded by line K7b in the left-rear operation area LB1. The area E5 is also referred to as a left operation area. That is, the controller 60 determines that the operational position of the operation member 59 is within the left operation area based on the fourth ratio rb/lf.

When the fourth ratio rb/lf is not within the predetermined range (step S10, No), the controller 60 proceeds to a process shown in FIG. 4B.

Next, based on FIGS. 3B and 4B, an operation system for the rightward direction will be described in detail.

As shown in FIG. 4B, the controller 60 judges whether the first pilot pressure lf is higher than the second pilot pressure lb (step S12). The controller 60 judges whether the first pilot pressure lf is higher than the second pilot pressure lb (step S12).

When the first pilot pressure lf is higher than the second pilot pressure lb (step S12, Yes), the controller 60 determines that the operational position of the traveling operation member 59 is within the area E11, as shown in FIG. 3B (step S13).

The area E11 includes the right-front operation area RF1, a right side area bounded by a line K11 in the right-rear operation area RB1, and a right side area bounded by a line K12 in the left-front operation area LF1. The right side area of the right-rear operation area RB1 is an area positioned to the right when the right-rear operation area RB1 is divided into two by line K11. The line K1l is a line that extends from the center position toward the right rear direction (the fourth quadrant) and tilts at substantially 45 degrees (deg). The right side area of the left-front operation area is an area positioned to the right when the left-front operation area LF1 is divided into two by the oblique line K12. The line K12 is a line that extends from the center position toward the left front direction (the second quadrant) and tilts at substantially 45 degrees (deg).

When the first pilot pressure lf is not higher than the second pilot pressure lb (step S12, No), the controller 60 judges whether a fifth ratio lb/lf of the second pilot pressure lb to the first pilot pressure lf is less than a predetermined value (step S14). When the fifth ratio lb/lf is less than the predetermined value (step S14, Yes), the controller 60 determines that the operational position of the traveling operation member 59 is at least within the area E12, as shown in FIG. 3B (step S15).

The area E12 is an area that includes the entire right-front operation area RF1, and includes a part of the left side of the left-front operation area LF1 with a line K16a as a boundary and a part of the right-rear operation area RB1 with a line K16b as a boundary.

When the fifth ratio lb/lf is not less than the predetermined value (step S14, No), the controller 60 judges whether a sixth ratio rf/lf of the third pilot pressure rf to the first pilot pressure lf is within a predetermined range (step S16). That is, the controller 60 determines whether or not an inequality "$\alpha 1 < rf/lf < (1/\alpha 1)$" is satisfied, and when satisfied, determines that the sixth ratio rf/lf is within the predetermined range.

When the sixth ratio rf/lf is within the predetermined range (step S16, Yes), the controller 60 determines that the operational position of the traveling operation member 59 is within the area E13, as shown in FIG. 3B (step S17). The area E13 includes a right side area bounded by a line K13 in the left-front operation area LF1 and a left side area bounded by a line K14 in the right-front operation area RF1. In more detail, the right side area of the left-front operation area LF1 is an area positioned to the right when the left-front operation area LF1 is divided into two by the oblique line K13. The line K13 is a line that extends from the center position toward the left front direction (the second quadrant) and tilts at substantially 45 degrees (deg). The left side area of the right-front operation area RF1 is an area positioned to the left when the right-front operation area RF1 is divided into two by the oblique line K14. The line K14 is a line that extends from the center position toward the right front direction (the first quadrant) and tilts at substantially 45 degrees (deg).

When the sixth ratio rf/lf is not within the predetermined range (step S16, No), the controller 60 judges whether a seventh ratio rb/lf of the fourth pilot pressure rb to the first pilot pressure lf is within a predetermined range and the third pilot pressure rf is higher than the second pressure lb (step S18). That is, the controller 60 judges whether or not an inequality "$\alpha 1 < rb/lf < (1/\alpha 1)$" is satisfied, and when satisfied, determines that the seventh ratio rb/lf is within the predetermined range.

When the seventh ratio rb/lb is within the predetermined range and the third pilot pressure rf is higher than the second pilot pressure lb (step S18, Yes), the controller 60 determines that the operational position of the operation member 59 is within the area E14 (step S19), as shown in FIG. 3B.

The area E14 is a right side area bounded by a line K15 in the right-front operation area RF1. In more detail, the left side area of the right-front operation area RF1 is an area positioned to the right when the right-front operation area RF1 is divided into two by the oblique line K15. The line K15 is a line that extends from the center position toward the right front direction (the first quadrant) and tilts at substantially 45 degrees (deg).

When the seventh ratio rb/lf is within a predetermined range and the third pilot pressure rf is not higher than the second pilot pressure lb (step S18, No), the controller 60 determines whether an eighth ratio lb/rf of the second pilot pressure lb to the third pilot pressure rf is within a predetermined range (step S20). That is, the controller 60 judges whether or not an inequality "$\alpha 1 < lb/rf < (1/\alpha 1)$" is satisfied, and when satisfied, determines that the eighth ratio lb/rf is within the predetermined range.

When the eighth ratio lb/rf is within the predetermined range (step S20, Yes), the controller 60 determines that the operational position of the operation member 59 is within the area E15, as shown in FIG. 3B (step S21). The area E15 includes a part of the right side area in the right-front operation area RF1 and a part of the right side area in the right-rear operation area RB1. That is, the area E15 is an area consisting of a part of the right-front operation area RF1 bounded by a line K17a and a part of the right-rear operation area RB1 bounded by a line K17b. The area E15 is also referred to as a right operation area. That is, the controller 60 judges whether the operational position of the operation member 59 is within the right operation area based on the eighth ratio lb/rf.

Figure 5:
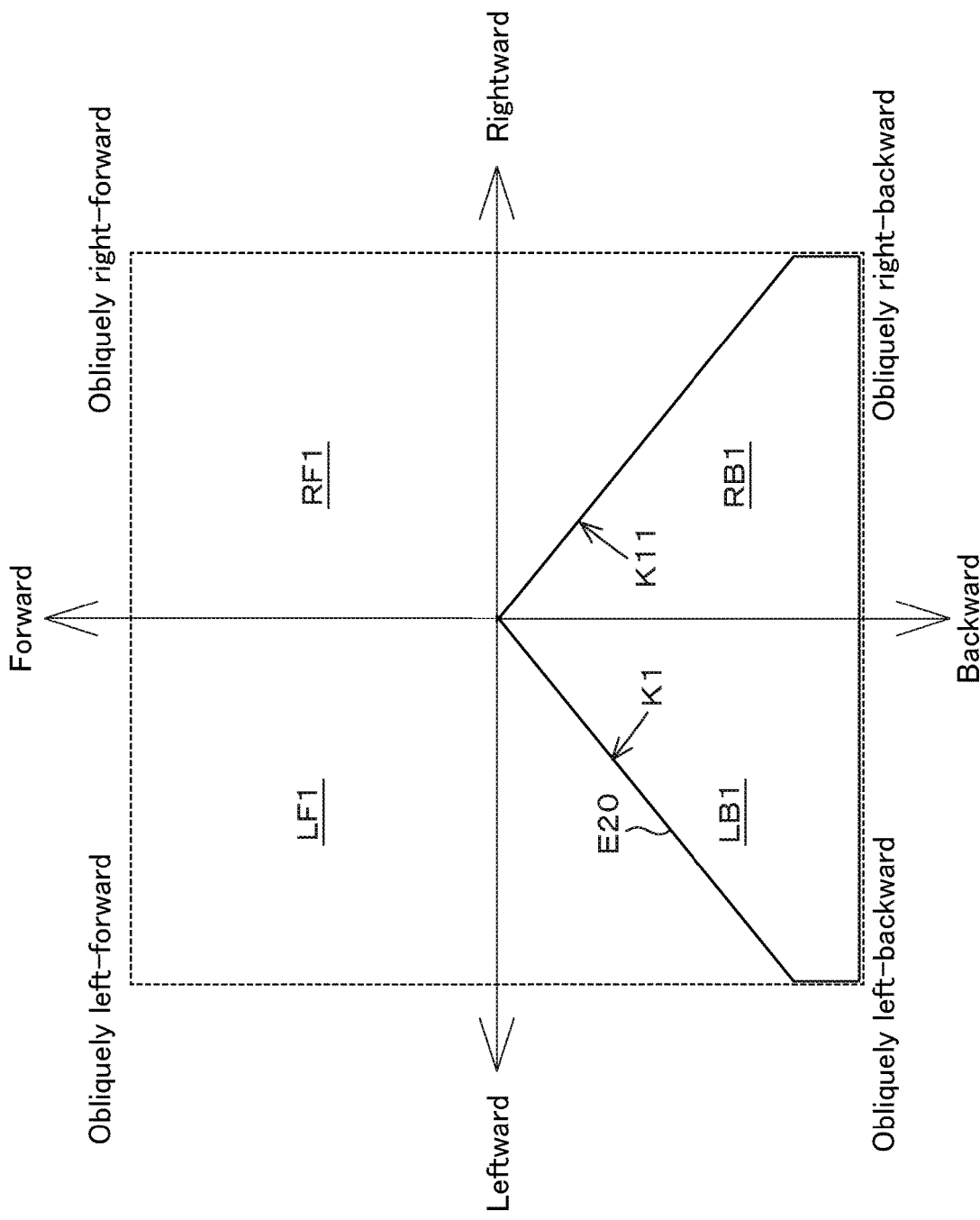
FIG. 5 is a view showing an operation area for a backward operation according to the first embodiment.

As shown in FIG. 5, when the third pilot pressure rf is not lower than the fourth pilot pressure rb and the first pilot pressure lf is lower than the second pilot pressure lb, the controller 60 determines that the operation position is in the right side area bounded by the oblique line K1 extending to a obliquely leftward direction from the neutral position in in the left-rear operation area LB1 and in the left side area bounded by the oblique line K11 extending a obliquely rightward direction from the neutral position in the right-rear operation area RB1.

In FIGS. 4A and 4B, when the third pilot pressure rf is not higher than the fourth pilot pressure rb (step S2, No) and the first pilot pressure lf is not higher than the second pilot pressure lb (step S12, No), the controller 60 determines that the operational position of the traveling operation member 59 is in an area E20, as shown in FIG. 5. The area E20 includes a right side area bounded by the oblique line K1 extending obliquely leftward from the neutral position in the left-rear operation area LB1 and a left side area bounded by a line extending obliquely rightward from the neutral position in the right-rear operation area RB1. Alternatively, the controller 60 also determines that the operation position is with in the area E20 in the case where the fourth ratio rb/lf is not within the predetermined range (step S10, No) and the eighth ratio lb/rf is not within the predetermined range (step S20, No). That is, when all the judgments in FIGS. 4A and 4B mentioned above are "No", the controller 60 determines that the operation position is within the area E20 that is the rear side area (step S22). In this manner, in addition to the cases where the third pilot pressure rf is not higher than the fourth pilot pressure rb (step S2, No) and the first pilot pressure lf is not higher than the second pilot pressure lb (step S12, No), the controller 60 determines that the operation position is within the area E20 also in the case where the fourth ratio rb/lf is not within the predetermined range (step S10, No) and the eighth ratio lb/rf is not within the predetermined range (step S20, No). That is, since the controller 60 determines that the operational position of the traveling operation member 59 is within the area E20 based on the plurality of conditions of steps S14, S16, S18 and S20 in addition to steps S2 and S20, the judgment accuracy can be improved.

The working machine 1 includes the machine body 2, the left traveling device 5L provided on a left portion of the machine body 2, the right traveling device 5R provided on a right portion of the machine body 2, the left traveling motor 36L configured to output power to the left traveling device 5L, the right traveling motor 36R configured to output power to the right traveling device 5R, the left traveling pump 53L to supply operation fluid to the left traveling motor 5L, the left traveling pump 53L including a first pressure receiving portion 53a and a second pressure receiving portion 53b so that the operation fluid is used to apply a pressure to at least one of the first and second pressure receiving portions 53a and 53b, the right traveling pump 53R to supply operation fluid supplied to the right traveling motor 36R, the right traveling pump 53R including the third pressure receiving portion 53a and the fourth pressure receiving portion 53b so that the operation fluid is used to apply a pressure to at least one of the third and fourth pressure receiving portions 53a and 53b, the traveling operation device 54 including the traveling operation member 59 operably movable from the neutral position to any one of the left-front operation area, the right-front operation area, the left-rear operation area and the right-rear operation area, the traveling operation device 54 being configured to apply the pressure of operation fluid to at least one of the first, second, third and fourth pressure receiving portions corresponding to an operational position of the traveling operation member 59 in any one of the left-front, right-front, left-rear and right-rear operation areas, the first traveling fluid line 45a connected to the first pressure receiving portion 53a, the operation fluid having a pressure applied to the first pressure receiving portion 53a being passed through the first traveling fluid line 45a according to operation of the traveling operation member 59, the second traveling fluid line 45b connected to the second pressure receiving portion 53b, the operation fluid having a pressure applied to the second pressure receiving portion 53b being passed through the second traveling fluid line 45b according to operation of the traveling operation member 59, the third traveling fluid line 45c connected to the third pressure receiving portion 53a, the operation fluid having a pressure applied to the third pressure receiving portion 53a being passed through the third traveling fluid line 45c according to operation of the traveling operation member 59, the fourth traveling fluid line 45d connected to the fourth pressure receiving portion 53b, the operation fluid having a pressure applied to the fourth pressure receiving portion 53b being passed through the fourth traveling fluid line 45d according to operation of the traveling operation member 59, the first pressure detector 48a configured to detect a first pilot pressure that is the pressure of operation fluid passed through the first traveling fluid line 45a, the a second pressure detector 48b configured to detect a second pilot pressure that is the pressure of operation fluid passed through the second traveling fluid line 45b, the third pressure detector 48c configured to detect a third pilot pressure that is the pressure of operation fluid passed through the third traveling fluid line 45c, the fourth pressure detector 48d configured to detect a fourth pilot pressure that is the pressure of operation fluid passed through the fourth traveling fluid line 45d, and the controller 60 configured or programed to judge in which of the left-front, right-front, left-rear and right-rear operation areas LF1, RF1, LB1, and RB1 an operational position of the traveling operation member exists. According to this configuration, it can be easily known in which of the left-front, right-front, left-rear and right-rear operation areas LF1, RF1, LB1, and RB1 the operational position of the traveling operation member exists, without using a potentiometer or the like.

When the third pilot pressure rf is higher than the fourth pilot pressure rb, the controller 60 is configured or programmed to consider the operational position of the traveling operation member 59 as existing in the left-front operation area LF1, the left side area in the left-rear operation area LB1 bordered by the oblique line K1 extending leftwardly rearward from the neutral position, or the left side area in the right-front operation area RF1 bounded by the oblique line K2 extending rightwardly forward from the neutral position. According to this configuration, it can be easily known that the operational position of the traveling operation member 59 is in the left-front operation area LF1, the left side area of the left-rear operation area LB1, or the left side area of the right-front operation area RF1.

The controller 60 is configured or programmed to consider the operational position of the traveling operation member 59 as existing at least in the left-front operation area LF1 when the first ratio of the fourth pilot pressure rb to the third pilot pressure rf is less than a predetermined value. According to this configuration, it can be easily known that the operational position of the traveling operation member 59 is in the left-front operation area LF1.

When the second ratio of the first pilot pressure lf to the third pilot pressure rf is within the predetermined range, the controller 60 is configured or programmed to consider the operational position of the traveling operation member 59 as existing in either the right side area in the left-front operation area LF1 bordered by the oblique line K3 extending leftwardly forward from the neutral position or the left side area in the right-front operation area RF1 bordered by the oblique line K4 extending rightwardly forward from the neutral position.

When the third ratio of the second pilot pressure lb to the third pilot pressure rf is within a predetermined range and the first pilot pressure lf is higher than the fourth pilot pressure rb, the controller 60 is configured or programmed to consider the operational position of the traveling operation member 59 as existing in the left side area in the left-front operation area LF1 bordered by the oblique line K5 extending leftwardly forward from the neutral position. According to this configuration, it can be easily known that the operational position of the traveling operation member 59 is within the left side area of the left-front operation area LF1.

When the fourth ratio of the fourth pilot pressure rb to the first pilot pressure lf is within a predetermined range, the controller 60 is configured or programmed to consider the operational position of the traveling operation member 59 as existing in either a part of the left side area in the left-front operation area LF1 or a part of the left side area in the left-rear operation area LB1. According to this configuration, it can be easily known that the operational position of the traveling operation member 59 exists in a leftward area including the part of the left side area in the left-front operation area LF1 and the part of the left side area in the left-rear operation area LB1.

When the first pilot pressure lf is higher than the second pilot pressure lb, the controller 60 is configured or programmed to consider the operational position of the traveling operation member 59 as existing in any one of the right-front operation area RF1, the right side area in the right-rear operation area RB1 bordered by the oblique line K11 extending rightwardly backward from the neutral position, and the right side area in the left-front operation area LF1 bordered by the oblique line K12 extending leftwardly forward from the neutral position. According to this configuration, it can be easily known that the operational position of the traveling operation member 59 is in any one of the right-front operation area RF1, the right side area of the right-rear operation area RB1, and the right side area of the left-front operation area LF1.

The controller 60 is configured or programmed to consider the operational position of the traveling operation member 59 as existing at least in the right-front operation area RF1 when the fifth ratio of the second pilot pressure lb to the first pilot pressure lf is less than a predetermined value. According to this configuration, it can be easily known that the operational position of the traveling operation member 59 is in the right-front operation area RF1.

When the sixth ratio of the third pilot pressure rf to the first pilot pressure lf is within the predetermined range, the controller 60 is configured or programmed to consider the operational position of the traveling operation member 59 as existing in either the right side area in the left-front operation area LF1 bordered by the oblique line K13 extending leftwardly forward from the neutral position or the left side area in the right-front operation area RF1 bordered by the oblique line K14 extending rightwardly forward from the neutral position. According to this configuration, it can be easily known that the operational position of the traveling operation member 59 is in either the right side area of the left-front operation area LF1 or the left side area of the right-front operation area RF1.

When the seventh ratio of the fourth pilot pressure rb to the first pilot pressure lf is within a predetermined range and the third pilot pressure rf is higher than the second pilot pressure lb, the controller 60 is configured or programmed to consider the operational position of the traveling operation member 59 as existing in the right side area in the right-front operation area RF1 bordered by the oblique line K15 extending rightwardly forward from the neutral position. According to this configuration, it can be easily known that the operational position of the traveling operation member 59 is in the right side area of the right-front operation area RF1.

When the eighth ratio of the second pilot pressure lb to the third pilot pressure rf is within a predetermined range, the controller 60 is configured or programmed to consider the operational position of the traveling operation member 59 as existing in either a part of the right side area in the right-front operation area RF1 or a part of the right side area in the right-rear operation area RB1. According to this configuration, it can be easily known that the operational position of the traveling operation member 59 exists in the rightward area including the part of the right side area in the right-front operation area RF1 and the part of the right side area in the right-rear operation area RB1.

When the third pilot pressure rf is lower than the fourth pilot pressure rb and the first pilot pressure lf is lower than the second pilot pressure lb, the controller 60 is configured or programmed to consider the operational position of the traveling operation member 59 as existing in the right side area in the left-rear operation area LB1 bordered by the oblique line K1 extending leftwardly rearward from the neutral position and in the left side area in the right-rear operation area RB1 bordered by the oblique line K11 extending rightwardly rearward from the neutral position. According to this configuration, it can be easily known that the operational position of the traveling operation member 59 is positioned in either the right side area of the left-rear operation area LB1 or the left side area of the right-rear operation area RB1. In other words, it can be easily known that the operational position of the traveling operation member 59 exists rearward of the neutral position as the center.

The working machine 1 includes the imaging device 81 capable of capturing surroundings of the machine body 2 and the display device 77. The controller 60 judges, according to the operational position of the traveling operation member 59, whether or not to display the image captured by the imaging device 81 on the display device 77. According to this configuration, the captured image can be displayed as necessary when the position of the operation member 59 is in each of the left-front operation area LF1, the right-front operation area RF1, the left-rear operation area LB1, and the right-rear operation area RB1.

The controller 60 outputs information according to the operational position of the traveling operation member 59. According to this configuration, the information can be output as necessary when the position of the operation member 59 is in each of the left-front operation area LF1, the right-front operation area RF1, the left-rear operation area LB1, and the right-rear operation area RB1.

When the fourth ratio of the fourth pilot pressure to the first pilot pressure is out of a predetermined range and the eighth ratio of the second pilot pressure to the third pilot pressure is out of the predetermined range, the controller 60 is configured or programmed to consider the operational position of the traveling operation member 59 as existing in an area including the right side area in the left-rear operation area LB1 bordered by the oblique line extending leftwardly rearward from the neutral position and the left side area in the right-rear operation area RB1 bordered by the oblique line extending rightwardly rearward from the neutral position. According to this configuration, it can be easily known that the operational position of the traveling operation member 59 is positioned in the right side area and the left side area.

When the fourth ratio of the fourth pilot pressure to the first pilot pressure is within a predetermined range, the controller 60 is configured or programmed to consider the operational position of the traveling operation member 59 as existing in either a part of the left side area in the left-front operation area LF1 or a part of the left side area in the left-rear operation area LB1. According to this configuration, it can be known that the operational position of the traveling operation member 59 is positioned in a part of the left side area.

When the eighth ratio of the second pilot pressure to the third pilot pressure is within a predetermined range, the controller 60 is configured or programmed to consider the operational position of the traveling operation member 59 as existing in either a part of the right side area in the right-front operation area RF1 or a part of the right side area in the right-rear operation area RB1. According to this configuration, it can be known that the operational position of the traveling operation member 59 is provided in a part of the right side area.

The working machine 1 includes the machine body 2, the left traveling device 5L provided on a left portion of the machine body 2, the right traveling device 5R provided on a right portion of the machine body 2, the left traveling motor 36L configured to output power to the left traveling device 5L, the right traveling motor 36R configured to output power to the right traveling device 5R, the left traveling pump 53L to supply operation fluid to the left traveling motor 5L, the left traveling pump 53L including a first pressure receiving portion 53a and a second pressure receiving portion 53b so that the operation fluid is used to apply a pressure to at least one of the first and second pressure receiving portions 53a and 53b, the right traveling pump 53R to supply operation fluid to the right traveling motor 36R, the right traveling pump 53R including the third pressure receiving portion 53a and the fourth pressure receiving portion 53b so that the operation fluid is used to apply a pressure to at least one of the third and fourth pressure receiving portions 53a and 53b, the traveling operation device 54 configured to apply the pressure of operation fluid to at least one of the first, second, third and fourth pressure receiving portions according to operation of the traveling operation member 59, the first traveling fluid line 45a connected to the first pressure receiving portion 53a, the operation fluid having a pressure applied to the first pressure receiving portion 53a being passed through the first traveling fluid line 45a according to operation of the traveling operation member 59, the second traveling fluid line 45b connected to the second pressure receiving portion 53b, the operation fluid having a pressure applied to the second pressure receiving portion 53b being passed through the second traveling fluid line 45b according to operation of the traveling operation member 59, the third traveling fluid line 45c connected to the third pressure receiving portion 53a, the operation fluid having a pressure applied to the third pressure receiving portion 53a being passed through the third traveling fluid line 45c according to operation of the traveling operation member 59, the fourth traveling fluid line 45d connected to the fourth pressure receiving portion 53b, the operation fluid having a pressure applied to the fourth pressure receiving portion 53b being passed through the fourth traveling fluid line 45d according to operation of the traveling operation member 59, the first pressure detector 48a configured to detect a first pilot pressure that is the pressure of operation fluid passed through the first traveling fluid line 45a, the a second pressure detector 48b configured to detect a second pilot pressure that is the pressure of operation fluid passed through the second traveling fluid line 45b, the third pressure detector 48c configured to detect a third pilot pressure that is the pressure of operation fluid passed through the third traveling fluid line 45c, the fourth pressure detector 48d configured to detect a fourth pilot pressure that is the pressure of operation fluid passed through the fourth traveling fluid line 45d, and the controller 60 configured or programmed to judge, based on the first pilot pressure lf, the second pilot pressure lb, the third pilot pressure rf, and the fourth pilot pressure rb, whether an operational position of the traveling operation member 59 exists in the left operation area E5 or not. According to this configuration, it can be easily known whether the operational position of the traveling operation member 59 is in the left operation area E5 by simply detecting the pilot pressures, without using a potentiometer or the like.

When the fourth ratio of the fourth pilot pressure to the first pilot pressure is within a predetermined range, the controller 60 is configured or programmed to consider the operational position of the traveling operation member 59 as existing in the left operation area E5. According to this configuration, it can be known that the operational position of the traveling operation member 59 exists in the left operation area E5.

The working machine 1 includes the machine body 2, the left traveling device 5L provided on a left portion of the machine body 2, the right traveling device 5R provided on a right portion of the machine body 2, the left traveling motor 36L configured to output power to the left traveling deviceSL, the right traveling motor 36R configured to output power to the right traveling device 5R, the left traveling pump 53L to supply operation fluid to the left traveling motor 5L, the left traveling pump 53L including a first pressure receiving portion 53a and a second pressure receiving portion 53b so that the operation fluid is used to apply a pressure to at least one of the first and second pressure receiving portions 53a and 53b, the right traveling pump 53R to supply operation fluid to the right traveling motor 36R, the right traveling pump 53R including the third pressure receiving portion 53a and the fourth pressure receiving portion 53b so that the operation fluid is used to apply a pressure to at least one of the third and fourth pressure receiving portions 53a and 53b, the traveling operation device 54 configured to apply the pressure of operation fluid to at least one of the first, second, third and fourth pressure receiving portions according to operation of the traveling operation member 59, the first traveling fluid line 45a connected to the first pressure receiving portion 53a, the operation fluid having a pressure applied to the first pressure receiving portion 53a being passed through the first traveling fluid line 45a according to operation of the traveling operation member 59, the second traveling fluid line 45b connected to the second pressure receiving portion 53b, the operation fluid having a pressure applied to the second pressure receiving portion 53b being passed through the second traveling fluid line 45b according to operation of the traveling operation member 59, the third traveling fluid line 45c connected to the third pressure receiving portion 53a, the operation fluid having a pressure applied to the third pressure receiving portion 53a being passed through the third traveling fluid line 45c according to operation of the traveling operation member 59, the fourth traveling fluid line 45d connected to the fourth pressure receiving portion 53b, the operation fluid having a pressure applied to the fourth pressure receiving portion 53b being passed through the fourth traveling fluid line 45d according to operation of the traveling operation member 59, the first pressure detector 48a configured to detect a first pilot pressure that is the pressure of operation fluid passed through the first traveling fluid line 45a, the a second pressure detector 48b configured to detect a second pilot pressure that is the pressure of operation fluid passed through the second traveling fluid line 45b, the third pressure detector 48c configured to detect a third pilot pressure that is the pressure of operation fluid passed through the third traveling fluid line 45c, the fourth pressure detector 48d configured to detect a fourth pilot pressure that is the pressure of operation fluid passed through the fourth traveling fluid line 45d, and the controller 60 to judge, based on the first pilot pressure lf, the second pilot pressure lb, the third pilot pressure rf, and the fourth pilot pressure rb, whether an operational position of the traveling operation member 59 exists in the right operation area E15 or not. According to this configuration, it can be easily known whether the operational position of the traveling operation member 59 is in the right operation area E15 simply by detecting the pilot pressures, without using a potentiometer or the like.

When the eighth ratio of the second pilot pressure to the third pilot pressure is within a predetermined range, the controller 60 is configured or programmed to consider the operational position of the traveling operation member 59 as existing in the right operation area E15. According to this configuration, it can be known that the operational position of the traveling operation member 59 exists in the right operation area E15.

Second Embodiment

Referring to FIGS. 1, 2, and 9-10, a second embodiment of the present invention will be described. The present embodiment will be described based on the hydraulic system shown in FIG. 1 and the traveling operation member shown in FIG. 2 both described in the first embodiment. Accordingly, the same reference signs are used for the similar configurations described in the first embodiment, and detailed descriptions thereof are omitted.

Since the configurations of the working machine 1 provided with the hydraulic system according to the present embodiment is the same as those of the working machine 1 described in the first embodiment, the detailed descriptions thereof are omitted.

The hydraulic system according to the present embodiment will be described below.

With reference to FIG. 1, the hydraulic system for the working machine according to the present embodiment can determine an operation of the traveling operation member 59 based on the pressures of the operation fluid acting on the traveling fluid lines 45 (the first traveling fluid line 45a, the second traveling fluid line 45b, the third traveling fluid line 45c, and the fourth traveling fluid line 45d).

The determination of the operation of the traveling operation member 59 will be described in detail below.

As shown in FIG. 1, a first pressure detector 48a is connected to the first traveling fluid line 45a to be capable of detecting the first pilot pressure lf that is a pressure of the operation fluid in the first traveling fluid line 45a. A second pressure detector 48b is connected to the second traveling fluid line 45b to be capable of detecting the second pilot pressure lb that is a pressure of the operation fluid in the second traveling fluid line 45b.

A third pressure detector 48c is connected to the third traveling fluid line 45c to be capable of detecting a third pilot pressure rf that is a pressure of the operation fluid in the third traveling fluid line 45c. A fourth pressure detector 48d is connected to the fourth traveling fluid line 45d to be capable of detecting the fourth pilot pressure rb that is a pressure of the operation fluid in the fourth traveling fluid line 45d.

The first pressure detector 48a, the second pressure detector 48b, the third pressure detector 48b, and the fourth pressure detector 48d are connected to the controller 60.

In the traveling fluid line 45, throttle portions 95a, 95b, 95c, and 95d (respectively referred to as the first throttle portion 95a, the second throttle portion 95b, the third throttle portion 95c, and the fourth throttle portion 95d) are provided downstream from the first pressure detector 48a, the second pressure detector 48b, the third pressure detector 48b, and the fourth pressure detector 48d.

In detail, the throttle portion 95a is provided downstream from the first pressure detector 48a (a traveling pump side) in the first traveling fluid line 45a. The throttle portion 95b is provided downstream from the second pressure detector 48b (the traveling pump side) in the second traveling fluid line 45b. The throttle portion 95c is provided downstream from the third pressure detector 48c (the traveling pump side) in the third traveling fluid line 45c. The throttle portion 95d is provided downstream from the fourth pressure detector 48d (the traveling pump side) in the fourth traveling fluid line 45d.

In other words, the first pressure detector 48a, the second pressure detector 48b, the third pressure detector 48b, and the fourth pressure detector 48d are respectively provided upstream from the throttle portions 95a, 95b, 95c, and 95d (on the operation valve 55 side). Since the first pressure detector 48a, the second pressure detector 48b, the third pressure detector 48b, and the fourth pressure detector 48d are provided upstream from the throttle portions 95a, 95b, 95c (the pilot valve side), the operation of the operating device 54 is accurately detected.

The controller 60 judges the operation of the traveling operation member 59 based on the first pilot pressure lf detected by the first pressure detector 48a, the second pilot pressure lb detected by the second traveling fluid line 45b, the third pilot pressure rf detected by the third traveling fluid line 45c, and the fourth pilot pressure rb detected by the fourth traveling fluid line 45d.

In the present embodiment, the pressures of the first pilot pressure lf, the second pilot pressure lb, the third pilot pressure rf, and the fourth pilot pressure rb is used to judge whether an operational direction of the traveling operation member 59 corresponds to the rearward-traveling direction.

Figure 6:
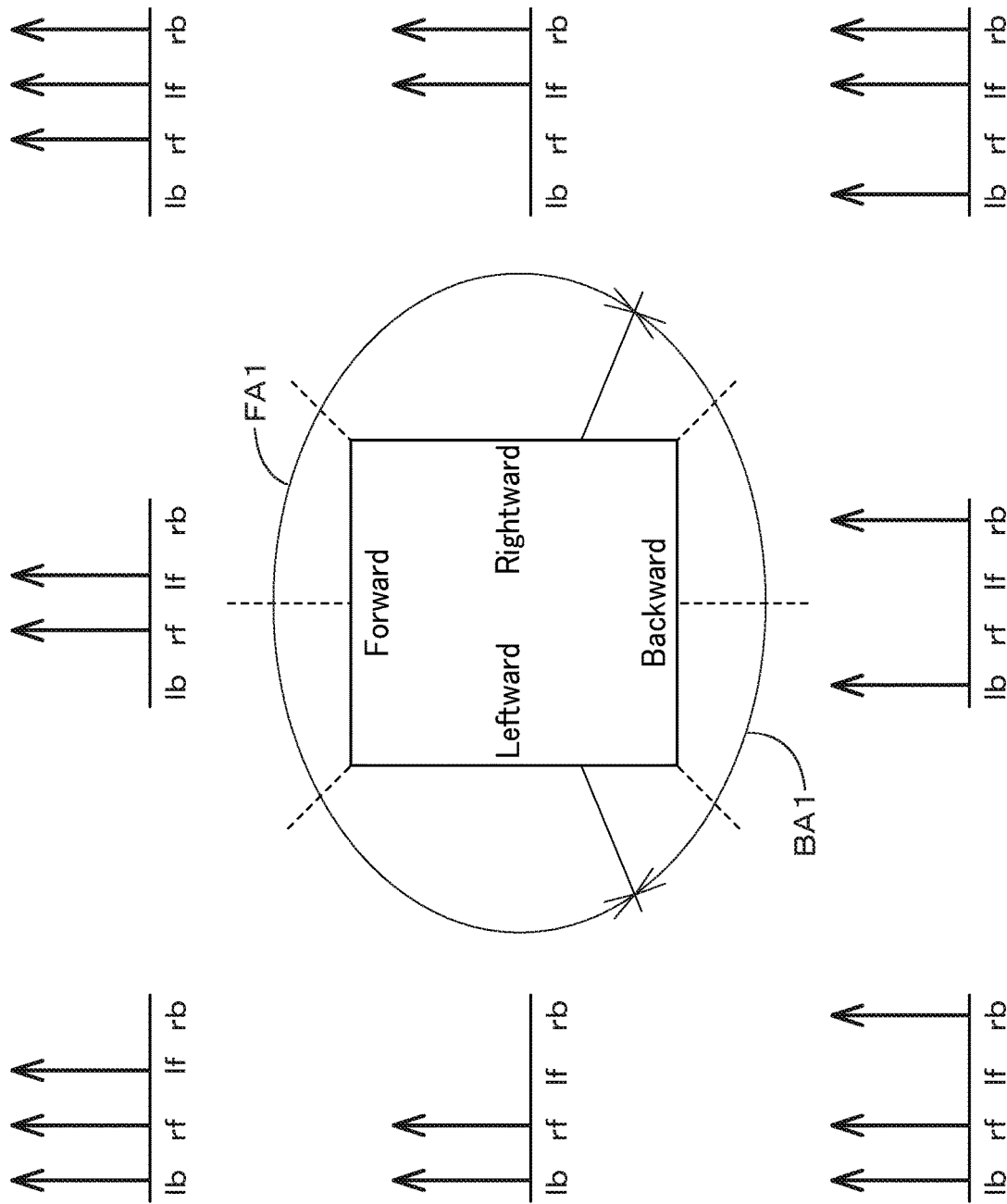
FIG. 6 is a view showing a relationship, in the hydraulic system shown in FIG. 1, between an operational direction defined by an operation of a traveling operation member, a first pilot pressure lf, a second pilot pressure lb, a third pilot pressure rf, and a fourth pilot pressure rb according to a second embodiment of the present invention.

FIG. 6 shows a relationship between the operational direction defined when the traveling operation member 59 is operated and the pressures of the first pilot pressure lf, the second pilot pressure lb, the third pilot pressure rf, and the fourth pilot pressure rb. The arrowed lines in FIG. 6 indicate the pilot pressures.

As shown in FIG. 6, when the traveling operation member 59 is tilted to forward, the first pilot pressure lf and the third pilot pressure rf rise. When the traveling operation member 59 is tilted rearward, the second pilot pressure lb and the fourth pilot pressure rb rise. When the traveling control member 59 is tilted leftward, the second pilot pressure lb and the third pilot pressure rf rise. When the traveling operation member 59 is tilted rightward, the first pilot pressure lf and the fourth pilot pressure rb rise.

When the traveling operation member 59 is tilted forward obliquely to the left, the first pilot pressure lf, the second pilot pressure lb, and the third pilot pressure rf rise. When the traveling operation member 59 is tilted forward obliquely to the right, the first pilot pressure lf, the third pilot pressure rf, and the fourth pilot pressure rb rise.

When the traveling operation member 59 is tilted backward obliquely to the left, the second pilot pressure lb, the third pilot pressure rf, and the fourth pilot pressure rb rise. When the traveling operation member 59 is tilted backward obliquely to the right, the first pilot pressure lf, the second pilot pressure lb, and the fourth pilot pressure rb rise.

Based on either first comparison information including a comparison result between the first pilot pressure lf and the second pilot pressure lb acting on the left traveling pump 53L or second comparison information including a comparison result between the third pilot pressure rf and the fourth pilot pressure rb acting on the right traveling pump 53R, the controller 60 determines an operational direction of the traveling operation member 59.

The comparison result included in the first comparison information is information obtained by using calculations or functions of a relationship in magnitude (a difference) between the first pilot pressure lf and the second pilot pressure lb, a ratio (rate) of the second pilot pressure lb to the first pilot pressure lf, a ratio (rate) of the first pilot pressure lf to the second pilot pressure lb, or a relationship in magnitude (a difference) between the first pilot pressure lf and the second pilot pressure lb relative to a predetermined value, and is information that directly or indirectly indicates the relationship between the magnitudes of the pilot pressures.

Similar to the first comparison information, the comparison result included in the second comparison information is also information that directly or indirectly indicates a relationship in magnitude between the third pilot pressure rf and the fourth pilot pressure rb.

Similar to the first and second comparison information, third comparison information including a comparison result between the first pilot pressure lf and the fourth pilot pressure rb, and fourth comparison information including a comparison result between the second pilot pressure lb and the third pilot pressure rf also may be used to judge the operational direction of the traveling operation member 59.

The controller 60 determines that the operational direction of the traveling operation member 59 is other than the rearward-traveling direction when the first comparison information indicates that the first pilot pressure lf is higher than the second pilot pressure lb and the ratio of the second pilot pressure lb to the first pilot pressure lf is less than a first threshold.

The controller 60 determines that the operational direction of the traveling operation member 59 is other than the rearward-traveling direction when the second comparison information indicates that the third pilot pressure rf is higher than the fourth pilot pressure rb and the ratio of the fourth pilot pressure rb to the third pilot pressure rf is less than a second threshold.

Figure 7:
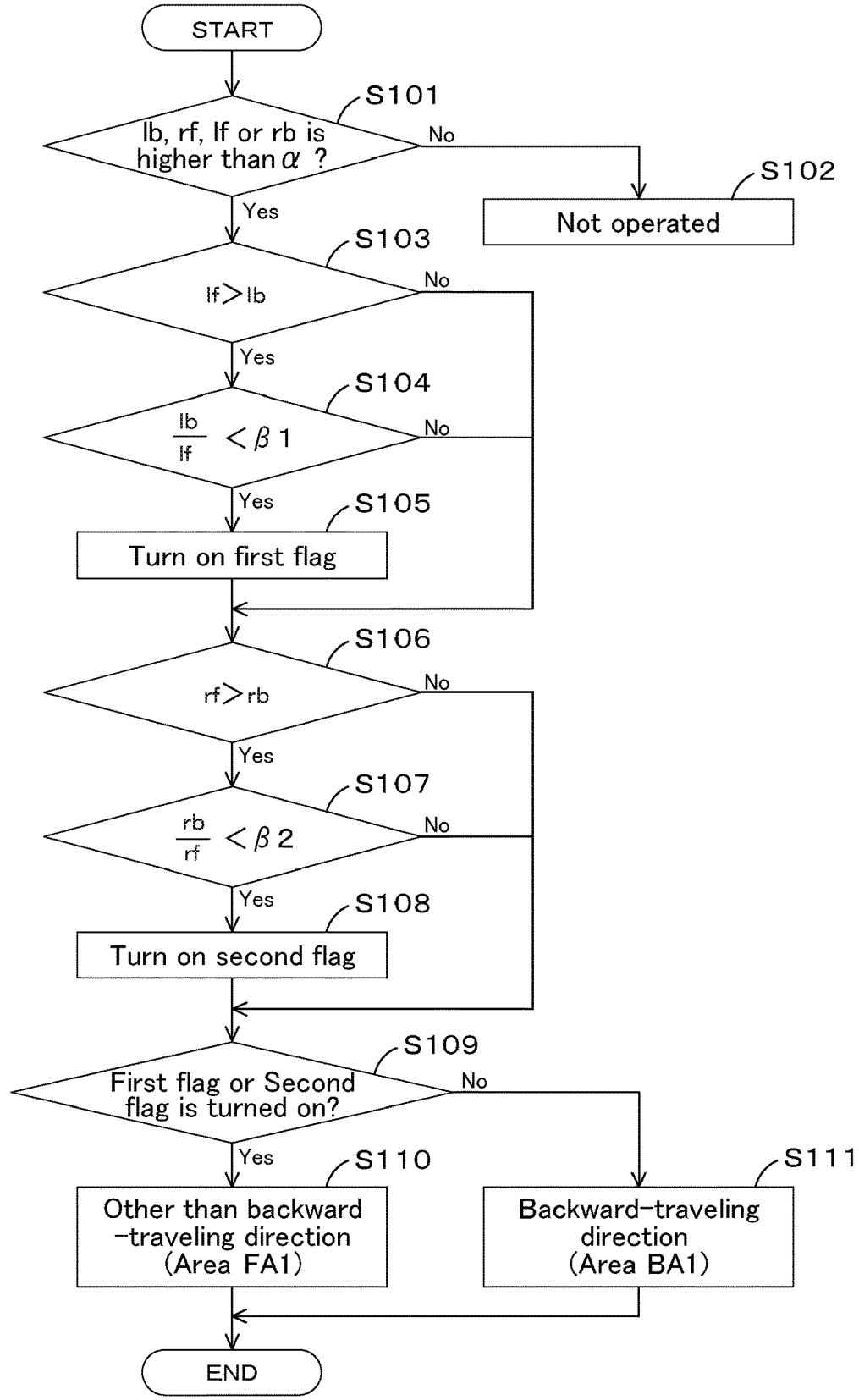
FIG. 7 is a view showing an operation flow of judging an operational direction of the traveling operation member based on the relationship between the operational direction and the pilot pressures shown in FIG. 6, according to the second embodiment.

FIG. 7 is an operation flow in which the controller 60 determines the operational direction of the traveling operation member 59 based on the first comparison information and the second comparison information.

As shown in FIG. 7, the controller 60 refers to the first pilot pressure lf, the second pilot pressure lb, the third pilot pressure rf, and the fourth pilot pressure rb, and judges whether any one of the referred first pilot pressure lf, the second pilot pressure lb, the third pilot pressure rf, and the fourth pilot pressure rb is higher than an operating pressure α for judging whether or not the traveling operation member 59 is being operated (step S101).

When none of the first pilot pressure lf, the second pilot pressure lb, the third pilot pressure rf, and the fourth pilot pressure rb is higher than the operating pressure α (step S101, No), it is determined that the traveling operation member 59 is not being operated (step S102).

When any one of the first pilot pressure lf, the second pilot pressure lb, the third pilot pressure rf, and the fourth pilot pressure rb is higher than the operating pressure α (step S101, Yes), the controller 60 judges whether the first pilot pressure lf is higher than the second pilot pressure lb (step S103)

When the first pilot pressure lf is higher than the second pilot pressure lb (step S103, Yes), the controller 60 determines whether the ratio of the second pilot pressure lb to the first pilot pressure lf is less than the first threshold β1 (step S104).

When the ratio of the second pilot pressure lb to the first pilot pressure lf is less than the first threshold β1 (step S104, Yes), the controller 60 determines that the first condition is satisfied and turns on a first flag indicating that the first condition is satisfied (step S105).

When the first pilot pressure lf is not higher than the second pilot pressure lb (step S103, No), or when the ratio of the second pilot pressure lb to the first pilot pressure lf is not less than the first threshold β1 (step S104, No), the controller 60 determines that the first condition is not satisfied and does not turn on the first flag.

In addition, the controller 60 judges whether the third pilot pressure rf is higher than the fourth pilot pressure rb (step S106).

When the third pilot pressure rf is higher than the fourth pilot pressure rb (step S106, Yes), the controller 60 judges whether the ratio of the fourth pilot pressure rb to the third pilot pressure rf is less than the second threshold β2 (step S107).

When the ratio of the fourth pilot pressure rb to the third pilot pressure rf is less than the second threshold β2 (step S107, Yes), the controller 60 determines that the second condition is satisfied and turns on a second flag indicating that the second condition is satisfied (step S108).

When the third pilot pressure rf is not higher than the fourth pilot pressure rb (step S106, No), or when the ratio of the fourth pilot pressure rb to the third pilot pressure rf is not less than the second threshold β2 (step S107, No), the controller 60 determines that the second condition is not satisfied and does not turn on the second flag.

The controller 60 judges whether either the first condition or the second condition is satisfied (either the first flag or the second flag is turned on) (step S109).

When either the first condition or the second condition is satisfied (step S109, Yes), the controller 60 determines that the operational direction of the traveling operation member 59 is other than the rearward-traveling direction (step S110).

When neither the first condition nor the second condition is satisfied (step S109, No), the controller 60 determines that the operational direction of the traveling operation member 59 is the rearward-traveling direction (step S111).

As shown in FIG. 6, the operational direction of the traveling operation member 59 in the rearward-traveling direction corresponds to the area BA1, and the operational direction of the traveling operation member 59 in other than the rearward-traveling direction corresponds to the area FA1.

As described above, the controller 60 can determine that the operational direction of the traveling operation member 59 is other than the rearward-traveling direction when the first pilot pressure lf is larger than the second pilot pressure lb and the ratio of the second pilot pressure lb to the first pilot pressure lf is less than the first threshold β1, and can determines that the operational direction of the traveling operation member 59 is other than the rearward-traveling direction also when the third pilot pressure rf is higher than the fourth pilot pressure rb and the ratio of the fourth pilot pressure rb to the third pilot pressure rf is less than the second threshold β2.

That is, the controller 60 can judge, based on the first pilot pressure lf, the second pilot pressure lb, the third pilot pressure rf, and the fourth pilot pressure rb, whether the operational direction of the traveling operation member 59, i.e., the operation of the traveling operation member 59, is in the area BA1 for the backward-traveling direction or whether the operational direction of the traveling operation member 59, i.e., the operation of the traveling operation member 59, is in the area FA1 for other than the rearward-traveling direction.

Figure 8:
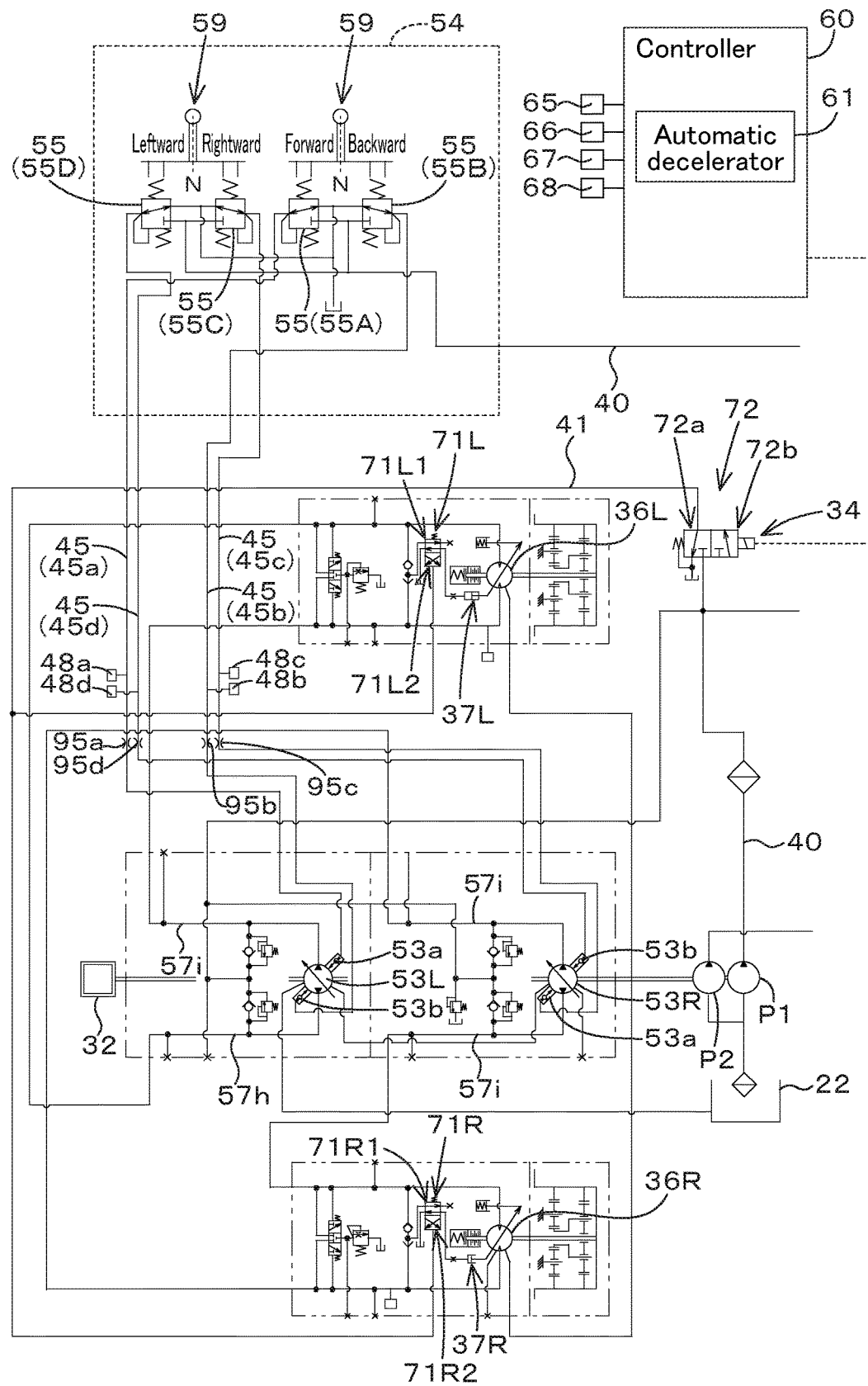
FIG. 8 is a view showing a hydraulic system (hydraulic circuit) for a working machine according to the second embodiment, which is different from FIG. 1.

FIG. 8 shows a hydraulic system (a hydraulic circuit) for the working machine different from that of FIG. 1. The hydraulic system for the working machine in FIG. 8 differs in the connection between the traveling operation device 54 and the traveling pumps (the left traveling pump 53L and the right traveling pump 53R).

In FIG. 8, the other configurations are the same as in FIG. 1. In FIG. 8, the high-pressure selector valves 47*a*, 47*b*, 47*c*, and 47*d* are not provided in the system. The operation valve 55A is connected to the first traveling fluid line 45*a*, the operation valve 55B is connected to the second traveling fluid line 45*b*, the operation valve 55C is connected to the third traveling fluid line 45*c*, and the operation valve 55D is connected to the fourth traveling fluid line 45*d*.

Figure 9:
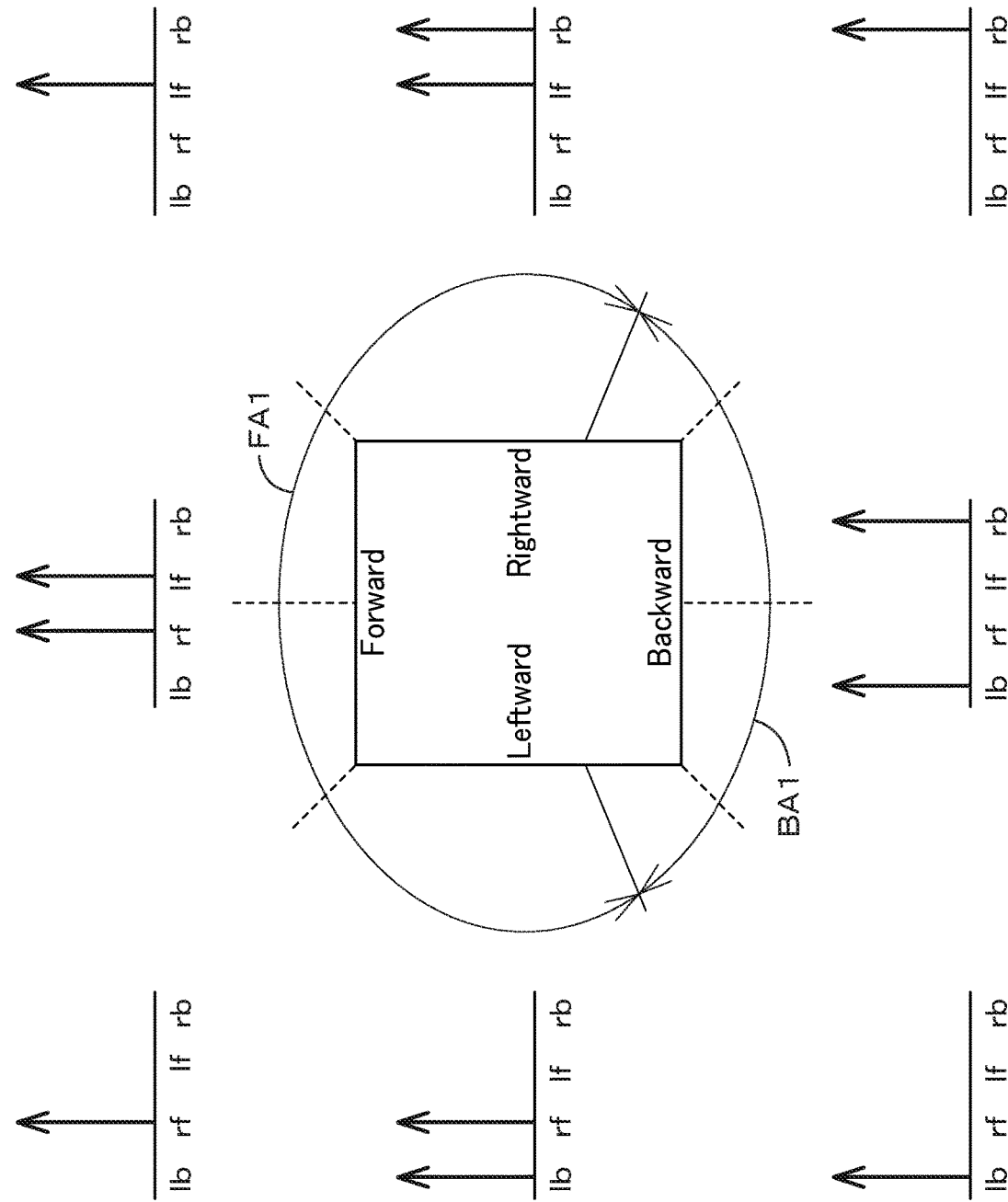
FIG. 9 is a view showing a relationship, in the hydraulic system shown in FIG. 8, between the operational direction defined by the operation of the traveling operation member, the first pilot pressure lf, the second pilot pressure lb, the third pilot pressure rf, and the fourth pilot pressure rb according to the second embodiment.

FIG. 9 shows a relationship between the operational direction defined when the traveling operation member 59 is operated and the pressures of the first pilot pressure lf, the second pilot pressure lb, the third pilot pressure rf, and the fourth pilot pressure rb, in the hydraulic system in FIG. 8.

The arrowed lines in FIG. 9 indicate the pilot pressures. As shown in FIG. 8, when the traveling operation member 59 is tilted forward, the first pilot pressure lf and the third pilot pressure rf rise. When the traveling operation member 59 is tilted backward, the second pilot pressure lb and the fourth pilot pressure rb rise.

When the traveling operation member 59 is tilted leftward, the second pilot pressure lb and the third pilot pressure rf rise. When the traveling operation member 59 is tilted rightward, the first pilot pressure lf and the fourth pilot pressure rb rise.

When the traveling operation member 59 is tilted forward obliquely to the left, the third pilot pressure rf rises. When the traveling operation member 59 is tilted forward obliquely to the right, the first pilot pressure lf rises. When the traveling control member 59 is tilted backward obliquely to the left, the second pilot pressure lb rises. When the traveling operation member 59 is tilted backward obliquely to the right, the fourth pilot pressure rb rises.

Figure 10:
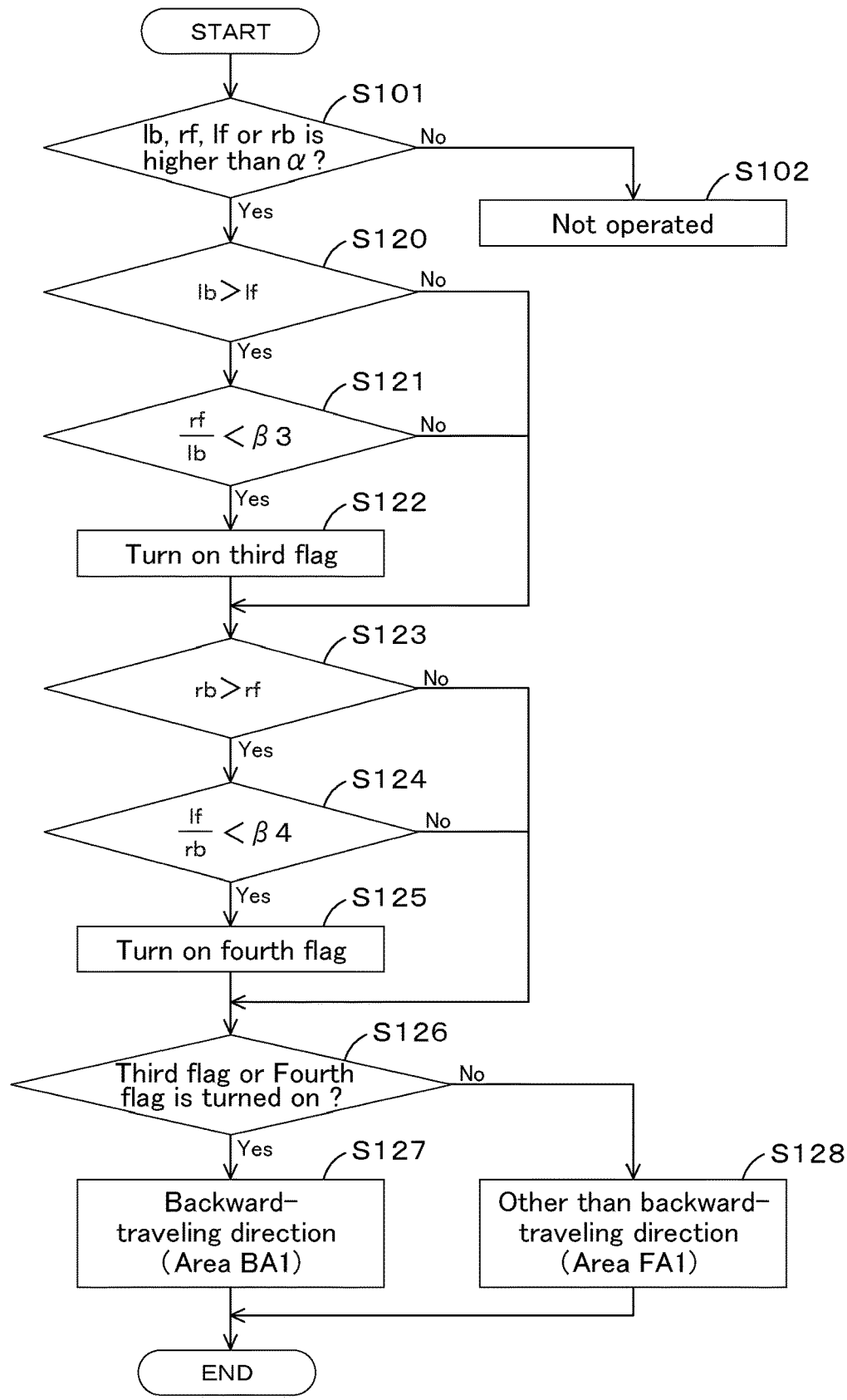
FIG. 10 is a view showing an operation flow of judging an operational direction of the traveling operation member based on the relationship between the operational direction and the pilot pressures shown in FIG. 9, according to the second embodiment.

FIG. 10 is an operation flow in which the controller 60 judges the operational direction of the traveling operation member 59 based on the third comparison information and the fourth comparison information.

As shown in FIG. 10, the controller 60 refers to the first pilot pressure lf, the second pilot pressure lb, the third pilot pressure rf, and the fourth pilot pressure rb, and judges whether any one of the referred first pilot pressure lf, the second pilot pressure lb, the third pilot pressure rf, and the fourth pilot pressure rb is higher than the operating pressure α used to judge the operation (step S101).

When neither the first pilot pressure lf, the second pilot pressure lb, the third pilot pressure rf, nor the fourth pilot pressure rb is higher than the operating pressure α (step S101, No), it is determined that the traveling operation member 59 is not operated (step S102).

If any one of the first pilot pressure lf, the second pilot pressure lb, the third pilot pressure rf, and the fourth pilot pressure rb is higher than the operating pressure α (step S101, Yes), the controller 60 judges whether the second pilot pressure lb is higher than the first pilot pressure lf (step S120).

When the second pilot pressure lb is higher than the first pilot pressure lf (step S120, Yes), the controller 60 judges whether the ratio of the third pilot pressure rf to the second pilot pressure lb is less than the third threshold β3 (step S121).

When the ratio of the third pilot pressure rf to the second pilot pressure lb is less than the third threshold β3 (step S121, Yes), the controller 60 determines that the third condition is satisfied and turns on a third flag indicating that the third condition is satisfied (step S122).

When the second pilot pressure lb is not higher than the first pilot pressure lf (step S120, No), or when the ratio of the third pilot pressure rf to the second pilot pressure lb is not less than the third threshold β3 (step S121, No), the controller 60 determines that the third condition is not satisfied and does not turn on the third flag.

In addition, the controller 60 judges whether the fourth pilot pressure rb is higher than the third pilot pressure rf (step S123).

When the fourth pilot pressure rb is higher than the third pilot pressure rf (step S123, Yes), the controller 60 judges whether the ratio of the first pilot pressure lf to the fourth pilot pressure rb is less than a fourth threshold β4 (step S124).

When the ratio of the first pilot pressure lf to the fourth pilot pressure rb is less than the fourth threshold β4 (step S124, Yes), the controller 60 determines that the fourth condition is satisfied and turns on the fourth flag indicating that the fourth condition is satisfied (step S125).

When the fourth pilot pressure rb is not higher than the third pilot pressure rf (step S123, No), or when the ratio of the first pilot pressure lf to the fourth pilot pressure rb is not less than the fourth threshold β4 (step S124, No), the controller 60 determines that the fourth condition is not satisfied and does not turn on the fourth flag.

The controller 60 judges whether either the third condition or the fourth condition is satisfied (either the third flag or the fourth flag is turned on) (step S126).

When either the third condition or the fourth condition is satisfied (step S126, Yes), the controller 60 determines that the operational direction of the traveling operation member 59 is the rearward-traveling direction (step S127).

When neither the third condition nor the fourth condition is satisfied (step S126, No), the controller 60 determines that the operational direction of the traveling operation member 59 is other than the rearward-traveling direction (step S128).

As shown in FIG. 9, the operational direction of the traveling operation member 59 in the rearward-traveling direction corresponds to the area BA1, and the operational direction of the traveling operation member 59 in other than the rearward-traveling direction corresponds to the area FA1.

When the second pilot pressure lb is higher than the first pilot pressure lf and the ratio of the third pilot pressure rf to the second pilot pressure lb is less than the third threshold β3, the controller 60 determines that the operational direction of the traveling operation member 59 is other than the rearward-traveling direction. When the fourth pilot pressure rb is higher than the third pilot pressure rf and the ratio of the first pilot pressure lf to the fourth pilot pressure rb is less than the fourth threshold β4, the controller 60 determines that the operational direction of the traveling operation member 59 is other than the rearward-traveling direction.

That is, the controller 60 can judge, based on the first pilot pressure lf, the second pilot pressure lb, the third pilot pressure rf, and the fourth pilot pressure rb, whether the operational direction of the traveling operation member 59, i.e., the operation of the traveling operation member 59, is in the area BA1 for the backward-traveling direction or whether the operational direction of the traveling operation member 59, i.e., the operation of the traveling operation member 59, is in the area FA1 for other than the rearward-traveling direction.

The working machine 1 includes the machine body 2, the left traveling device 5L provided on a left portion of the machine body 2, the right traveling device 5R provided on a right portion of the machine body 2, the left traveling motor 36L configured to output power to the left traveling device 5L, the right traveling motor 36R configured to output power to the right traveling device 5R, the left traveling pump 53L to supply operation fluid to the left traveling motor 5L, the left traveling pump 53L including a first pressure receiving portion 53*a* and a second pressure receiving portion 53*b* so that the operation fluid is used to apply a pressure to at least one of the first and second pressure receiving portions 53*a* and 53*b*, the right traveling pump 53R to supply operation fluid supplied to the right traveling motor 36R, the right traveling pump 53R including the third pressure receiving portion 53a and the fourth pressure receiving portion 53b so that a part of the operation fluid is used to apply a pressure to at least one of the third and fourth pressure receiving portions 53a and 53b, the traveling operation device 54 configured to apply the pressure of the part of operation fluid to at least one of the first, second, third and fourth pressure receiving portions according to operation of the traveling operation member 59, the first traveling fluid line 45a connected to the first pressure receiving portion 53a, the operation fluid having a pressure applied to the first pressure receiving portion 53a being passed through the first traveling fluid line 45a according to operation of the traveling operation member 59, the second traveling fluid line 45b connected to the second pressure receiving portion 53b, the operation fluid having a pressure applied to the second pressure receiving portion 53b being passed through the second traveling fluid line 45b according to operation of the traveling operation member 59, the third traveling fluid line 45c connected to the third pressure receiving portion 53a, the operation fluid having a pressure applied to the third pressure receiving portion 53a being passed through the third traveling fluid line 45c according to operation of the traveling operation member 59, the fourth traveling fluid line 45d connected to the fourth pressure receiving portion 53b, the operation fluid having a pressure applied to the fourth pressure receiving portion 53b being passed through the fourth traveling fluid line 45d according to operation of the traveling operation member 59, the first pressure detector 48a configured to detect a first pilot pressure that is the pressure of operation fluid passed through the first traveling fluid line 45a, the second pressure detector 48b configured to detect a second pilot pressure that is the pressure of operation fluid passed through the second traveling fluid line 45b, the third pressure detector 48c configured to detect a third pilot pressure that is the pressure of operation fluid passed through the third traveling fluid line 45c, the fourth pressure detector 48d configured to detect a fourth pilot pressure that is the pressure of operation fluid passed through the fourth traveling fluid line 45d, and the controller 60 configured or programmed to judge the operational direction of the traveling operation member 59 based on either the first comparison information including comparison between the first pilot pressure and the second pilot pressure acting on the left traveling pump 53L or the second comparison information including comparison between the third pilot pressure and the fourth pilot pressure acting on the left traveling pump 53L.

According to this configuration, the operational direction of the traveling operation member 59 can be easily determined without using a sensor such as a potentiometer based on the comparison between the first and second pilot pressures acting on the left traveling pump 53L and the comparison between the third and fourth pilot pressures acting on the right traveling pump 53R.

The controller 60 is configured or programmed to consider the traveling operation member 59 as being operated in any operational direction other than the rearward-traveling direction when the first comparison information indicates that the first pilot pressure is higher than the second pilot pressure and the ratio of the second pilot pressure to the first pilot pressure is less than the first threshold.

According to this configuration, it can be easily known that the operation member 59 has been operated in a direction other than the rearward-traveling direction only based on the pilot pressures.

The controller 60 is configured or programmed to consider the traveling operation member 59 as being operated in any operational direction other than the rearward-traveling direction when the second comparison information indicates that the third pilot pressure is higher than the fourth pilot pressure and the ratio of the fourth pilot pressure to the third pilot pressure is less than the second threshold.

According to this configuration, it can be easily known that the operation member 59 has been operated in a direction other than the rearward-traveling direction only based on the pilot pressures.

The controller 60 is configured or programmed to consider the traveling operation member 59 as being operated in the rearward-traveling direction when the first comparison information indicates that the second pilot pressure is higher than the first pilot pressure and the ratio of the third pilot pressure to the second pilot pressure is less than the third threshold.

According to this configuration, it can be easily known that the operation member 59 has been operated in the rearward-traveling direction only based on the pilot pressures.

The controller 60 is configured or programmed to consider the traveling operation member 59 as being operated in the rearward-traveling direction when the second comparison information indicates that the fourth pilot pressure is higher than the third pilot pressure and the ratio of the first pilot pressure to the fourth pilot pressure is less than the fourth threshold.

According to this configuration, it can be easily known that the operation member 59 has been operated in the rearward-traveling direction only based on the pilot pressures.

The controller 60 determines the operational direction of the traveling operation member 59 based on whether or not either the first pilot pressure or the second pilot pressure is equal to or more than a predetermined value, or whether or not both of the first pilot pressure and the second pilot pressure are equal to or more than the respective predetermined values.

The controller 60 determines the operational direction of the traveling operation member 59 based on whether or not either the third pilot pressure or the fourth pilot pressure is equal to or more than a predetermined value, or whether or not both of the third pilot pressure and the fourth pilot pressure are equal to or more than the respective predetermined values.

Third Embodiment

A third embodiment of the present invention will be explained with reference to FIGS. 11 to 14. In the present embodiment, in the hydraulic systems shown in FIG. 1 and FIG. 8 described in the second embodiment, the pressures of the first pilot pressure lf, the second pilot pressure lb, the third pilot pressure rf, and the fourth pilot pressure rb are used to judge whether an operational direction of the traveling operation member 59 is the forward-traveling direction.

In the present embodiment, the same reference signs are used for the configurations described in the second embodiment, and detailed descriptions thereof are omitted.

Figure 11:
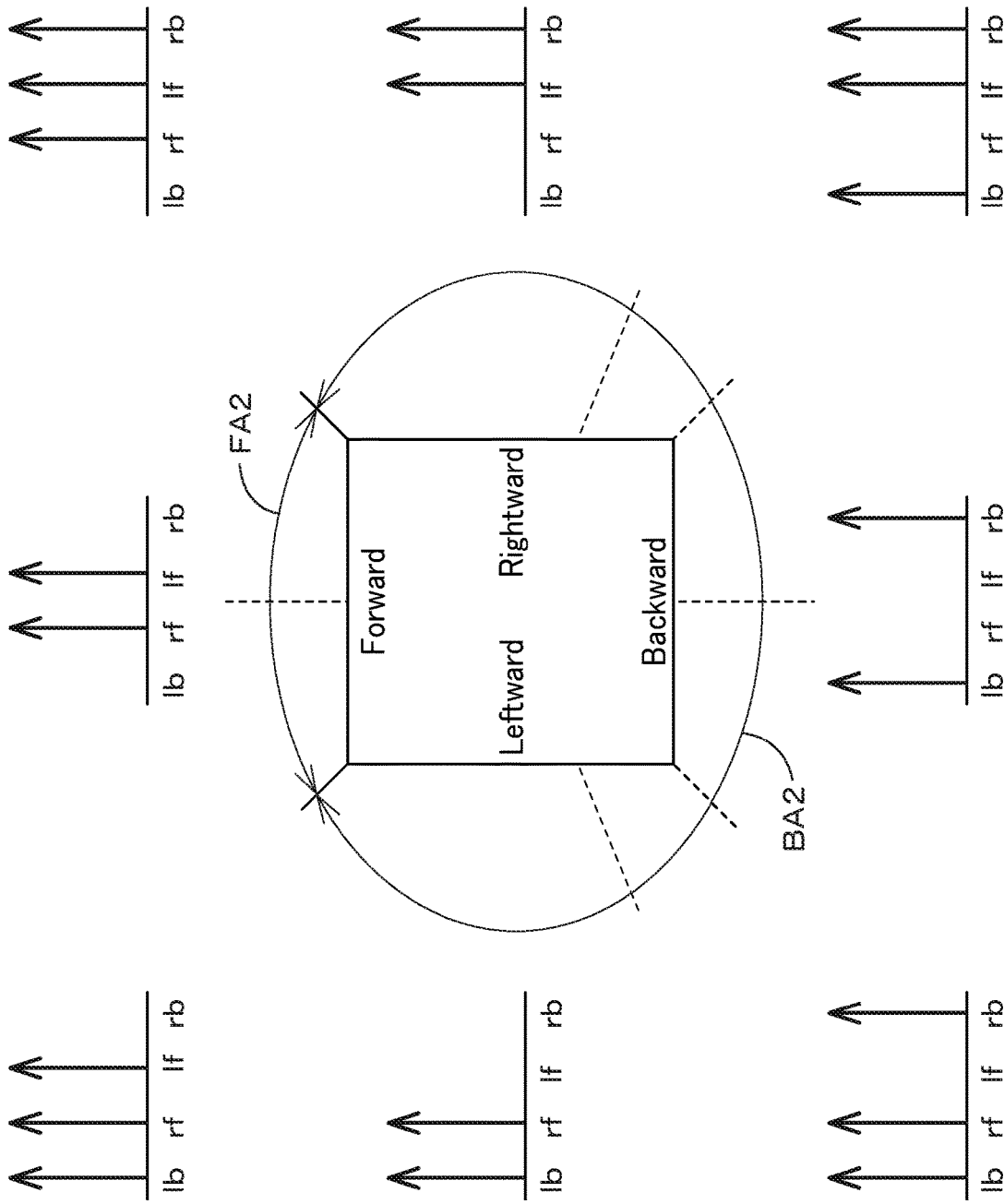
FIG. 11 is a view showing a relationship, in the hydraulic system shown in FIG. 1, between an operational direction defined by an operation of a traveling operation member, a first pilot pressure lf, a second pilot pressure lb, a third pilot pressure rf, and a fourth pilot pressure rb according to a third embodiment of the present invention.
Figure 12:
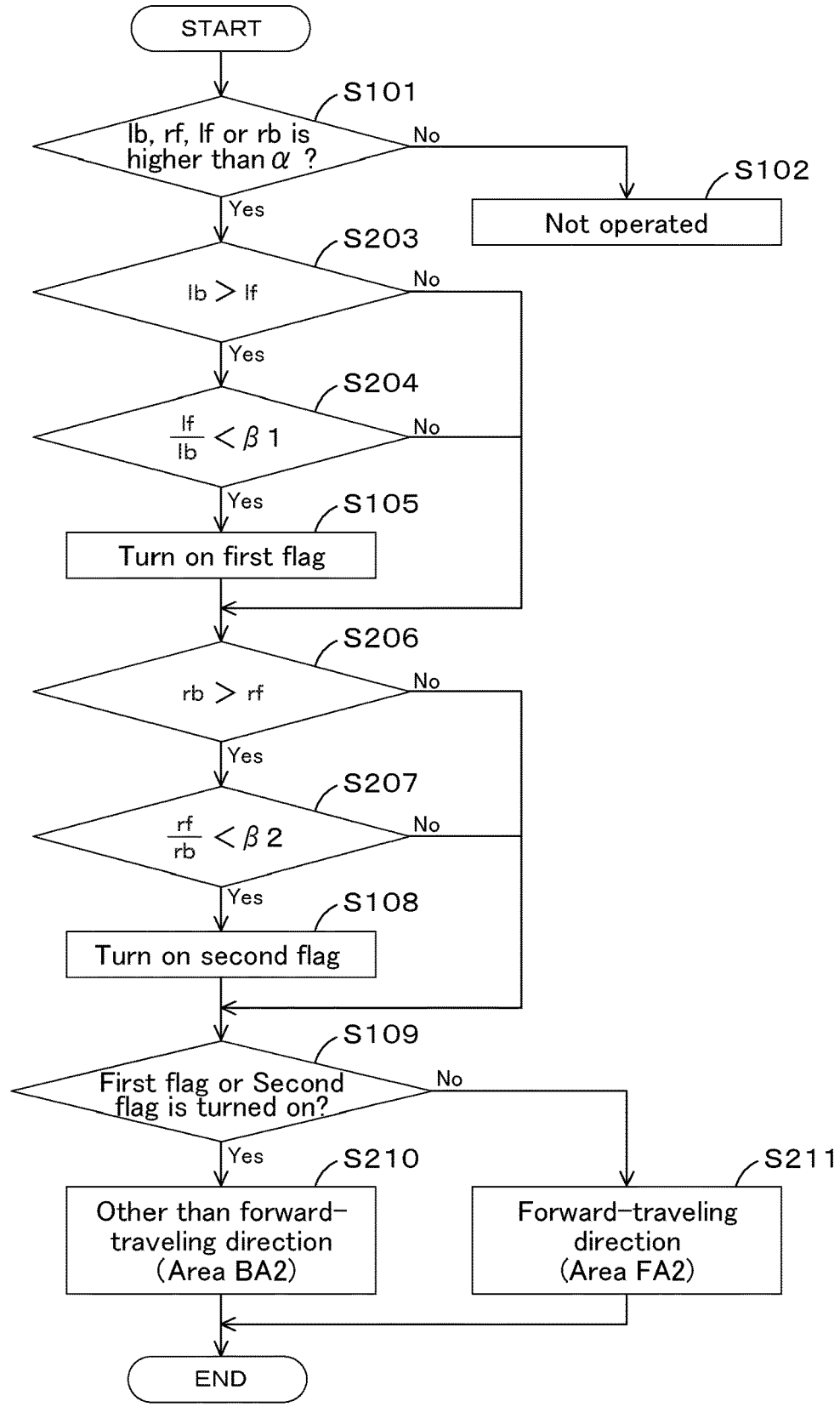
FIG. 12 is a view showing an operation flow of judging an operational direction of the traveling operation member based on the relationship between the operational direction and the pilot pressures shown in FIG. 11, according to the third embodiment.

FIG. 11 shows a relationship between an operational direction defined when the traveling operation member 59 is operated and the pressures of the first pilot pressure lf, the second pilot pressure lb, the third pilot pressure rf, and the fourth pilot pressure rb in the hydraulic system shown in FIG. 1. The arrowed lines in FIG. 11 indicate the pilot pressures. FIG. 12 shows an operation flow in which the controller 60 judges an operational direction of the traveling operation member 59 based on the first comparison information and the second comparison information.

Figure 13:
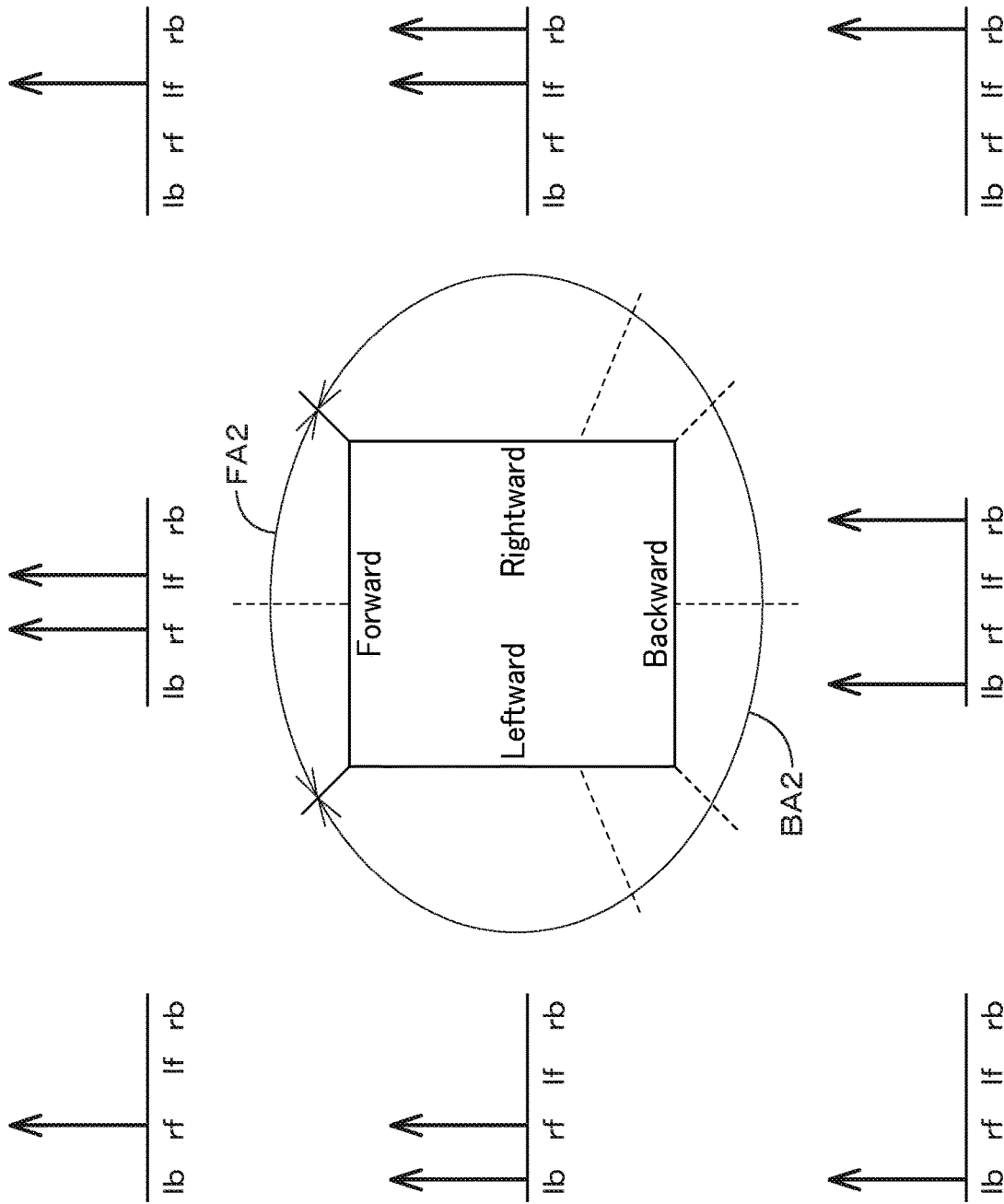
FIG. 13 is a view showing a relationship, in the hydraulic system shown in FIG. 8, between the operational direction defined by the operation of the traveling operation member, the first pilot pressure lf, the second pilot pressure lb, the third pilot pressure rf, and the fourth pilot pressure rb according to the third embodiment.
Figure 14:
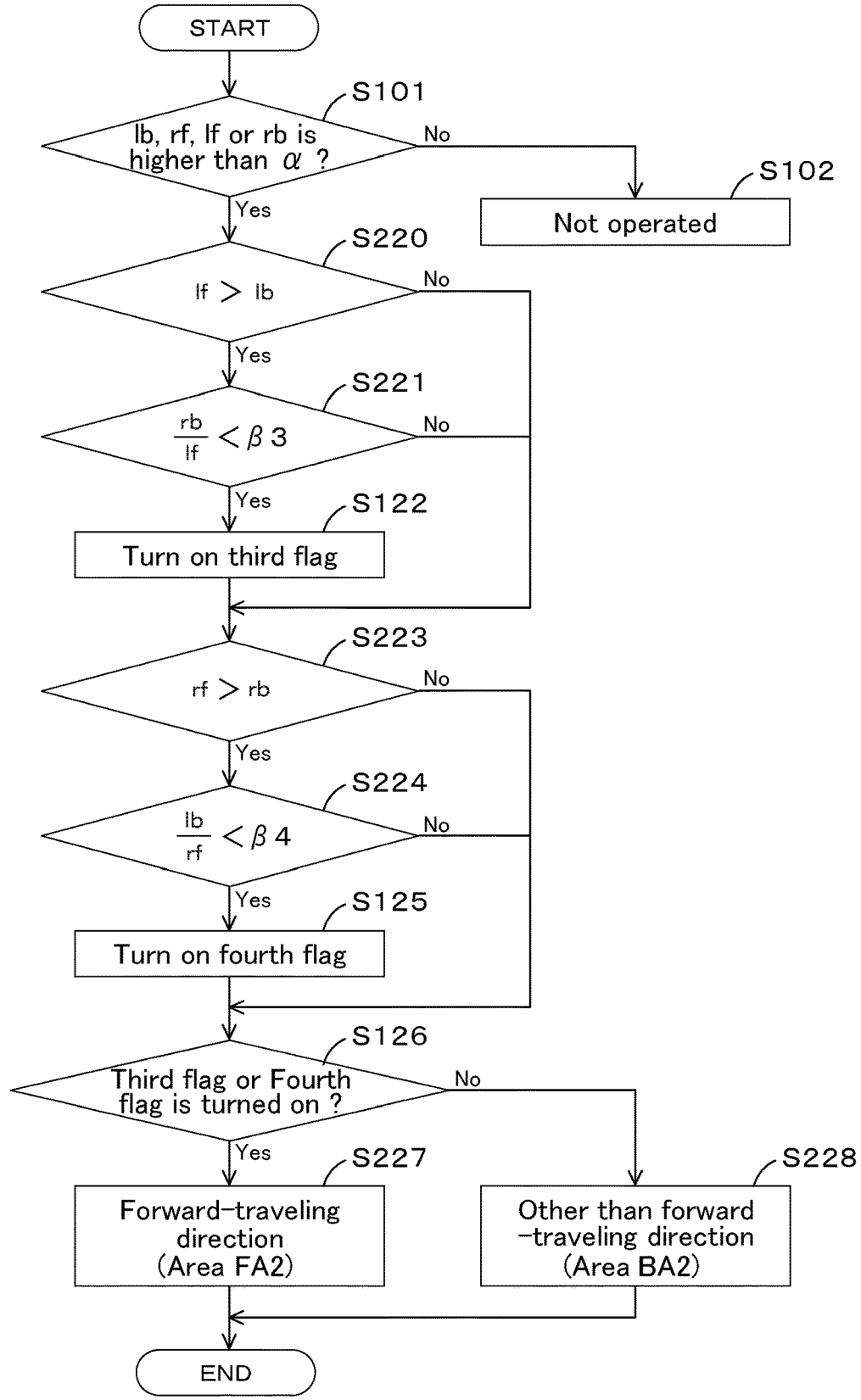
FIG. 14 is a view showing an operation flow of judging an operational direction of the traveling operation member based on the relationship between the operational direction and the pilot pressures shown in FIG. 13, according to the third embodiment.

FIG. 13 is a diagram showing the relationship between an operational direction of the traveling operation member 59 and the pressures of the first pilot pressure lf, the second pilot pressure lb, the third pilot pressure rf, and the fourth pilot pressure rb in the hydraulic system shown in FIG. 8. The arrowed lines in FIG. 13 indicate the pilot pressures. FIG. 14 shows an operation flow in which the controller 60 judges an operational direction of the traveling operation member 59 based on the third comparison information and the fourth comparison information.

As shown in FIG. 11, when the traveling operation member 59 is tilted forward, the first pilot pressure lf and the third pilot pressure rf rise. When the traveling operation member 59 is tilted rearward, the second pilot pressure lb and the fourth pilot pressure rb rise. When the traveling control member 59 is tilted leftward, the second pilot pressure lb and the third pilot pressure rf rise. When the traveling operation member 59 is tilted rightward, the first pilot pressure lf and the fourth pilot pressure rb rise.

When the traveling operation member 59 is tilted forward obliquely to the left, the first pilot pressure lf, the second pilot pressure lb, and the third pilot pressure rf rise. When the traveling operation member 59 is tilted forward obliquely to the right, the first pilot pressure lf, the third pilot pressure rf, and the fourth pilot pressure rb rise.

When the traveling operation member 59 is tilted backward obliquely to the left, the second pilot pressure lb, the third pilot pressure rf, and the fourth pilot pressure rb rise. When the traveling operation member 59 is tilted backward obliquely to the right, the first pilot pressure lf, the second pilot pressure lb, and the fourth pilot pressure rb rise.

Based on either the first comparison information including the result of the comparison between the first pilot pressure lf and the second pilot pressure lb corresponding to the left traveling pump 53L, or the second comparison information including the result of the comparison between the third pilot pressure rf and the fourth pilot pressure rb acting on the right traveling pump 53R, the controller 60 judges an operational direction of the traveling operation member 59.

The comparison result included in the first comparison information is information obtained by using calculations or functions of a relationship in magnitude (a difference) between the first pilot pressure lf and the second pilot pressure lb, a ratio (rate) of the second pilot pressure lb to the first pilot pressure lf, a ratio (rate) of the first pilot pressure lf to the second pilot pressure lb, or a relationship in magnitude (a difference) between the first pilot pressure lf and the second pilot pressure lb relative to a predetermined value, and is information that directly or indirectly indicates the relationship between the magnitudes of the pilot pressures.

Similar to the first comparison information, the comparison result included in the second comparison information is also information that directly or indirectly indicates a relationship in magnitude between the third pilot pressure rf and the fourth pilot pressure rb.

Similar to the first and second comparison information, the third comparison information including a comparison result between the first pilot pressure lf and the fourth pilot pressure rb, and the fourth comparison information including a comparison result between the second pilot pressure lb and the third pilot pressure rf also may be used to judge the operational direction of the traveling operation member 59.

The controller 60 determines that the operational direction of the traveling operation member 59 is other than the forward-traveling direction when the first comparison information indicates that the second pilot pressure lb is higher than the first pilot pressure lf and the ratio of the first pilot pressure lf to the second pilot pressure lb is less than a first threshold.

The controller 60 determines that the operational direction of the traveling operation member 59 is other than the forward-traveling direction when the second comparison information indicates that the fourth pilot pressure rb is higher than the third pilot pressure rf and the ratio of the third pilot pressure rf to the fourth pilot pressure rb is less than a second threshold.

FIG. 12 is an operation flow in which the controller 60 judges an operational direction of the traveling operation member 59 based on the first comparison information and the second comparison information.

As shown in FIG. 12, the controller 60 refers to the first pilot pressure lf, the second pilot pressure lb, the third pilot pressure rf, and the fourth pilot pressure rb and judges whether or not any one of the referenced first pilot pressure lf, second pilot pressure lb, third pilot pressure rf, and fourth pilot pressure rb is higher than the operating pressure $\alpha$ for judging whether or not the traveling operation member 59 is being operated (step S101).

When none of the first pilot pressure lf, the second pilot pressure lb, the third pilot pressure rf, and the fourth pilot pressure rb is higher than the operating pressure $\alpha$ (step S101, No), it is determined that the traveling operation member 59 is not operated (step S102).

When any one of the first pilot pressure lf, the second pilot pressure lb, the third pilot pressure rf, and the fourth pilot pressure rb is higher than the operating pressure $\alpha$ (step S101, Yes), the controller 60 judges whether the second pilot pressure lb is higher than the first pilot pressure lf (step S203).

When the second pilot pressure lb is higher than the first pilot pressure lf (step S203, Yes), the controller 60 judges whether the ratio of the first pilot pressure lf to the second pilot pressure lb is less than the first threshold $\beta 1$ (step S204).

When the ratio of the first pilot pressure lf to the second pilot pressure lb is less than the first threshold $\beta 1$ (step S204, Yes), the controller 60 determines that the first condition is satisfied and turns on the first flag indicating that the first condition is satisfied (step S105).

When the second pilot pressure lb is not higher than the first pilot pressure lf (step S103, No), or when the ratio of the first pilot pressure lf to the second pilot pressure lb is not less than the first threshold $\beta 1$ (step S204, No), the controller 60 determines that the first condition is not satisfied and does not turn on the first flag.

In addition, the controller 60 judges whether the fourth pilot pressure rb is higher than the third pilot pressure rf (step S206).

When the fourth pilot pressure rb is higher than the third pilot pressure rf (step S206, Yes), the controller 60 judges whether the ratio of the third pilot pressure rf to the fourth pilot pressure rb is less than the second threshold $\beta 2$ (step S207).

When the ratio of the third pilot pressure rf to the fourth pilot pressure rb is less than the second threshold $\beta 2$ (step S207, Yes), the controller 60 determines that the second condition is satisfied and turns on the second flag indicating that the second condition is satisfied (step S108).

When the fourth pilot pressure rb is not higher than the third pilot pressure rf (step S206, No), or when the ratio of the third pilot pressure rf to the fourth pilot pressure rb is not less than the second threshold β2 (step S207, No), the controller 60 determines that the second condition is not satisfied and does not turn on the second flag.

The controller 60 judges whether either the first condition or the second condition is satisfied (either the first flag or the second flag is turned on) (step S109).

When either the first condition or the second condition is satisfied (step S109, Yes), the controller 60 determines that the operational direction of the traveling operation member 59 is other than the forward-traveling direction (step S210).

When neither the first condition nor the second condition is satisfied (step S109, No), the controller 60 determines that the operational direction of the traveling operation member 59 is the forward-traveling direction (step S211).

As shown in FIG. 11, the operational direction of the traveling operation member 59 in the forward-traveling direction corresponds to the area FA2, and the operational direction of the traveling operation member 59 in other than the forward-traveling direction corresponds to the area BA2.

As described above, the controller 60 determines that the operational direction of the traveling operation member 59 is other than the forward-traveling direction when the second pilot pressure lb is higher than the first pilot pressure lf and the ratio of the first pilot pressure lf to the second pilot pressure lb is less than the first threshold β1. Moreover, the controller 60 determines that the operational direction of the traveling operation member 59 is other than the forward-traveling direction when the fourth pilot pressure rb is higher than the third pilot pressure rf and the ratio of the third pilot pressure rf to the fourth pilot pressure rb is less than the second threshold β2.

That is, the controller 60 can judge, based on the first pilot pressure lf, the second pilot pressure lb, the third pilot pressure rf, and the fourth pilot pressure rb, whether the operational direction of the traveling operation member 59, i.e., the operation of the traveling operation member 59, is in the area FA2 for the forward-traveling direction or whether the operational direction of the traveling operation member 59, i.e., the operation of the traveling operation member 59, is in the area BA2 for other than the forward-traveling direction.

FIG. 13 shows a relationship between the operational direction of the traveling operation member 59 and the pressures of the first pilot pressure lf, the second pilot pressure lb, the third pilot pressure rf, and the fourth pilot pressure rb in the hydraulic system in FIG. 8.

The arrowed lines in FIG. 13 indicate the pilot pressures. As shown in FIG. 13, when the traveling operation member 59 is tilted forward, the first pilot pressure lf and the third pilot pressure rf rise. When the traveling operation member 59 is tilted rearward, the second pilot pressure lb and the fourth pilot pressure rb rise.

When the traveling operation member 59 is tilted leftward, the second pilot pressure lb and the third pilot pressure rf rise. When the traveling operation member 59 is tilted rightward, the first pilot pressure lf and the fourth pilot pressure rb rise.

When the traveling operation member 59 is tilted to the left obliquely forward, the third pilot pressure rf rises. When the traveling operation member 59 is tilted to the right obliquely forward, the first pilot pressure lf rises. When the traveling control member 59 is tilted to the left obliquely backward, the second pilot pressure lb rises. When the traveling operation member 59 is tilted to the right obliquely backward, the fourth pilot pressure rb rises.

FIG. 14 is an operation flow in which the controller 60 judges an operational direction of the traveling operation member 59 based on the third and fourth comparison information.

As shown in FIG. 14, the controller 60 refers to the first pilot pressure lf, the second pilot pressure lb, the third pilot pressure rf, and the fourth pilot pressure rb, and judges whether any one of the referred first pilot pressure lf, second pilot pressure lb, third pilot pressure rf, and fourth pilot pressure rb is higher than the operating pressure α for judging whether or not the traveling operation member 59 is being operated (step S101).

When none of the first pilot pressure lf, the second pilot pressure lb, the third pilot pressure rf, nor the fourth pilot pressure rb is higher than the operating pressure α (step S101, No), it is determined that the traveling operation member 59 is not operated (step S102).

When any one of the first pilot pressure lf, the second pilot pressure lb, the third pilot pressure rf, and the fourth pilot pressure rb is higher than the operating pressure α (step S101, Yes), the controller 60 judges whether the first pilot pressure lf is higher than the second pilot pressure lb (step S220).

When the first pilot pressure lf is higher than the second pilot pressure lb (step S220, Yes), the controller 60 judges whether the ratio of the fourth pilot pressure rb to the first pilot pressure lf is less than the third threshold β3 (step S221).

When the ratio of the fourth pilot pressure rb to the first pilot pressure lf is less than the third threshold β3 (step S221, Yes), the controller 60 determines that the third condition is satisfied and turns on the third flag indicating that the third condition is satisfied (step S122).

When the first pilot pressure lf is not higher than the second pilot pressure lb (step S220, No), or when the ratio of the fourth pilot pressure rb to the first pilot pressure lf is not less than the third threshold β3 (step S221, No), the controller 60 determines that the third condition is not satisfied and does not turn on the third flag.

In addition, the controller 60 judges whether the third pilot pressure rf is higher than the fourth pilot pressure rb (step S223).

When the third pilot pressure rf is higher than the fourth pilot pressure rb (step S223, Yes), the controller 60 judges whether the ratio of the second pilot pressure lb to the third pilot pressure rf is less than the fourth threshold β4 (step S224).

When the ratio of the second pilot pressure lb to the third pilot pressure rf is less than the fourth threshold β4 (step S224, Yes), the controller 60 determines that the fourth condition is satisfied and turns on the fourth flag indicating that the fourth condition is satisfied (step S125).

When the third pilot pressure rf is not higher than the fourth pilot pressure rb (step S223, No), or when the ratio of the second pilot pressure lb to the third pilot pressure rf is not less than the fourth threshold β4 (step S224, No), the controller 60 determines that the fourth condition is not satisfied and does not turn on the fourth flag.

The controller 60 judges whether either the third condition or the fourth condition is satisfied (either the third flag or the fourth flag is turned on) (step S126).

When any one of the third and fourth conditions is satisfied (step S126, Yes), the controller 60 determines that the operational direction of the traveling operation member 59 is the forward-traveling direction (step S227).

When neither the third condition nor the fourth condition is satisfied (step S126, No), the controller 60 determines that the operational direction of the traveling operation member 59 is other than the forward-traveling direction (step S228).

As shown in FIG. 13, the operational direction of the traveling operation member 59 in the backward-traveling direction corresponds to the area FA2, and the operational direction of the traveling operation member 59 in other than the backward-traveling direction corresponds to the area BA2.

When the first pilot pressure lf is higher than the second pilot pressure lb and the ratio of the fourth pilot pressure rb to the first pilot pressure lf is less than the third threshold β3, the controller 60 determines that the operational direction of the traveling operation member 59 is the forward-traveling direction. When the third pilot pressure rf is higher than the fourth pilot pressure rb and the ratio of the second pilot pressure lb to the third pilot pressure rf is less than the fourth threshold β4, the controller 60 determines that the operational direction of the traveling operation member 59 is the forward-traveling direction.

That is, the controller 60 can judge, based on the first pilot pressure lf, the second pilot pressure lb, the third pilot pressure rf, and the fourth pilot pressure rb, whether the operational direction of the traveling operation member 59, i.e., the operation of the traveling operation member 59, is in the area FA2 for the forward-traveling direction or whether the operational direction of the traveling operation member 59, i.e., the operation of the traveling operation member 59, is in the area BA2 for other than the forward-traveling direction.

According to the present embodiment, as in the second embodiment, the operational direction of the traveling operation member 59 can be easily determined without using a sensor such as a potentiometer based on the comparison between the first pilot pressure and the second pilot pressure acting on the left traveling pump 53L and the comparison between the third pilot pressure and the fourth pilot pressure acting on the right traveling pump 53L.

In addition, it can be easily known, using only the pilot pressures, that the operation member 59 is operated in other than the forward-traveling direction or that the operation member 59 is operated in the forward-traveling direction.

Fourth Embodiment

With reference to FIGS. 15 to 20, a fourth embodiment of the present invention will be described. In the present embodiment, in the hydraulic systems shown in FIG. 1 and FIG. 8 described in the second embodiment, the pressures of the first pilot pressure lf, the second pilot pressure lb, the third pilot pressure rf, and the fourth pilot pressure rb are used to judge whether the operational direction of the traveling operation member 59 is the left-turn direction or the right-turn direction.

In this embodiment, the same reference signs are used for the configurations described in the second embodiment, and detailed descriptions thereof are omitted.

Firstly, configurations for judging whether the operational direction of the traveling operation member 59 is the left-turn direction will be described below.

Figure 15:
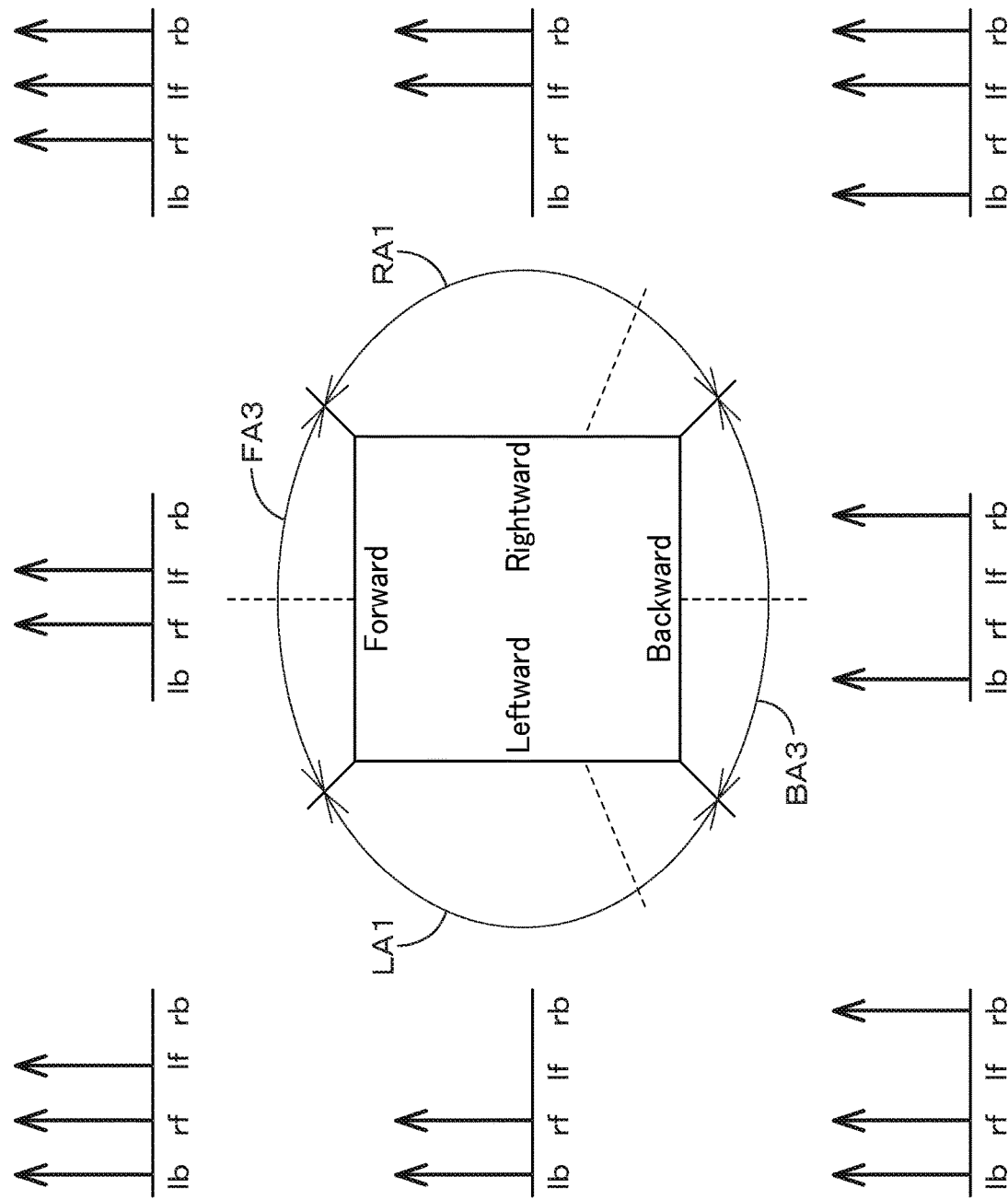
FIG. 15 is a view showing a relationship, in the hydraulic system shown in FIG. 1, between an operational direction defined by an operation of a traveling operation member, a first pilot pressure lf, a second pilot pressure lb, a third pilot pressure rf, and a fourth pilot pressure rb according to a fourth embodiment of the present invention.
Figure 16:
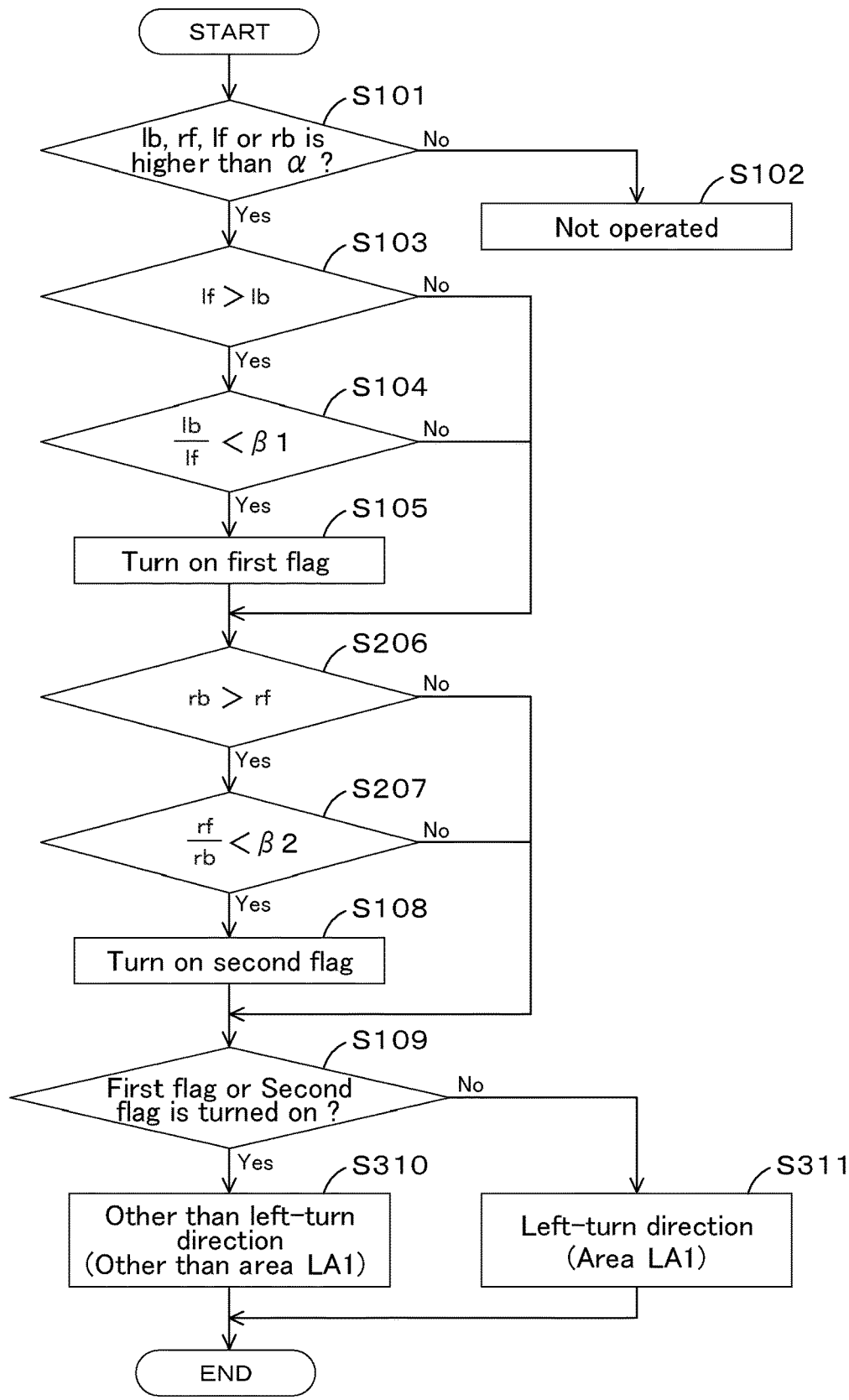
FIG. 16 is a view showing an operation flow of judging an operational direction of the traveling operation member based on the relationship between the operational direction and the pilot pressures shown in FIG. 15, according to the fourth embodiment.

FIG. 15 shows a relationship between the operation direction defined when the traveling operation member 59 is operated and the pressures of the first pilot pressure lf, the second pilot pressure lb, the third pilot pressure rf, and the fourth pilot pressure rb in the hydraulic system shown in FIG. 1. The arrowed lines in FIG. 15 indicate the pilot pressures. FIG. 16 shows an operation flow in which the controller 60 judges an operational direction of the traveling operation member 59 based on the first comparison information and the second comparison information.

Figure 17:
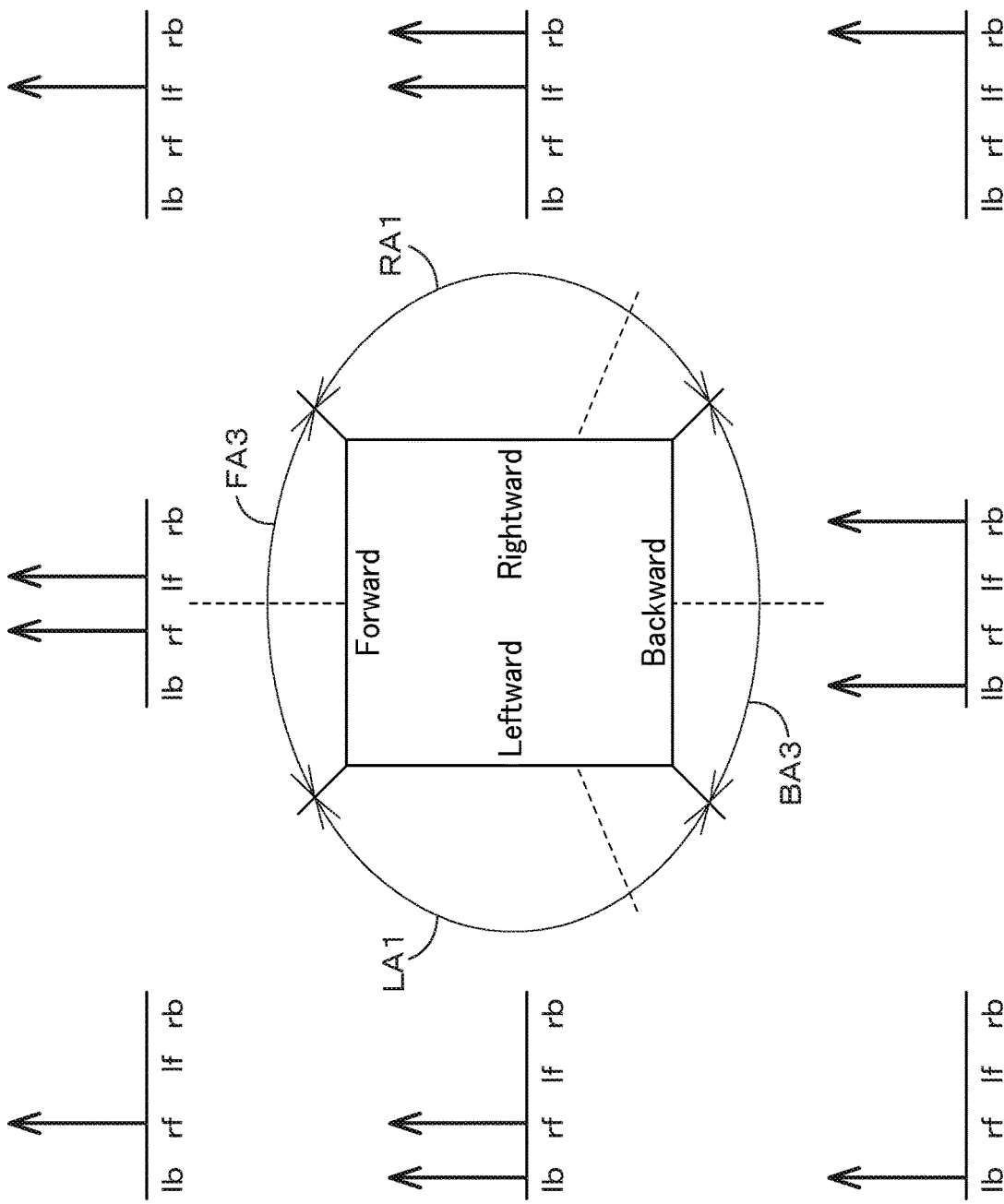
FIG. 17 is a view showing a relationship, in the hydraulic system shown in FIG. 8, between the operational direction defined by the operation of the traveling operation member, the first pilot pressure lf, the second pilot pressure lb, the third pilot pressure rf, and the fourth pilot pressure rb according to the fourth embodiment.
Figure 18:
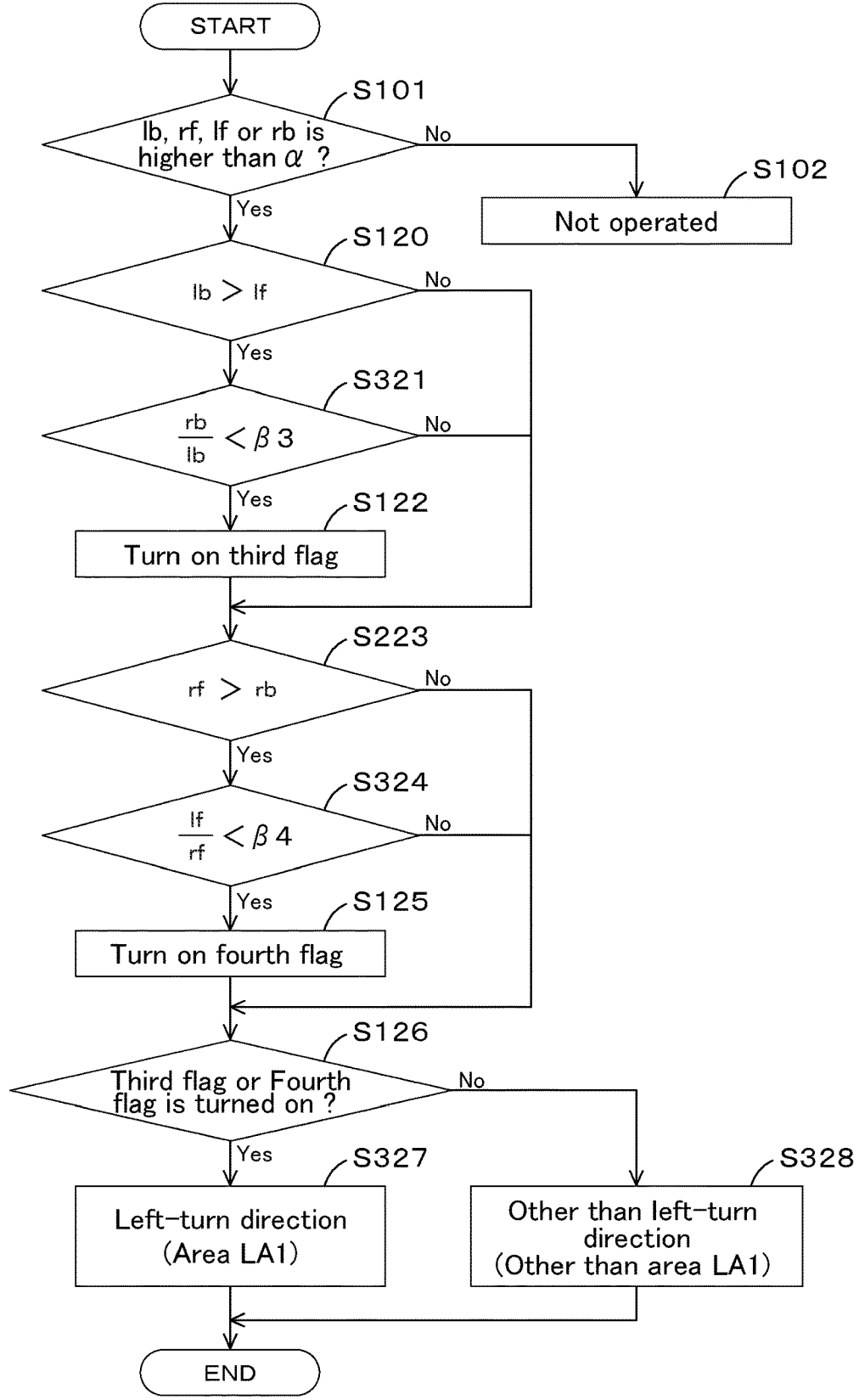
FIG. 18 is a view showing an operation flow of judging an operational direction of the traveling operation member based on the relationship between the operational direction and the pilot pressures shown in FIG. 17, according to the fourth embodiment.

FIG. 17 is a diagram showing a relationship between the operational direction of the traveling operation member 59 and the pressures of the first pilot pressure lf, the second pilot pressure lb, the third pilot pressure rf, and the fourth pilot pressure rb in the hydraulic system shown in FIG. 8. The arrowed lines in FIG. 17 indicate the pilot pressures. FIG. 18 is a diagram showing an operation flow in which the controller 60 judges an operational direction of the traveling operation member 59 based on the third comparison information and the fourth comparison information.

As shown in FIG. 15, when the traveling operation member 59 is tilted forward, the first pilot pressure lf and the third pilot pressure rf rise. When the traveling operation member 59 is tilted rearward, the second pilot pressure lb and the fourth pilot pressure rb rise. When the traveling control member 59 is tilted leftward, the second pilot pressure lb and the third pilot pressure rf rise. When the traveling operation member 59 is tilted rightward, the first pilot pressure lf and the fourth pilot pressure rb rise.

When the traveling operation member 59 is tilted to the left obliquely forward, the first pilot pressure lf, the second pilot pressure lb, and the third pilot pressure rf rise. When the traveling operation member 59 is tilted to the right obliquely forward, the first pilot pressure lf, the third pilot pressure rf, and the fourth pilot pressure rb rise.

When the traveling operation member 59 is tilted to the left obliquely backward, the second pilot pressure lb, the third pilot pressure rf, and the fourth pilot pressure rb rise. When the traveling operation member 59 is tilted to the right obliquely backward, the first pilot pressure lf, the second pilot pressure lb, and the fourth pilot pressure rb rise.

Based on either the first comparison information including the result of the comparison between the first pilot pressure lf and the second pilot pressure lb corresponding to the left traveling pump 53L, or the second comparison information including the result of the comparison between the third pilot pressure rf and the fourth pilot pressure rb acting on the right traveling pump 53R, the controller 60 judges an operational direction of the traveling operation member 59.

The comparison result included in the first comparison information is information obtained by using calculations or functions of a relationship in magnitude (a difference) between the first pilot pressure lf and the second pilot pressure lb, a ratio (rate) of the second pilot pressure lb to the first pilot pressure lf, a ratio (rate) of the first pilot pressure lf to the second pilot pressure lb, or a relationship in magnitude (a difference) between the first pilot pressure lf and the second pilot pressure lb relative to a predetermined value, and is information that directly or indirectly indicates the relationship between the magnitudes of the pilot pressures.

Similar to the first comparison information, the comparison result included in the second comparison information is also information that directly or indirectly indicates a relationship in magnitude between the third pilot pressure rf and the fourth pilot pressure rb.

Similar to the first and second comparison information, the third comparison information including a comparison result between the first pilot pressure lf and the fourth pilot pressure rb, and the fourth comparison information including a comparison result between the second pilot pressure lb and the third pilot pressure rf also may be used to judge the operational direction of the traveling operation member 59.

The controller 60 determines that the operational direction of the traveling operation member 59 is other than the left-turn direction when the first comparison information indicates that the first pilot pressure lf is higher than the second pilot pressure lb and the ratio of the second pilot pressure lb to the first pilot pressure lf is less than the first threshold.

When the second comparison information indicates that the fourth pilot pressure rb is higher than the third pilot pressure rf and the ratio of the third pilot pressure rf to the fourth pilot pressure rb is less than the second threshold, the controller 60 determines that the operational direction of the traveling operation member 59 is other than the left-turn direction.

FIG. 16 is an operation flow in which the controller 60 judges the operational direction of the traveling operation member 59 based on the first comparison information and the second comparison information.

As shown in FIG. 16, the controller 60 refers to the first pilot pressure lf, the second pilot pressure lb, the third pilot pressure rf, and the fourth pilot pressure rb and judges whether or not any one of the referenced first pilot pressure lf, second pilot pressure lb, third pilot pressure rf, and fourth pilot pressure rb is higher than the operating pressure α for judging whether or not the traveling operation member 59 is being operated (step S101).

When none of the first pilot pressure lf, the second pilot pressure lb, the third pilot pressure rf, and the fourth pilot pressure rb is higher than the operating pressure α (step S101, No), it is determined that the traveling operation member 59 is not operated (step S102).

When any one of the first pilot pressure lf, the second pilot pressure lb, the third pilot pressure rf, and the fourth pilot pressure rb is higher than the operating pressure α (step S101, Yes), the controller 60 judges whether the first pilot pressure lf is higher than the second pilot pressure lb (step S103).

When the first pilot pressure lf is higher than the second pilot pressure lb (step S103, Yes), the controller 60 judges whether the ratio of the second pilot pressure lb to the first pilot pressure lf is less than the first threshold β1 (step S104).

When the ratio of the second pilot pressure lb to the first pilot pressure lf is less than the first threshold β1 (step S104, Yes), the controller 60 determines that the first condition is satisfied and turns on the first flag indicating that the first condition is satisfied (step S105).

When the first pilot pressure lf is not higher than the second pilot pressure lb (step S103, No), or when the ratio of the second pilot pressure lb to the first pilot pressure lf is not less than the first threshold β1 (step S104, No), the controller 60 determines that the first condition is not met and does not turn on the first flag.

In addition, the controller 60 judges whether the fourth pilot pressure rb is higher than the third pilot pressure rf (step S206).

When the fourth pilot pressure rb is higher than the third pilot pressure rf (step S206, Yes), the controller 60 judges whether the ratio of the third pilot pressure rf to the fourth pilot pressure rb is less than the second threshold β2 (step S207).

When the ratio of the third pilot pressure rf to the fourth pilot pressure rb is less than the second threshold β2 (step S207, Yes), the controller 60 determines that the second condition is satisfied and turns on the second flag indicating that the second condition is satisfied (step S108).

When the fourth pilot pressure rb is not higher than the third pilot pressure rf (step S106, No), or when the ratio of the third pilot pressure rf to the fourth pilot pressure rb is not less than the second threshold β2 (step S207, No), the controller 60 determines that the second condition is not satisfied and does not turn on the second flag.

The controller 60 judges whether either the first condition or the second condition is satisfied (either the first flag or the second flag is turned on) (step S109).

When either the first condition or the second condition is satisfied (step S109, Yes), the controller 60 determines that the operational direction of the traveling operation member 59 is other than the left-turn direction (step S310).

When neither the first condition nor the second condition is satisfied (step S109, No), the controller 60 determines that the operational direction of the traveling operation member 59 is the left-turn direction (step S311).

As shown in FIG. 15, the operational direction of the traveling operation member 59 in the left-turn direction corresponds to the area LA1, and the operational direction of the traveling operation member 59 in other than the left-turn direction corresponds to the area FA3, RA1, or BA3.

As described above, the controller 60 determines that the operational direction of the traveling operation member 59 is other than the left-turn direction when the first pilot pressure lf is higher than the second pilot pressure lb and the ratio of the first pilot pressure lf to the second pilot pressure lb is less than the first threshold β1. Moreover, the controller 60 determines that the operational direction of the traveling operation member 59 is other than the left-turn direction when the fourth pilot pressure rb is higher than the third pilot pressure rf and the ratio of the third pilot pressure rf to the fourth pilot pressure rb is less than the second threshold β2.

That is, the controller 60 can judge, based on the first pilot pressure lf, the second pilot pressure lb, the third pilot pressure rf, and the fourth pilot pressure rb, whether the operational direction of the traveling operation member 59, i.e., the operation of the traveling operation member 59, is in the area LA1 for the left-turn direction or whether the operational direction of the traveling operation member 59, i.e., the operation of the traveling operation member 59, is in the area FA3, RA1, or BA3 for other than the left-turn direction.

FIG. 17 shows a relationship between the operational direction of the traveling operation member 59 and the pressures of the first pilot pressure lf, the second pilot pressure lb, the third pilot pressure rf, and the fourth pilot pressure rb in the hydraulic system in FIG. 8.

The arrowed lines in FIG. 17 indicate the pilot pressures. As shown in FIG. 17, when the traveling operation member 59 is tilted forward, the first pilot pressure lf and the third pilot pressure rf rise. When the traveling operation member 59 is tilted backward, the second pilot pressure lb and the fourth pilot pressure rb rise.

When the traveling operation member 59 is tilted leftward, the second pilot pressure lb and the third pilot pressure rf rise. When the traveling operation member 59 is tilted rightward, the first pilot pressure lf and the fourth pilot pressure rb rise.

When the traveling operation member 59 is tilted to the left obliquely forward, the third pilot pressure rf rises. When the traveling operation member 59 is tilted to the right obliquely forward, the first pilot pressure lf rises. When the traveling control member 59 is tilted to the left obliquely backward, the second pilot pressure lb rises. When the traveling operation member 59 is tilted to the right obliquely backward, the fourth pilot pressure rb rises.

FIG. 18 is an operation flow in which the controller 60 judges an operational direction of the traveling operation member 59 based on the third and fourth comparison information.

As shown in FIG. 18, the controller 60 refers to the first pilot pressure lf, the second pilot pressure lb, the third pilot pressure rf, and the fourth pilot pressure rb and judges whether or not any one of the referenced first pilot pressure lf, second pilot pressure lb, third pilot pressure rf, and fourth pilot pressure rb is higher than the operating pressure $\alpha$ for judging whether or not the traveling operation member 59 is being operated (step S101).

When neither the first pilot pressure lf, the second pilot pressure lb, the third pilot pressure rf, nor the fourth pilot pressure rb is higher than the operating pressure $\alpha$ (step S101, No), it is determined that the traveling operation member 59 is not operated (step S102).

If any one of the first pilot pressure lf, the second pilot pressure lb, the third pilot pressure rf, and the fourth pilot pressure rb is higher than the operating pressure $\alpha$ (step S101, Yes), the controller 60 judges whether the second pilot pressure lb is higher than the first pilot pressure lf (step S120).

When the second pilot pressure lb is higher than the first pilot pressure lf (step S120, Yes), the controller 60 judges whether the ratio of the fourth pilot pressure rb to the second pilot pressure lb is less than the third threshold $\beta 3$ (step S321).

When the ratio of the fourth pilot pressure rb to the second pilot pressure lb is less than the third threshold $\beta 3$ (step S321, Yes), the controller 60 determines that the third condition is satisfied and turns on the third flag indicating that the third condition is satisfied (step S122).

When the second pilot pressure lb is not higher than the first pilot pressure lf (step S120, No), or when the ratio of the fourth pilot pressure rb to the second pilot pressure lb is not less than the third threshold $\beta 3$ (step S321, No), the controller 60 determines that the third condition is not satisfied and does not turn on the third flag.

In addition, the controller 60 judges whether the third pilot pressure rf is higher than the fourth pilot pressure rb (step S223).

When the third pilot pressure rf is higher than the fourth pilot pressure rb (step S223, Yes), the controller 60 judges whether the ratio of the first pilot pressure lf to the third pilot pressure rf is less than the fourth threshold $\beta 4$ (step S324).

When the ratio of the first pilot pressure lf to the third pilot pressure rf is less than the fourth threshold $\beta 4$ (step S324, Yes), the controller 60 determines that the fourth condition is satisfied and turns on the fourth flag indicating that the fourth condition is satisfied (step S125).

When the third pilot pressure rf is not higher than the fourth pilot pressure rb (step S223, No), or when the ratio of the first pilot pressure lf to the third pilot pressure rf is not less than the fourth threshold $\beta 4$ (step S324, No), the controller 60 determines that the fourth condition is not satisfied and does not turn on the fourth flag.

The controller 60 judges whether either the third condition or the fourth condition is satisfied (either the third flag or the fourth flag is turned on) (step S126).

When either the third condition or the fourth condition is satisfied (step S126, Yes), the controller 60 determines that the operational direction of the traveling operation member 59 is the left-turn direction (step S327).

When neither the third condition nor the fourth condition is satisfied (step S126, No), the controller 60 determines that the operational direction of the traveling operation member 59 is other than the left-turn direction (step S328).

As shown in FIG. 17, the operational direction of the traveling operation member 59 in the left-turn direction corresponds to the area LA1, and the operational direction of the traveling operation member 59 in other than the left-turn direction corresponds to the areas FA3, RA1, and BA3.

When the second pilot pressure lb is higher than the first pilot pressure lf and the ratio of the fourth pilot pressure rb to the second pilot pressure lb is less than the third threshold $\beta 3$, the controller 60 determines that the operational direction of the traveling operation member 59 is the left-turn direction. When the third pilot pressure rf is higher than the fourth pilot pressure rb and the ratio of the first pilot pressure lf to the third pilot pressure rf is less than the fourth threshold $\beta 4$, the controller 60 determines that the operational direction of the traveling operation member 59 is the left-turn direction.

That is, the controller 60 can judge, based on the first pilot pressure lf, the second pilot pressure lb, the third pilot pressure rf, and the fourth pilot pressure rb, whether the operational direction of the traveling operation member 59, i.e., the operation of the traveling operation member 59, is in the area LA1 for the left-turn direction or whether the operational direction of the traveling operation member 59, i.e., the operation of the traveling operation member 59, is in the area FA3, RA1, or BA3 for other than the left-turn direction.

According to the present embodiment, as in the second embodiment, the operational direction of the traveling operation member 59 can be easily determined without using a sensor such as a potentiometer based on the comparison between the first pilot pressure and the second pilot pressure acting on the left traveling pump 53L and the comparison between the third pilot pressure and the fourth pilot pressure acting on the right traveling pump 53L.

In addition, the pilot pressures alone can be used to easily determine that the operation member 59 has been operated in other than the left-turn direction or that the operation member 59 has been operated in the left-turn direction.

Figure 19:
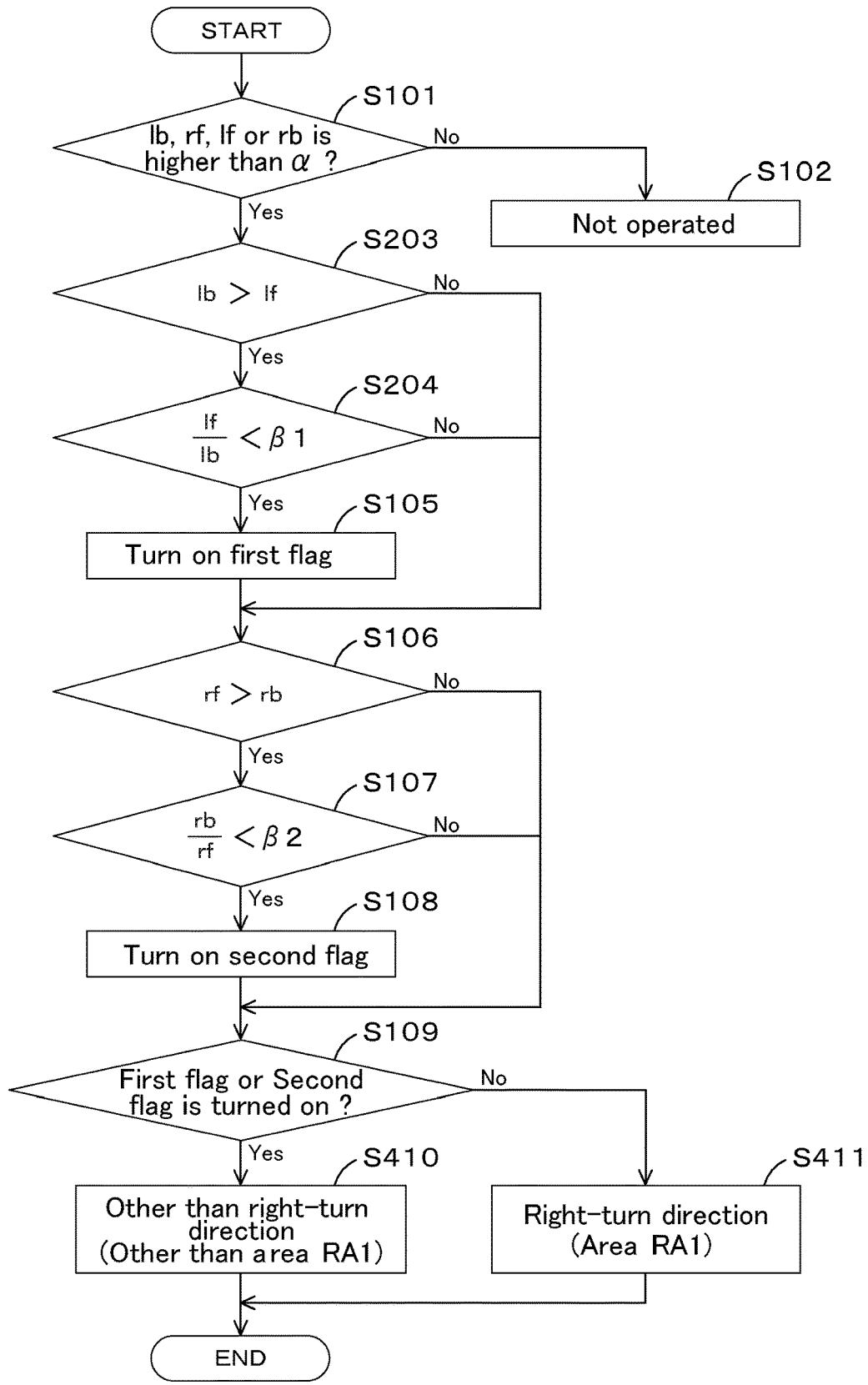
FIG. 19 is a view showing an operation flow of judging an operational direction of the traveling operation member based on the relationship between the operational direction and the pilot pressures shown in FIG. 15, according to the fourth embodiment.
Figure 20:
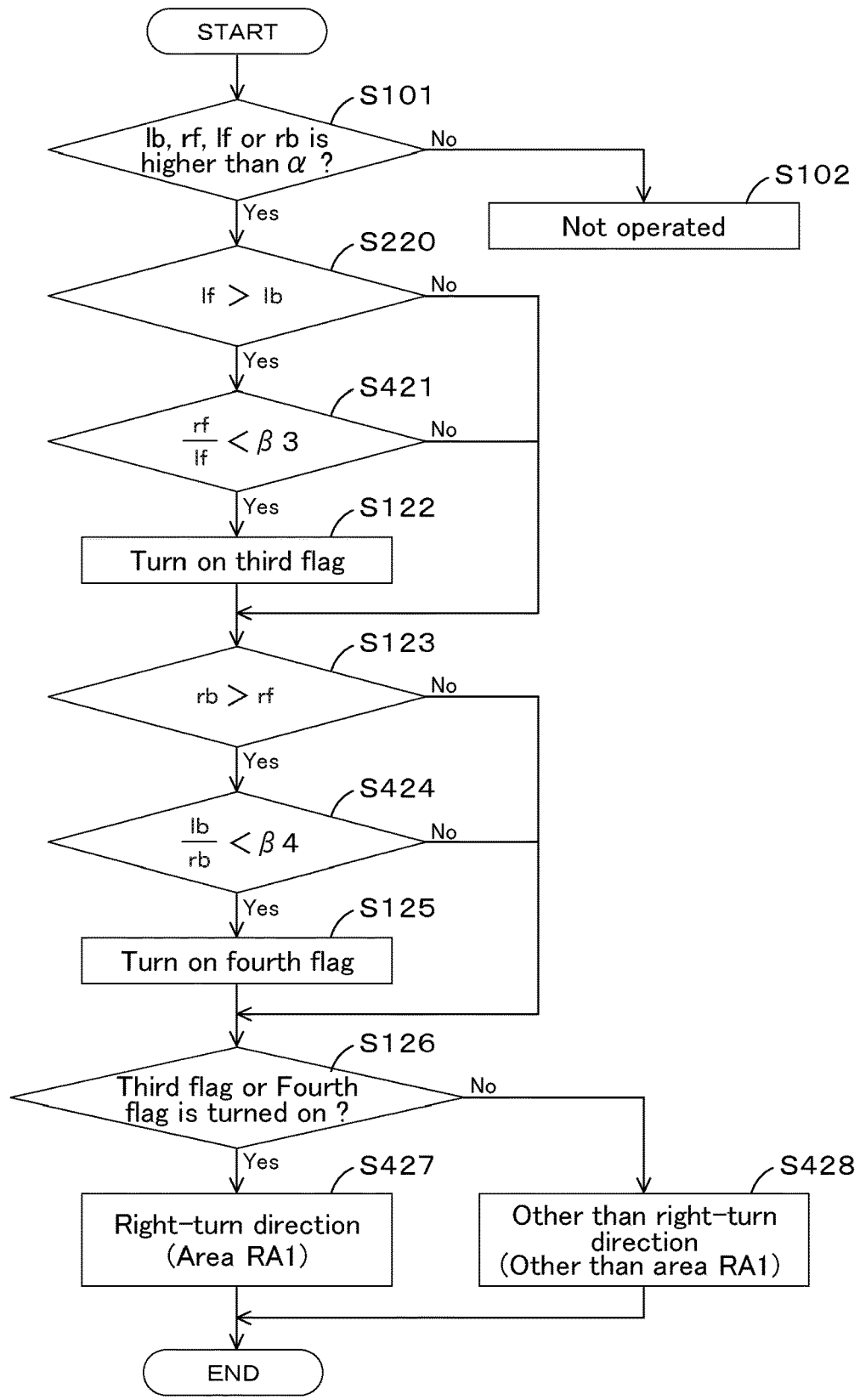
FIG. 20 is a view showing an operation flow of judging an operational direction of the traveling operation member based on the relationship between the operational direction and the pilot pressures shown in FIG. 17, according to the fourth embodiment.

Next, referring to FIGS. 15, 17, 19, and 20, a configuration for judging whether the operational direction of the traveling operation member 59 is the right-turn direction will be described. FIG. 19 shows an operation flow in which the controller 60 judges an operational direction of the traveling operation member 59 based on the first comparison information and the second comparison information. FIG. 20 shows an operation flow in which the controller 60 judges an operational direction of the traveling operation member 59 based on the third comparison information and the fourth comparison information.

FIG. 15 is a diagram showing a relationship between the operational direction of the traveling operation member 59 and the pressures of the first pilot pressure lf, the second pilot pressure lb, the third pilot pressure rf, and the fourth pilot pressure rb in the hydraulic system shown in FIG. 1. The relationship shown in FIG. 15 is as described above.

FIG. 17 is a view showing a relationship between the operational direction defined when the traveling operation member 59 is operated and the pressures of the first pilot pressure lf, the second pilot pressure lb, the third pilot pressure rf, and the fourth pilot pressure rb in the hydraulic system shown in FIG. 8. The relationship shown in FIG. 17 is as described above.

It is the same in the judgment of the right-turn that the controller 60 uses the first and second comparison information and the third and fourth comparison information to judge the operational direction of the traveling operation member 59.

The controller 60 determines that the operational direction of the traveling operation member 59 is other than a right-turn direction when the first comparison information indicates that the second pilot pressure lb is higher than the first pilot pressure lf and the ratio of the first pilot pressure lf to the second pilot pressure lb is less than the first threshold.

The controller 60 determines that the operational direction of the traveling operation member 59 is other than the right-turn direction when the second comparison information indicates that the third pilot pressure rf is higher than the fourth pilot pressure rb and the ratio of the fourth pilot pressure rb to the third pilot pressure rf is less than the second threshold.

FIG. 19 is an operation flow in which the controller 60 judges an operational direction of the traveling operation member 59 based on the first comparison information and the second comparison information.

As shown in FIG. 19, the controller 60 refers to the first pilot pressure lf, the second pilot pressure lb, the third pilot pressure rf, and the fourth pilot pressure rb and judges whether or not any one of the referred first pilot pressure lf, second pilot pressure lb, third pilot pressure rf, and fourth pilot pressure rb is higher than the operating pressure α for judging whether or not the traveling operation member 59 is being operated (step S101).

When none of the first pilot pressure lf, the second pilot pressure lb, the third pilot pressure rf, and the fourth pilot pressure rb is higher than the operating pressure α (step S101, No), it is determined that the traveling operation member 59 is not operated (step S102).

When any one of the first pilot pressure lf, the second pilot pressure lb, the third pilot pressure rf, and the fourth pilot pressure rb is higher than the operating pressure α (step S101, Yes), the controller 60 judges whether the second pilot pressure lb is higher than the first pilot pressure lf (step S203).

When the second pilot pressure lb is higher than the first pilot pressure lf (step S203, Yes), the controller 60 judges whether the ratio of the first pilot pressure lf to the second pilot pressure lb is less than the first threshold β1 (step S204).

When the ratio of the first pilot pressure lf to the second pilot pressure lb is less than the first threshold β1 (step S204, Yes), the controller 60 determines that the first condition is satisfied and turns on the first flag indicating that the first condition is satisfied (step S105).

When the second pilot pressure lb is not higher than the first pilot pressure lf (step S203, No), or when the ratio of the first pilot pressure lf to the second pilot pressure lb is not less than the first threshold β1 (step S204, No), the controller 60 determines that the first condition is not satisfied and does not turn on the first flag.

In addition, the controller 60 judges whether the third pilot pressure rf is higher than the fourth pilot pressure rb (step S106).

When the third pilot pressure rf is higher than the fourth pilot pressure rb (step S106, Yes), the controller 60 judges whether the ratio of the fourth pilot pressure rb to the third pilot pressure rf is less than the second threshold β2 (step S107).

When the ratio of the fourth pilot pressure rb to the third pilot pressure rf is less than the second threshold β2 (step S107, Yes), the controller 60 determines that the second condition is satisfied and turns on the second flag indicating that the second condition is satisfied (step S108).

When the third pilot pressure rf is not higher than the fourth pilot pressure rb (step S106, No), or when the ratio of the fourth pilot pressure rb to the third pilot pressure rf is not less than the second threshold β2 (step S107, No), the controller 60 determines that the second condition is not satisfied and does not turn on the second flag.

The controller 60 judges whether either the first condition or the second condition is satisfied (either the first flag or the second flag is turned on) (step S109).

When either the first condition or the second condition is satisfied (step S109, Yes), the controller 60 determines that the operational direction of the traveling operation member 59 is other than the right-turn direction (step S410).

When neither the first condition nor the second condition is satisfied (step S109, No), the controller 60 determines that the operational direction of the traveling operation member 59 is the right-turn direction (step S411).

As shown in FIG. 15, the operational direction of the traveling operation member 59 in the right-turn direction corresponds to the area RA1 and the operational direction of the traveling operation member 59 in other than the right-turn direction corresponds to the area FA3, LA1, or BA3.

As described above, the controller 60 determines that the operational direction of the traveling operation member 59 is other than the right-turn direction when the second pilot pressure lb is higher than the first pilot pressure lf and the ratio of the first pilot pressure lf to the second pilot pressure lb is less than the first threshold β1. Moreover, the controller 60 determines that the operational direction of the traveling operation member 59 is other than the right-turn direction when the third pilot pressure rf is higher than the fourth pilot pressure rb and the ratio of the fourth pilot pressure rb to the third pilot pressure rf is less than the second threshold β2.

That is, the controller 60 can judge, based on the first pilot pressure lf, the second pilot pressure lb, the third pilot pressure rf, and the fourth pilot pressure rb, whether the operational direction of the traveling operation member 59, i.e., the operation of the traveling operation member 59, is in the area RA1 for the right-turn direction or whether the operational direction of the traveling operation member 59, i.e., the operation of the traveling operation member 59, is in the area FA3, LA1, or BA3 for other than the right-turn direction.

FIG. 20 is an operation flow in which the controller 60 judges an operational direction of the traveling operation member 59 based on the third comparison information and the fourth comparison information.

As shown in FIG. 20, the controller 60 refers to the first pilot pressure lf, the second pilot pressure lb, the third pilot pressure rf, and the fourth pilot pressure rb and judges whether or not any one of the referred first pilot pressure lf, second pilot pressure lb, third pilot pressure rf, and fourth pilot pressure rb is higher than the operating pressure α for judging whether or not the traveling operation member 59 is being operated (step S101).

When neither the first pilot pressure lf, the second pilot pressure lb, the third pilot pressure rf, nor the fourth pilot pressure rb is higher than the operating pressure α (step S101, No), it is determined that the traveling operation member 59 is not operated (step S102).

When any one of the first pilot pressure lf, the second pilot pressure lb, the third pilot pressure rf, and the fourth pilot pressure rb is higher than the operating pressure α (step S101, Yes), the controller 60 judges whether the first pilot pressure lf is higher than the second pilot pressure lb (step S220).

When the first pilot pressure lf is higher than the second pilot pressure lb (step S220, Yes), the controller 60 judges whether the ratio of the third pilot pressure rf to the first pilot pressure lf is less than the third threshold β3 (step S421).

When the ratio of the third pilot pressure rf to the first pilot pressure lf is less than the third threshold β3 (step S421, Yes), the controller 60 determines that the third condition is satisfied and turns on the third flag indicating that the third condition is satisfied (step S122).

When the first pilot pressure lf is not higher than the second pilot pressure lb (step S220, No), or when the ratio of the third pilot pressure rf to the first pilot pressure lf is not less than the third threshold β3 (step S421, No), the controller 60 determines that the third condition is not satisfied and does not turn on the third flag.

In addition, the controller 60 judges whether the fourth pilot pressure rb is higher than the third pilot pressure rf (step S123).

When the fourth pilot pressure rb is higher than the third pilot pressure rf (step S123, Yes), the controller 60 judges whether the ratio of the second pilot pressure lb to the fourth pilot pressure rb is less than the fourth threshold β4 (step S424).

When the ratio of the second pilot pressure lb to the fourth pilot pressure rb is less than the fourth threshold β4 (step S424, Yes), the controller 60 determines that the fourth condition is satisfied and turns on the fourth flag indicating that the fourth condition is satisfied (step S125).

When the fourth pilot pressure rb is not higher than the third pilot pressure rf (step S123, No), or when the ratio of the second pilot pressure lb to the fourth pilot pressure rb is not less than the fourth threshold β4 (step S424, No), the controller 60 determines that the fourth condition is not satisfied and does not turn on the fourth flag.

The controller 60 judges whether either the third condition or the fourth condition is satisfied (either the third flag or the fourth flag is turned on) (step S126).

When either the third condition or the fourth condition is satisfied (step S126, Yes), the controller 60 determines that the operational direction of the traveling operation member 59 is the right-turn direction (step S427).

When neither the third condition nor the fourth condition is satisfied (step S126, No), the controller 60 determines that the operational direction of the traveling operation member 59 is other than the right-turn direction (step S428).

As shown in FIG. 17, the operational direction of the traveling operation member 59 in the right-turn direction corresponds to the area RA1, and the operational direction of the traveling operation member 59 in other than the right-turn direction corresponds to the areas FA3, LA1, and BA3.

When the first pilot pressure lf is higher than the second pilot pressure lb and the ratio of the third pilot pressure rf to the first pilot pressure lf is less than the third threshold β3, the controller 60 determines that the operational direction of the traveling operation member 59 is the right-turn direction. When the fourth pilot pressure rb is higher than the third pilot pressure rf and the ratio of the second pilot pressure lb to the fourth pilot pressure rb is less than the fourth threshold β4, the controller 60 determines that the operational direction of the traveling operation member 59 is the right-turn direction.

That is, the controller 60 can judge, based on the first pilot pressure lf, the second pilot pressure lb, the third pilot pressure rf, and the fourth pilot pressure rb, whether the operational direction of the traveling operation member 59, i.e., the operation of the traveling operation member 59, is in the area RA1 for the right-turn direction or whether the operational direction of the traveling operation member 59, i.e., the operation of the traveling operation member 59, is in the area FA3, LA1, or BA3 for other than the right-turn direction.

According to the present embodiment, as in the second embodiment, the operational direction of the traveling operation member 59 can be easily determined without using a sensor such as a potentiometer based on the comparison between the first pilot pressure and the second pilot pressure acting on the left traveling pump 53L and the comparison between the third pilot pressure and the fourth pilot pressure acting on the right traveling pump 53L.

In addition, it can be easily known, using only the pilot pressures, that the operation member 59 is operated in other than the right-turn direction or that the operation member 59 is operated in the right-turn direction.

In the above-described second to fourth embodiments, since the second speed need only be faster than the first speed, the working machine 1 does not limit the shifting steps to two steps, and can employ the multiple shifting steps (multiple steps) more than two steps.

In the above-described embodiment, the left traveling motor 36L and the right traveling motor 36R were configured to switch to the first speed and the second speed simultaneously, and the automatic deceleration is also performed simultaneously for the left traveling motor 36L and the right traveling motor 36R. However, the automatic deceleration may be performed while at least one of the left traveling motor 36L and the right traveling motor 36R is configured to switch to the first speed and the second speed and at least one of the left traveling motor 36L and the right traveling motor 36R is at the second speed.

The traveling motors (the left traveling motor 36L and right traveling motor 36R) may be axial piston motors or radial piston motors. Regardless of whether the traveling motors are radial piston motors or radial piston motors, the motors can be switched to the first speed by increasing a motor capacity and to the second speed by decreasing the motor capacity.

In the case where it is judged that the operational direction of the traveling operation member 59 is the backward-traveling direction, forward-traveling direction, left-turn direction, or right-turn direction, the imaging device provided in the working machine 1, that is, an imaging device provided in the working machine 1 to capture the judged direction, may be activated or the like. In addition, in the case where it is judged that the operational direction of the traveling operation member 59 is a spin-turn direction, the automatic deceleration may be performed, and any processing may be performed after the operational direction of the traveling operation member 59 is determined.

In the case where it is not determined that the operational direction of the traveling operation member 59 is the spin-turn direction or a pivotal-turn direction, the process may return from the automatic deceleration.

The controller 60 judges the operational direction of the traveling operation member 59 based on the first comparison information including the first pilot pressure and the second pilot pressure, but for example, the controller 60 may compare the first pilot pressure and the second pilot pressure and judge whether the operation is the spin turn or the pivotal-turn based on the magnitude thereof.

The controller 60 judges the operational direction of the traveling operation member 59 based on the second comparison information including the third pilot pressure and the fourth pilot pressure, but for example, the controller 60 may compare the third pilot pressure and the fourth pilot pressure and judge whether the operation is the spin turn or the pivotal-turn based on the magnitude thereof.

In addition, the controller 60 may judge an operational direction of the traveling operation member 59 based on the third comparison information including the first pilot pressure and the fourth pilot pressure, as in the embodiments described above. Moreover, the controller 60 may compare the first pilot pressure and the fourth pilot pressure and judge whether the operation is the spin turn or the pivotal-turn based on the magnitude thereof.

The controller 60 may judge an operational direction of the traveling operation member 59 based on whether either the first pilot pressure lf or the second pilot pressure lb is higher than or equal to the predetermined value, or whether both the first pilot pressure lf and the second pilot pressure lb are higher than or equal to the predetermined value.

The controller 60 may judge an operational direction of the traveling operation member 59 based on whether either the third pilot pressure rf or the fourth pilot pressure rb is higher than or equal to the predetermined value, or whether both the third pilot pressure rf and the fourth pilot pressure rb are higher than or equal to the predetermined value.

The controller 60 may judge an operational direction of the traveling operation member 59 based on whether either the first pilot pressure lf or the fourth pilot pressure rb is higher than or equal to the predetermined value, or whether both the first pilot pressure lf and the fourth pilot pressure rb are higher than or equal to above the predetermined value.

The controller 60 may judge an operational direction of the traveling operation member 59 based on whether either the second pilot pressure lb or the third pilot pressure rf is higher than or equal to the predetermined value, or whether both the second pilot pressure lb and the third pilot pressure rf is higher than or equal to the predetermined value.

In the hydraulic circuits shown in FIG. 1 and FIG. 8, the controller 60 may combine the configurations disclosed in the second through fourth embodiments described above to judge all of the forward-traveling direction, backward-traveling direction, left-turn direction, and right-turn direction.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
a machine body;
a left traveling device provided on a left portion of the machine body;
a right traveling device provided on a right portion of the machine body;
a left traveling motor configured to output power to the left traveling device;
a right traveling motor configured to output power to the right traveling device;
a left traveling pump to supply operation fluid to the left traveling motor, the left traveling pump including a first pressure receiving portion and a second pressure receiving portion so that operation fluid is used to apply a pressure to at least one of the first and second pressure receiving portions;
a right traveling pump to supply operation fluid to the right traveling motor, the right traveling pump including a third pressure receiving portion and a fourth pressure receiving portion so that operation fluid is used to apply a pressure to at least one of the third and fourth pressure receiving portions;
a traveling operation device including
a traveling operation member operably movable from a neutral position to any one of a left-front operation area, a right-front operation area, a left-rear operation area and a right-rear operation area,
the traveling operation device being configured to apply the pressure of operation fluid to at least one of the first, second, third and fourth pressure receiving portions corresponding to an operational position of the traveling operation member in any one of the left-front, right-front, left-rear and right-rear operation areas;
a first traveling fluid line connected to the first pressure receiving portion, the operation fluid having a pressure applied to the first pressure receiving portion being passed through the first traveling fluid line according to operation of the traveling operation member;
a second traveling fluid line connected to the second pressure receiving portion, the operation fluid having a pressure applied to the second pressure receiving portion being passed through the second traveling fluid line according to operation of the traveling operation member;
a third traveling fluid line connected to the third pressure receiving portion, the operation fluid having a pressure applied to the third pressure receiving portion being passed through the third traveling fluid line according to operation of the traveling operation member;
a fourth traveling fluid line connected to the fourth pressure receiving portion, the operation fluid having a pressure applied to the fourth pressure receiving portion being passed through the fourth traveling fluid line according to operation of the traveling operation member;
a first pressure detector configured to detect a first pilot pressure that is the pressure of operation fluid passed through the first traveling fluid line;
a second pressure detector configured to detect a second pilot pressure that is the pressure of operation fluid passed through the second traveling fluid line;
a third pressure detector configured to detect a third pilot pressure that is the pressure of operation fluid passed through the third traveling fluid line;
a fourth pressure detector configured to detect a fourth pilot pressure that is the pressure of operation fluid passed through the fourth traveling fluid line; and
a controller configured or programed to determine in which of the left-front, right-front, left-rear and right-rear operation areas an operational position of the traveling operation member exists,
wherein the controller is configured or programmed to
determine the operational position of the traveling operation member as existing in any one of the left-front operation area, a left side area in the left-rear operation area bordered by an oblique line extending leftwardly rearward from the neutral position, and a left side area in the right-front operation area bordered by an oblique line extending rightwardly forward from the neutral position when the third pilot pressure is higher than the fourth pilot pressure, determine the operational position of the traveling operation member as existing in any one of the right-front operation area, a right side area in the right-rear operation area bordered by an oblique line extending rightwardly rearward from the neutral position, and a right side area in the left-front operation area bordered by an oblique line extending leftwardly forward from the neutral position when the first pilot pressure is higher than the second pilot pressure, and determine the operational position of the traveling operation member as existing in either a right side area in the left-rear operation area bordered by the oblique line extending leftwardly rearward from the neutral position or a left side area in the right-rear operation area bordered by the oblique line extending rightwardly rearward from the neutral position when the third pilot pressure is less than the fourth pilot pressure and the first pilot pressure is less than the second pilot pressure.

2. The working machine according to claim 1, wherein the controller is configured or programmed to determine the operational position of the traveling operation member as existing at least in the left-front operation area when a first ratio that is a ratio of the fourth pilot pressure to the third pilot pressure is less than a predetermined value, determine the operational position of the traveling operation member as existing in either the right side area in the left-front operation area bordered by the oblique line extending leftwardly forward from the neutral position or the left side area in the right-front operation area bordered by the oblique line extending rightwardly forward from the neutral position when a second ratio that is a ratio of the first pilot pressure to the third pilot pressure is within a predetermined range, determine the operational position of the traveling operation member as existing in a left side area in the left-front operation area bordered by the oblique line extending leftwardly forward from the neutral position when a third ratio that is a ratio of the second pilot pressure to the third pilot pressure is within a predetermined range and the first pilot pressure is higher than the fourth pilot pressure, determine the operational position of the traveling operation member as existing in either a part of the left side area in the left-front operation area or a part of the left side area in the left-rear operation area when a fourth ratio that is a ratio of the fourth pilot pressure to the first pilot pressure is within a predetermined range, determine the operational position of the traveling operation member as existing at least in the right-front operation area when a fifth ratio that is a ratio of the second pilot pressure to the first pilot pressure is less than a predetermined value, determine the operational position of the traveling operation member as existing in either the right side area in the left-front operation area bordered by the oblique line extending leftwardly forward from the neutral position or the left side area in the right-front operation area bordered by the oblique line extending rightwardly forward from the neutral position when a sixth ratio that is a ratio of the third pilot pressure to the first pilot pressure is within a predetermined range, determine the operational position of the traveling operation member as existing in a right side area in the right-front operation area bordered by the oblique line extending rightwardly forward from the neutral position when a seventh ratio that is a ratio of the fourth pilot pressure to the first pilot pressure is within a predetermined range and the third pilot pressure is higher than the second pilot pressure, determine the operational position of the traveling operation member as existing in either a part of the right side area in the right-front operation area or a part of the right side area in the right-rear operation area when an eighth ratio that is a ratio of the second pilot pressure to the third pilot pressure is within a predetermined range, and determine the operational position of the traveling operation member as existing in either the right side area in the left-rear operation area bordered by the oblique line extending leftwardly rearward from the neutral position or the left side area in the right-rear operation area bordered by the oblique line extending rightwardly rearward from the neutral position when (i) the first ratio is not less than the predetermined value, (ii) the second ratio is not within the predetermined range, (iii) the third ratio is not within the predetermined range and the first pilot pressure is not higher than the fourth pilot pressure, (iv) the fourth ratio is not within the predetermined range, (v) the fifth ratio is not less than the predetermined value, (vi) the sixth ratio is not within the predetermined range, (vii) the seventh ratio is not within the predetermined range and the third pilot pressure is not higher than the second pilot pressure, and (viii) the eighth ratio is not within the predetermined range.

3. The working machine according to claim 1, wherein the controller is configured or programmed to determine the operational position of the traveling operation member as existing in either a part of the left side area in the left-front operation area or a part of the left side area in the left-rear operation area when a fourth ratio that is a ratio of the fourth pilot pressure to the first pilot pressure is within a predetermined range, and determine the operational position of the traveling operation member as existing in either a part of the right side area in the right-front operation area or a part of the right side area in the right-rear operation area when an eighth ratio that is a ratio of the second pilot pressure to the third pilot pressure is within a predetermined range, and determine the operational position of the traveling operation member as existing in an area including the right side area in the left-rear operation area bordered by the oblique line extending leftwardly rearward from the neutral position and the left side area in the right-rear operation area bordered by the oblique line extending rightwardly rearward from the neutral position when the fourth ratio is out of the predetermined range and the eighth ratio is out of the predetermined range.

* * * * *